(12) United States Patent
Leddy et al.

(10) Patent No.: US 7,709,115 B2
(45) Date of Patent: May 4, 2010

(54) METHODS FOR FORMING MAGNETICALLY MODIFIED ELECTRODES AND ARTICLES PRODUCED THEREBY

(75) Inventors: Johna Leddy, Iowa City, IA (US);
Pengcheng Zou, Milwaukee, WI (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 10/356,723

(22) Filed: Feb. 3, 2003

(65) Prior Publication Data

US 2003/0232223 A1    Dec. 18, 2003

Related U.S. Application Data

(60) Continuation-in-part of application No. 09/876,035, filed on Jun. 8, 2001, now Pat. No. 6,514,575, which is a division of application No. 09/047,494, filed on Mar. 25, 1998, now Pat. No. 6,322,676, which is a continuation of application No. 08/294,797, filed on Aug. 25, 1994, now abandoned.

(51) Int. Cl.
*H01M 2/00* (2006.01)
*H01M 4/32* (2006.01)
*H01M 4/44* (2006.01)
*H01M 4/52* (2010.01)

(52) U.S. Cl. ............... 429/10; 429/218.2; 429/221; 429/222; 429/223

(58) Field of Classification Search ............ 429/10
See application file for complete search history.

(56) References Cited

U.S. PATENT DOCUMENTS

| | | | |
|---|---|---|---|
| 2,688,649 A * | 9/1954 | Bjorksten | ............... 429/124 |
| 2,895,851 A | 7/1959 | Johnson | |
| 3,409,471 A | 11/1968 | Sturm et al. | |
| 3,597,829 A * | 8/1971 | Wagner et al. | ............. 29/857 |
| 3,791,896 A | 2/1974 | Sklarchuk | |
| 3,811,952 A | 5/1974 | Siwersson et al. | |
| 3,853,628 A | 12/1974 | Fox | |
| 3,945,910 A | 3/1976 | DeCeuster | |
| 4,000,004 A | 12/1976 | Takahashi et al. | |
| 4,019,995 A | 4/1977 | Briggs et al. | |
| 4,037,022 A | 7/1977 | Cheron | |
| 4,132,619 A | 1/1979 | Klein et al. | |
| 4,201,827 A | 5/1980 | Heitkamp | |
| 4,244,998 A | 1/1981 | Smith | |
| 4,247,398 A | 1/1981 | Mohri | |

(Continued)

FOREIGN PATENT DOCUMENTS

JP    61091876    9/1986

(Continued)

OTHER PUBLICATIONS

European Search Report dated Mar. 7, 2006 issued in co-pending European application Serial No. 96925262.6.

*Primary Examiner*—Keith Walker
(74) *Attorney, Agent, or Firm*—Foley & Lardner LLP

(57) ABSTRACT

The present invention is directed to methods for making magnetically modified electrodes and electrodes made according to the method. Such electrode are useful as electrodes in batteries, such as Ni-MH batteries, Ni—Cd batteries, Ni—Zn batteries and Ni—Fe batteries.

8 Claims, 51 Drawing Sheets

U.S. PATENT DOCUMENTS

| | | | |
|---|---|---|---|
| 4,336,278 A | 6/1982 | Pertzsch et al. | |
| 4,339,337 A | 7/1982 | Tricot et al. | |
| 4,514,473 A * | 4/1985 | Atkin et al. | 429/10 |
| 4,647,514 A | 3/1987 | LeCraw | |
| 4,725,490 A | 2/1988 | Goldenberg | |
| 4,876,115 A | 10/1989 | Raistrick | |
| 4,965,007 A | 10/1990 | Mudelson | |
| 4,973,391 A | 11/1990 | Madon et al. | |
| 5,032,475 A * | 7/1991 | Hasebe et al. | 429/60 |
| 5,075,169 A | 12/1991 | Nagai et al. | |
| 5,096,551 A | 3/1992 | Shoen et al. | |
| 5,102,745 A | 4/1992 | Tatarchuk et al. | |
| 5,172,751 A | 12/1992 | Croat | |
| 5,186,854 A | 2/1993 | Edelstein | |
| 5,187,034 A | 2/1993 | Olagwa et al. | |
| 5,191,223 A | 3/1993 | Munekata | |
| 5,241,447 A | 8/1993 | Barber et al. | |
| 5,540,981 A | 7/1996 | Gallagher et al. | |
| 5,561,000 A | 10/1996 | Dirven et al. | |
| 5,587,943 A | 12/1996 | Torok et al. | |
| 5,696,392 A | 12/1997 | Char et al. | |
| 5,728,482 A | 3/1998 | Kawakami et al. | |
| 5,928,804 A | 7/1999 | Leddy et al. | |
| 6,001,248 A | 12/1999 | Leddy et al. | |
| 6,036,838 A | 3/2000 | Wieser et al. | |
| 6,194,093 B1 | 2/2001 | O'Brien | |

FOREIGN PATENT DOCUMENTS

| | | | |
|---|---|---|---|
| JP | 05082134 A | * | 4/1993 |

* cited by examiner

FILM CONFIGURATION FOR NON-MAGNETIZED ELECTRODE

ELECTRODE CONFIGURATION FOR DYING MAGNETIZED ELECTRODE IN NORMAL DIRECTION

FILM CONFIGURATION FOR MAGNETIZED ELECTRODE

CYCLIC VOLTAMMOGRAMS OF MAGNETIZED AND NON-MAGNETIZED
PURE NICKEL HYDROXIDE ELECTRODE

CYCLIC VOLTAMMOGRAMS FOR MAGNETIZED PURE NICKEL HYDROXIDE ELECTRODE AT DIFFERENNT SCAN RATES.

RELATIONSHIP BETWEEN CATHODIC PEAK CURRENT AND THE SQUARE ROOT OF SCAN RATE FOR MAGNETIZED AND NON-MAGNETIZED PURE NICKEL HYDROXIDE ELECTRODE.

RELATIONSHIP BETWEEN CATHODIC PEAK CURRENT AND SCAN RATE FOR MAGNETIZED AND NON-MAGNETIZED PURE NICKEL HYDROXIDE ELECTRODE.

CYCLIC VOLTAMMOGRAMS FOR NON-MAGNETIZED Ni(OH)$_2$ / GLASS BEADS (5%) MIXTURE ELECTRODE (v=200mV/SEC)

CYCLIC VOLTAMMOGRAMS FOR MAGNETIZED AND NON-MAGNETIZED Ni(OH)$_2$ / Co(15%) MIXTURE ELECTRODE (v=200mV/SEC)

CYCLIC VOLTAMMOGRAMS FOR NON-MAGNETIZED Ni(OH)$_2$ WITH 5% AND 10% AND 15% Fe$_3$O$_4$ MIXTURE ELECTRODE (v=200mV/SEC)

CYCLIC VOLTAMMOGRAMS FOR MAGNETIZED AND NON-MAGNETIZED $Ni(OH)_2$ WITH 5% AND 10% $Fe_3O_4$ MIXTURE ELECTRODE (v=200mV/SEC)

CYCLIC VOLTAMMOGRAMS FOR NON-MAGNETIZED Ni(OH)$_2$ WITH 5% AND 15% NdFeB MIXTURE ELECTRODE (v=200mV/SEC)

CYCLIC VOLTAMMOGRAMS FOR MAGNETIZED Ni(OH)$_2$ / NdFeB MIXTURE ELECTRODE (v=200mV/SEC)

CYCLIC VOLTAMMOGRAMS FOR NON-MAGNETIZED AND MAGNETIZED $Ni(OH)_2$ / 5% SmCo MIXTURE ELECTRODE (v=200mV/SEC)

CYCLIC VOLTAMMOGRAMS FOR MAGNETIZED AND NON-MAGNETIZED PURE
NICKEL HYDROXIDE ELECTRODES AT T=-15°C (v=200mV/SEC)

CATHODIC CURRENTS FOR MAGNETIZED AND NON-MAGNETIZED PURE NICKEL HYDROXIDE ELECTRODE AT DIFFERENT TESTING TEMPERATURE (FORWARD (25°C TO -15°C); REVERSE (-15°C TO 25°C);(V=200mV/SEC))

CYCLIC VOLTAMMOGRAMS FOR NON-MAGNETIZED Ni(OH)2 / GLASS BEADS (5%)
MIXTURE ELECTRODE AT T=-15°C (v=200mV/SEC)

CYCLIC VOLTAMMOGRAMS FOR MAGNETIZED AND NON-MAGNETIZED Ni(OH)2 / Co(15%)
MIXTURE ELECTRODE AT T=-15°C (v=200mV/SEC)

CYCLIC VOLTAMMOGRAMS FOR NON-MAGNETIZED $Ni(OH)_2$ WITH 5, 10, AND 15 WT% $Fe_3O_4$ MIXTURE ELECTRODE AT T=-15°C (v=200mV/SEC)

CYCLIC VOLTAMMOGRAMS FOR MAGNETIZED Ni(OH)$_2$ WITH 5 AND 10 WT% Fe$_3$O$_4$ MIXTURE ELECTRODE AT T=-15°C (v=200mV/SEC)

CYCLIC VOLTAMMOGRAMS FOR NON-MAGNETIZED Ni(OH)$_2$ WITH 5% AND 15 WT% NdFeB MIXTURE ELECTRODE AT T=-15°C (v=200mV/SEC)

CYCLIC VOLTAMMOGRAMS FOR MAGNETIZED Ni(OH)$_2$ WITH 5% NdFeB MIXTURE ELECTRODE AT T=-15°C (v=200mV/SEC)

CYCLIC VOLTAMMOGRAMS FOR NON-MAGNETIZED Ni(OH)$_2$ WITH 5% SmCo MIXTURE ELECTRODE AT T=-15°C (v=200mV/SEC)

CYCLIC VOLTAMMOGRAMS FOR MAGNETIZED Ni(OH)$_2$ WITH 5% SmCo
MIXTURE ELECTRODE AT T=-15°C (v=200mV/SEC)

METHODS FOR FORMING MAGNETICALLY MODIFIED ELECTRODES AND ARTICLES PRODUCED THEREBY

This application is a continuation-in-part of U.S. patent application Ser. No. 09/876,035, filed on Jun. 8, 2001 and now U.S. Pat. No. 6,514,575, which is a divisional of U.S. patent application Ser. No. 09/047,494, filed Mar. 25, 1998 and now U.S. Pat. No. 6,322,676, which is a continuation of U.S. patent application Ser. No. 08/249,797, filed Aug. 25, 1994 and now abandoned, each of which is incorporated by reference in its entirety.

Part of the work performed during the development of this invention utilized U.S. government funds under grants No. CHE92-96013 and No. CHE93-20611 from the National Science Foundation, Chemistry Division, Analytical and Surface Science. The government may have certain rights in this invention.

BACKGROUND OF THE INVENTION

1. Field of the Invention

This invention relates generally to methods for forming magnetically modified electrodes and electrodes made by such methods. According to the present invention, magnetically modified electrodes exhibit improved properties compared to electrodes that are not magnetically modified.

2. Background of the Related Art

Bulk properties of molecules in magnetic fields are fairly well understood. In the detailed description of preferred embodiments, it will be shown that interfacial gradients in properly prepared composite materials can be exploited to enhance flux in many types of electrochemical systems such as fuel cells, batteries, membrane sensors, filters and flux switches. First, however, the following discussion provides a brief overview of the current understanding of magnetic properties in composites. In particular, the discussion below summarizes the thermodynamic, kinetic and mass transport properties of bulk magnetic materials.

Rudimentary Magnetic Concepts

Paramagnetic molecules have unpaired electrons and are attracted into a magnetic field; diamagnetic species, with all electrons paired, are slightly repelled by the field. Radicals and oxygen are paramagnetic; most organic molecules are diamagnetic; and most metal ions and transition metal complexes are either para- or diamagnetic. How strongly a molecule or species in a solution or fluid responds to a magnetic field is parameterized by the molar magnetic susceptibility, $\chi_m$ (cm$^3$/mole). For diamagnetic species, $\chi_m$ is $(-1$ to $500) \times 10^{-6}$ cm$^3$/mole, and temperature independent. For paramagnetic species ranges $\chi_m$ from 0 to $+0.01$ cm$^3$/mole, and, once corrected for its usually small diamagnetic component, varies inversely with temperature (Curie's Law). While ions are monopoles and will either mover with or against an electric field, depending on the sign of the ion, paramagnetic species are dipoles and will always be drawn into (aligned in) a magnetic field, independent of the direction of the magnetic vector. The dipole will experience a net magnetic force if a field gradient exists. Because electrochemistry tends to involve single electron transfer events, the majority of electrochemical reactions should result in a net change in the magnetic susceptibility of species near the electrode.

Magnetic field effects on chemical systems can be broken down into three types: thermodynamic, kinetic and mass transport. Macroscopic, thermodynamic effects are negligible, although local magnetic field effects may not be. Kinetically, both reaction rates and product distributions can be altered. Transport effects can lead to flux enhancements of several-fold. Quantum mechanical effects are also possible, especially on very short length scales, below 10 nm. The following summarizes what has been done with homogeneous fields applied to solutions and cells with external laboratory magnets.

Thermodynamics

A magnetic field applied homogeneously by placing a solution between the poles of a laboratory magnet will have a negligible nonexponential effect on the free energy of reaction. $\Delta G_m = -0.5 \Delta \chi_m B^2$ J/mole, where $\Delta G_m$ is the change of the free energy of reaction due to the magnetic field, $\Delta \chi_m$ is the difference in magnetic susceptibility of the products and reactants, and B is the magnetic induction in gauss. For the conversion of a diamagnetic species into a paramagnetic species, $\Delta \chi_m \leq 0.01$ cm$^3$/mole. In a 1 T (1 Tesla=10 kGauss) applied field, $|\Delta G_m| \leq 0.05$ J/mole. Even in the strongest laboratory fields of 10 T, the effect is negligible compared to typical free energies of reaction ($\approx$kJ/mole). These are macroscopic arguments for systems where the magnet is placed external to the cell and a uniform field is applied to the solution. Microscopically, it may be possible to argue that local fields in composites are substantial, and molecules in composites within a short distance of the source of the magnetic field experience strong local fields. For example, for a magnetic wire or cylinder, the magnetic field falls off over a distance, x, as $x^{-3}$. The field experienced by a molecule 1 nm from the magnet is roughly $10^{21}$ times larger than the field experienced at 1 cm. This argument is crude, but qualitatively illustrates the potential advantage of a microstructural magnetic composite. (As an example, in the magnetic/Nafion (DuPont) composites, a larger fraction of the redox species are probably transported through the 1.5 nm zone at the interface between the Nafion and the magnetic particles.) These redox species must therefore experience large magnetic fields in close proximity to the interface.

Kinetics

Reaction rates, k, are parameterized by a pre-exponential factor, A, and a free energy of activation, $\Delta G^\ddagger$; $k = A \exp[-\Delta G^\ddagger/RT]$. An externally applied, homogeneous magnetic field will have little effect on $\Delta G^\ddagger$, but can alter A. Nonadiabatic systems are susceptible to field effects. Magnetic fields alter the rate of free radical singlet-triplet interconversions by lifting the degeneracy of triplet states (affecting $\Delta G^\ddagger$); rates can be altered by a factor of three in simple solvents. Because magnetic coupling occurs through both electronic nuclear hyperfine interactions and spin-orbit interactions, rates can be nonmonotonic functions of the applied field strength. Photochemical and electrochemical luminescent rates can be altered by applied fields. For singlet-triplet interconversions, magnetic fields alter product distributions when they cause the rate of interconversion to be comparable to the rate free radicals escape solvent cages. These effects are largest in highly viscous media, such as polymer films and micellar environments. Larger effects should be observed as the dimensionality of the system decreases. For coordination complexes, photochemical and homogeneous electron transfer rates are altered by magnetic fields. Spin-orbit coupling is higher in transition metal complexes than organic radicals because of higher nuclear charge and partially unquenched orbital angular momentum of the d-shell electrons. The rate of homogeneous electron transfer between $Co(NH_3)_6^{3+}$ and $Ru(NH_3)_6^{2+}$ is below that expected for diffusion controlled reactions; in a 7 T magnetic field, the rate is suppressed two-to three-fold. It has been argued that $\chi_m$ (and $\Delta G_m$) is set by the magnetic susceptibility of the products, reactants, and activated complex, and a highly paramagnetic activated complex accounts for the field effect. For reversible electron transfer at electrodes in magnetic fields, no significant effect is expected. For quasireversible electron transfer with paramagnetic and diamagnetic species, electron transfer rates and transfer coefficients are unchanged by magnetic fields applied parallel to electrodes. Magnetic fields applied perpendicular to electrodes in flow cells generate potential differences, which just superimpose on the applied electrode potentials. Potentials of 0.25V have been reported. Reversing the applied magnetic field reverses the sign of the potential difference. This effect does not change standard rate constants, only the applied potential.

Mass Transport

Magnetically driven mass transport effects have been studied in electrochemical cells placed between the poles of large magnets. Effects vary depending on the orientation of the electrode, the relative orientation of the magnetic field and the electrode, forced or natural convection, and the relative concentrations of the redox species and electrolyte. Three cases are illustrated in FIGS. 1, 2 and 3.

For a charged species moving by natural or forced convection parallel to an electrode and perpendicular to a magnetic field which is also parallel to the electrode, a Lorentz force is generated which moves the charged particle toward the electrode. This magnetohydrodynamic effect is characterized by $$F=q(E+v\times B), \quad (1)$$

where F, B, v, and B are vectors representing the Lorentz force on the charged species, the electric field, the velocity of the moving species, and the magnetic field, respectively; q is the charge on the species. For flow cells and vertical electrodes, flux enhancements of a few-fold and reductions in the overpotential of a few tenths volts have been found in the presence of the magnetic field. Also, embedded in Equation 1 is the Hall effect; when a charged species moves through a perpendicular magnetic field, a potential is generated. This potential superimposes on the applied potential and causes migration in low electrolyte concentrations.

When the electrode and magnetic field are parallel to the earth, thermal motion leads to vortical motion at the electrode surface unless the field (B) and the current density (j) are spatially invariant and mutually perpendicular (see FIG. 2). This is parameterized as:

$$F_v=c^{-1}[j\times B]. \quad (2)$$

In Equation (2) $F_v$ is the vector of magnetic force per volume and c is the speed of light. In general, these forces are smaller than Lorentz forces; flux enhancements of a few-fold and potential shifts of 10 to 20 mV are observed. Flux enhancements of paramagnetic and diamagnetic species are similar, but paramagnetic electrolytes enhance the flux of diamagnetic $Zn^{2+}$ two-fold. Vortices suppress thermal motion and eddy diffusion.

The final configuration, shown in FIG. 3, is for the magnetic field perpendicular to the electrode surface, and, therefore, parallel to the electric field. Various, and sometimes inconsistent, results are reported for several configurations: for vertical electrodes in quiescent solution, flux enhancements of $\leq 1000\%$; for electrodes parallel to the earth with forced convection, flux retardations of 10%; and for electrodes parallel to the earth and no forced convection, both enhancements and no enhancements are reported.

This summarizes the thermodynamic, kinetic, and mass transport effects for systems where the magnetic field is applied uniformly across a cell with an external magnet. None of these macroscopic effects predict or address properties dependent on the magnetic susceptibility of the redox species Quantum mechanical effects may also be important, especially on short length scales.

Fuel Cells

Since the incomplete reduction of oxygen limits the efficiency of $H_2/O_2$ solid polymer electrolyte fuel cells, the cathode must be pressurized about five-fold over the anode.

Proton exchange membrane (PEM) fuel cell design is one which employs hydrogen as an anode feed and oxygen in air as a cathode feed. These fuels are decomposed electrically (to yield water) at electrodes typically modified with a noble metal catalyst. The hydrogen and oxygen are separated from each other by a proton exchange membrane (such as Nafion) to prevent thermal decomposition of the fuels at the noble metal catalysts.

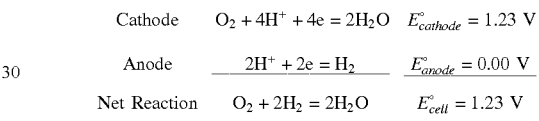

However, the fuel cell is typically run under non-equilibrium conditions, and, as such, is subject to kinetic limitations. These limitations are usually associated with the reaction at the cathode.

$$O_2+4H^++4e=2H_2O \ E°_{cathode}=1.23V$$

As the reaction at the cathode becomes increasingly kinetically limited, the cell voltage drops, and a second reaction path, the two electron/two proton reduction of oxygen to peroxide, becomes increasingly favored. This consumes oxygen in two electron steps with lower thermodynamic potential.

$$O_2+2H^++2e=H_2O_2 \ E°H_2O_2=0.68V$$

The standard free energy of this reaction is 30% of the free energy available from the four electron reduction of oxygen to water. The decrease in current associated with the decreased number of electrons transferred and the decreased cell potential couple to yield substantially lower fuel cell power output.

One approach to enhance the efficiency of the cathodic reaction is to increase the concentration pressure) of the feeds to the cathode—protons and oxygen—so as to enhance the flux (i.e., the reaction rate at the cathode in moles/cm²s) at the cathode. The proton flux is readily maintained at a sufficiently high value by the proton exchange membrane (usually Nafion) so as to meet the demand set by the cathode reaction. Normally, the method of enhancing the flux and biasing the reaction to favor the formation of water is to pressurize the air feed to the cathode. Pressures of 5-10 atmospheres are typical.

The need to pressurize air to the cathode in PEM fuel cells has been a major obstacle in the development of a cost effective fuel cell as a replacement for the internal combustion engine vehicle. In particular, pressurization of the cathode requires compressors. In transportation applications, power from the fuel cell is needed to run the compressor. This results in approximately 15% reduction in the power output of the total fuel cell system.

Batteries and Applications of Batteries

Rechargeable batteries can be charged and discharged many times. The applications of rechargeable batteries are diverse and include cellular/cordless phones, computers, portable electronic devices, uninterrupted power sources, power tools, electric vehicles, hybrid electric vehicles, load leveling, remote power generation and high speed-high density energy batteries.

In recent years, research has focused on the development of rechargeable alkaline batteries, which provide better performance and are more environmentally friendly than other rechargeable batteries. Boosted by advances in portable electronic devices, the technology of rechargeable batteries has developed for consumer applications. Prior to the 1980's, rechargeable batteries used by consumers were mainly nickel cadmium (Ni—Cd) or small sealed lead acid (Pb-acid). Cadmium, however, is a highly toxic metal and raises environmental concerns. With the successful development of metal hydride negative electrodes to replace the cadmium electrodes in Ni—Cd batteries, a new and environmentally less problematic, alkaline electrolyte system was born.

Since the late 1980's and early 1990's, the development of nickel metal hydride (Ni-MH) technology has provided an alternative to Ni—Cd batteries. Today, Ni-MH batteries are replacing Ni—Cd batteries in many applications; for instance, where a high specific energy is desired. It is expected that Ni-MH batteries will increasingly be used in portable, wireless electronics products and in high power and/or high capacity applications, displacing Ni—Cd in the battery market. This includes transportation applications where, recently, increased environmental concerns and the awareness of the rapid depletion of non-renewable petroleum reserves have compelled the automotive and motorcycle industries worldwide to take electric propulsion seriously.

Conventional combustion engine design has limited possibilities for improvement. For conventional combustion engines, the practical fuel efficiency is 20 to 30%; most fuel energy is wasted as heat. High emissions is another major problem. Transportation is a major contributor to greenhouse gas emissions and urban pollution. Increasing atmospheric concentrations of carbon dioxide lead to multiple global environmental problems, including global warming. Currently, governments are putting pressure on the auto industries because of the need for environmental protection and energy conservation. Increased vehicle fuel efficiency will lessen both of these problems. One option to resolve these problems is the use of electric vehicles and hybrid electric vehicles to replace internal combustion engine vehicles. Original interest in electric vehicles and hybrid electric vehicles arose mainly from the concern over atmospheric pollution. Studies show that transportation contributes approximately 40% of the total emissions. Because internal combustion engines are heat engines, it is not possible to reduce emission to zero. In 1973, the oil crisis reminded the world that the fossil fuel supplies were not infinite. It further facilitated the development for electric vehicles and hybrid electric vehicles to reduce the dependence on fossil fuel supply.

An electric vehicle is powered by electric power such as rechargeable batteries or fuel cells instead of an internal combustion engine. For battery powered electric vehicles, the vehicles are powered by the electric energy stored in rechargeable batteries. The electric energy is directly converted to mechanical energy. No other energy conversion process is involved for battery powered electric vehicles, thus the theoretical efficiency can be as high as 100%. Additionally, there are no emissions for battery powered electric vehicles. For fuel cell powered electric vehicles, the chemical energy stored in the fuel is converted to electricity directly by fuel cells. Practical fuel cell efficiency can reach around 40 to 60%; the theoretical efficiency is 100%. The only by-product for hydrogen powered fuel cells is water.

A hybrid electric vehicle (HEV), in the simplest terms, is a vehicle with two discrete power sources, typically referred to as the primary and auxiliary power sources. The primary power source for a hybrid electric vehicle is usually an internal combustion engine; the auxiliary power source is some type of energy-storage device, usually batteries, that can adsorb high, short bursts of current and discharge energy when necessary. In this design, the internal combustion engine is operated as much as possible at its maximum efficiency, thus minimizing emissions. When more power is needed, the auxiliary power source is called upon. The batteries used in HEVs must sustain large charge and discharge currents. The performance at high charge and discharge rates is crucial for the successful development of nickel metal hydride batteries in the electric vehicle and hybrid electric vehicle industries.

Currently, there are several models of commercial hybrid electric vehicles, such as Toyota Prius™ and Honda Insight™ in the U.S.A. auto market. High battery cost, lack of recharging infrastructure, limited range, and long recharging times limit commercial production of eclectic vehicles. Even though the electric vehicles are a much better option for transportation than internal combustion engine vehicles with respect to emissions, an internal combustion engine vehicle can be refueled in a minute or so, while recharging a battery powered electric vehicle takes hours with current technology, which is inconvenient for personal travel. At the current stage of battery technology, there is a limit to the rate at which a battery can accept charge. But with the development of rechargeable batteries and fuel cell research, electric vehicles are a promising technology for transportation applications.

The heart of electric vehicles and hybrid electric vehicles is the battery. An improved battery that weighs less, is more compact, stores more energy, lasts longer, recharges more rapidly, and costs less than existing ones is desirable.

Currently, there are two types of electrochemical power sources available for electric vehicles and hybrid electric vehicles, namely, the rechargeable battery and the fuel cell. A rechargeable battery consists of an assemblage of secondary cells that store electric energy as chemical energy and can be charged and discharged many times. Electric vehicle batteries, in current design, typically have voltages of 100 to 300 V.

A fuel cell consists of two electrodes that can catalyze the conversion of a particular fuel and an oxidant to electricity. Power can be drawn from the cell as long as fuels are supplied and the reaction products are removed for fuel cells.

Although fuel cells have a considerable advantage over rechargeable batteries in that they can be rapidly refueled in a manner similar to internal combustion engine vehicles, they are not a major choice for electric vehicles and hybrid electric vehicles in the near future because fuel cell technology is still immature.

Several types of rechargeable batteries have been tested for electric and hybrid electric vehicles. The main types of batteries are Ni-Metal Hydride (Ni-MH) rechargeable batteries, Pb-acid rechargeable batteries, Li-ion rechargeable batteries, and Ni—Cd rechargeable batteries. Even with improvements in battery performance, technological advances in vehicle design, and more efficient transmission and control systems, Pb-acid powered vehicles will not provide the speed and range available from internal combustion engine vehicles. Because of the high toxicity of cadmium and battery performance, Ni—Cd rechargeable batteries are not suitable for electric and hybrid electric vehicles. The safety characteristics and high cost of Li-ion rechargeable batteries make them an unsuitable choice for such applications. Among the aqueous batteries with potential to meet the near-term specific energy targets, Ni-MH rechargeable batteries are thought to provide the performance characteristics needed in electric and hybrid electric vehicles because of their high power density, high rate of discharge, long cycle life, and environmentally friendly chemistry. According to the U.S. Department of Energy (DOE) Partnership for a New Generation of Vehicle (PNGV) program, for the next decade or two, it is likely that the battery choice for near-term development of electric and hybrid electric vehicles will be Ni-MH batteries.

Ni-MH batteries for electric and hybrid electric vehicle applications have been under development for more than a decade and are being manufactured by several battery companies. Toyota commercialized EV RAV4L EV™ using a Ni-MH battery produced by Panasonic EV Energy in 1996. In 1997, Honda started to lease Ni-MH powered EVs (Honda EV Plus™) in Japan and the U.S.A. Currently in the U.S. market, the Prius™ from Toyota and Insight™ from Honda are the two major HEV models.

The performance of a nickel metal hydride rechargeable battery depends on many factors, including the active materials and its loading, electrode preparation, additives in each electrode, negative/positive capacity ratio, volume and concentration of alkaline electrolyte, separator, and cell activation. In general, a well-made Ni-MH battery shows very good electrochemical properties: high capacity, high working potential, excellent rate capacity, low self discharge rate, and long cycle life. In the current design of nickel metal hydride rechargeable batteries, battery capacity is generally limited by the nickel electrode for reasons of battery safety. In order to improve the actual performance of the nickel metal hydride batteries, a better performance of nickel hydroxide positive electrode is necessary to meet the requirements.

The Ni-MH battery is a unique rechargeable battery employing a negative electrode consisting of a metal alloy that stores hydrogen at high density. This battery was successfully commercialized by Sanyo and Matsushita in Japan in 1990 because of its higher energy density, high rate of discharge, long cycle life, lack of memory, and environmental cleanliness as compared to Ni—Cd batteries.

Since the discovery of hydrogen storage alloys such as $LaNi_5$ in about 1969, extensive research has been carried out. The Ni-MH battery was first brought into production in the late 1980's, as an environmentally more acceptable replacement for Ni—Cd batteries in consumer applications. Like Ni—Cd batteries, Ni-MH cells use a nickel positive electrode with $Ni(OH)_2$ as the active material and an aqueous KOH electrolyte. The main difference is that in the Ni-MH cells, the active material in the negative electrode is hydrogen absorbed in a metal alloy, which replaces the cadmium of Ni—Cd batteries.

A positive-limited cell enhances capacities and retains the well-characterized electrical and physical design features of the sealed nickel cadmium cell. The charge-discharge reactions in a Ni-MH battery proceed through a homogeneous solid-state mechanism where proton transfer occurs between nickel hydroxide and hydrogen storage alloy. This distinguishes Ni-MH cells from other batteries where the anode reaction proceeds through a dissolution-precipitation mechanism.

The high rate of charge and discharge of Ni—Cd and Ni-MH batteries is largely influenced by the internal resistance of the nickel electrode. The main reason for this is thought to be in the semiconducting properties of the nickel oxides, especially $Ni(OH)_2$. Attempts to reduce internal resistance include design control of the nickel substrate, the use of nickel hydroxide particles with high density, the addition of LiOH and/or $KBH_4$ to the electrolyte, and the addition of conductivity additives to the nickel hydroxide electrode.

Ni-MH batteries have replaced Ni—Cd batteries in many portable applications, due to their higher specific energy and energy density, as well as environmental cleanliness. Worldwide shipments for 1997 are estimated at over 570 million cells. The world production of Ni-MH batteries has continuously increased and reached approximately 1.2 billion in year 2000. The increase in the market for electronic equipment has sustained increased production. As regulations for the disposal of Ni—Cd batteries became stricter worldwide, the safety and cost advantages of Ni-MH batteries as well as their performance characteristics and excellent environmental compatibility, will promote the use of Ni-MH batteries in new and current application areas including HEVs, EVs, uninterrupted power suppliers (UPS), power-assisted bicycles, and electric tools.

Presently, state-of-the-art conventional Ni-MH cells have a specific energy of about 95 Wh $Kg^{-1}$ and a volumetric energy density of about 330 Wh $l^{-1}$. The specific power of the cells is about 200 W $kg^{-1}$ and the power density is about 485 W $l^{-1}$. State-of-the-art metal hydride electrodes are prepared from transition metal alloys with a non-traditional structure design that deliver a capacity of 550-650 Ah $Kg^{-1}$.

A nickel-metal hydride cell typically consists of four major components: the negative metal hydride electrode, the positive nickel electrode, the separator, and the electrolyte. Generally, both the nickel electrode and the metal hydride electrode are thin porous electrodes. In a nickel-metal hydride cell, the nickel electrode determines the cell capacity and the metal hydride electrode determines the cell cycle life.

The negative electrode is typically made of $AB_5$ or $AB_2$ based alloy powder, which is pasted onto either a nickel plated punched steel sheet or nickel foam. The theoretical capacity for a metal hydride electrode is around 40% higher than that of a cadmium electrode. As a result, nickel metal hydride batteries have 30 to 50 percent higher capacity than the equivalent nickel cadmium batteries.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is therefore an object of the invention to provide an improved electrode.

Another object of the invention is to provide a coating on an electrode to enhance the flux of magnetic species to the electrode.

Another object of the invention is to provide a separator to separate magnetic species from each other dependent upon magnetic susceptibility.

Another object of the invention is to provide a method for making a coating for an electrode to improve the flux of magnetic species to the electrode.

Another object of the invention is to provide an improved fuel cell.

Another object of the invention is to provide an improved cathode in a fuel cell.

Another object of the invention is to provide an improved battery.

Another object of the invention is to provide an improved membrane sensor.

Another object of the invention is to provide an improved flux switch.

Another object of the invention is to provide an improved fuel cell cathode with passive oxygen pressurization.

Another object of the invention is to provide an improved separator for separating paramagnetic species from diamagnetic species.

Another object of the invention is to provide an improved electrolytic cell.

Another object of the invention is to provide an improved electrolytic cell for an electrolyzable gas.

Another object of the invention is to provide an improved graded density composite for controlling chemical species transport.

Another object of the invention is to provide an improved dual sensor.

One advantage of the invention is that it can enhance the flux of paramagnetic species to an electrode.

Another advantage of the invention is that it can enhance the flux of oxygen to the cathode in a fuel cell, equivalent to passive pressurization.

Another advantage of the invention is that it can separate paramagnetic, diamagnetic, and nonmagnetic chemical species from a mixture.

Another advantage of the invention is that it can separate chemical species according to chemical, viscosity, and magnetic properties.

Another advantage of the invention is that it can take advantage of magnetic field gradients in magnetic composites.

Another advantage of the invention is that it can be designed to work with internal or external magnetic fields, or both.

One feature of the invention is that it includes a magnetically modified electrode.

Another feature of the invention is that it includes magnetic composites made from ion exchange polymers and non-permanent magnet microbeads with magnetic properties which are susceptible to externally applied magnetic fields.

Another feature of the invention is that it includes magnetic composites made from ion exchange polymers and organo-Fe (superparamagnetic or ferrofluid) or other permanent magnetic and nonpermanent magnetic or ferromagnetic or ferrimagnetic material microbeads which exhibit magnetic field gradients.

Another object of the present invention is to provide methods for making modified electrodes.

Another feature of the present invention is to provide magnetically modified electrodes and articles, such as batteries, including magnetically modified electrodes made according to the methods of the present invention. Such batteries include primary and secondary batteries. Examples of such batteries include, but are not limited to, nickel-metal hydride (Ni-MH) batteries, Ni—Cd batteries, Ni—Zn batteries and Ni—Fe batteries.

These and other objects, advantages and features are accomplished by a separator arranged between a first region containing a first type of particle and a second type of particle and a second region, comprising: a first material having a first magnetism; a second material having a second magnetism; a plurality of boundaries providing a path between the first region and the second region, each of the plurality of boundaries having a magnetic gradient within the path, the path having an average width of approximately one nanometer to approximately several micrometers, wherein the first type of particles have a first magnetic susceptibility and the second type of particles have a second magnetic susceptibility, wherein the first and the second magnetic susceptibilities are sufficiently different that the first type of particles pass into the second region while most of the second type of particles remain in the first region.

These and other objects, advantages and features are also accomplished by the provision of a cell, comprising: an electrolyte including a first type of particles; a first electrode arranged in the electrolyte; and a second electrode arranged in the electrolyte wherein the first type of particles transform into a second type of particles once the first type of particles reach the second electrode, the second electrode having a surface with a coating which includes: a first material having a first magnetism; a second material having a second magnetism; a plurality of boundaries providing a path between the electrolyte and the surface of the second electrode, each of the plurality of boundaries having a magnetic gradient within the path, the path having an average width of approximately one nanometer to approximately several micrometers, wherein the first type of particles have a first magnetic susceptibility and the second type of particles have a second magnetic susceptibility, and the first and the second magnetic susceptibilities are different.

These and other objects, advantages and features are also accomplished by the provision of a method of making an electrode with a surface coated with a magnetic composite with a plurality of boundary regions with magnetic gradients having paths to the surface of the electrode, comprising the steps of: mixing a first solution which includes a suspension of at least approximately 1 percent by weight of inert polymer coated magnetic microbeads containing between approximately 10 percent and approximately 90 percent magnetizable polymer material having diameters at least 0.5 micrometers in a first solvent with a second solution of at least approximately 2 percent by weight of ion exchange polymers in a second solvent to yield a mixed suspension; applying the mixed suspension to the surface of the electrode, the electrode being arranged in a magnetic field of at least approximately 0.05 Tesla and being oriented approximately 90 degrees with respect to the normal of the electrode surface; and evaporating the first solvent and the second solvent to yield the electrode with a surface coated with the magnetic composite having a plurality of boundary regions with magnetic gradients having paths to the surface of the electrode.

These and other objects, advantages and features are further accomplished by a method of making an electrode with a surface coated with a composite with a plurality of boundary regions with magnetic gradients having paths to the surface of the electrode when an external magnetic field is turned on, comprising the steps of: mixing a first solution which includes a suspension of at least 5 percent by weight of inert polymer coated microbeads containing between 10 percent and 90 percent magnetizable non-permanent magnet material having diameters at least 0.5 micrometers in a first solvent with a second solution of at least 5 percent of ion exchange polymers in a second solvent to yield a mixed suspension;

applying the mixed suspension to the surface of the electrode; evaporating the first solvent and the second solvent to yield the electrode with a surface coated with the composite having a plurality of boundary regions with magnetic gradients having paths to the surface of the electrode when an external magnet is turned on.

These and other objects, advantages and features are also accomplished by an electrode for channeling flux of magnetic species comprising: a conductor; a composite of a first material having a first magnetism and a second material having a second magnetism in surface contact with the conductor, wherein the composite comprises a plurality of boundaries providing pathways between the first material and the second material, wherein the pathways channel the flux of the magnetic species through the pathways to the conductor.

These and other objects, advantages and features are further accomplished by an electrode for effecting electrolysis of magnetic species comprising: a conductor; and magnetic means in surface contact with the conductor for enhancing the flux of the magnetic species in an electrolyte solution to the conductor and thereby effecting electrolysis of the magnetic species.

These and other objects, advantages and features are further accomplished by an electrode for effecting electrolysis of magnetic species comprising: a conductor; and means in surface contact with the conductor for enhancing the flux of the magnetic species to the conductor and thereby effecting electrolysis of the magnetic species.

These and other objects, advantages and features are yet further accomplished by an electrode for electrolysis of magnetic species comprising: a conductor; a composite magnetic material in surface contact with the conductor, the composite magnetic material having a plurality of transport pathways through the composite magnetic material to enhance the passage of the magnetic species to the conductor and thereby effecting electrolysis of the magnetic species.

These and other objects, advantages and features are also accomplished by a system, comprising: a first electrolyte species with a first magnetic susceptibility; a second electrolyte species with a second magnetic susceptibility; and a means for channeling the first electrolyte species with a first magnetic susceptibility preferentially over the second electrolyte species with a second magnetic susceptibility, wherein the means comprises a first material having a first magnetism forming a composite with a second material having a second magnetism.

These and other objects, advantages and features are also accomplished by a system for separating first particles and second particles with different magnetic susceptibilities comprising: a first magnetic material with a first magnetism; and a second magnetic material with a second magnetism working in conjunction with the first magnetic material to produce magnetic gradients, wherein the magnetic gradients separate the first particles from the second particles.

These and other objects, advantages and features are accomplished by a composite material for controlling chemical species transport comprising: an ion exchanger; a graded density layer, wherein the ion exchanger is sorbed into the graded density layer.

These and other objects, advantages and features are further accomplished by a magnetic composite material for controlling magnetic chemical species transport according to magnetic susceptibility comprising: an ion exchanger; a polymer coated magnetic microbead material; and a graded density layer, wherein the ion exchanger and the polymer coated magnetic microbead material are sorbed into the graded density layer.

These and other objects, advantages and features are further accomplished by a composite material for controlling chemical species viscous transport comprising: an ion exchanger; a graded viscosity layer, wherein the ion exchanger is sorbed into the graded viscosity layer.

These and other objects, advantages and features are further accomplished by a magnetic composite material for controlling magnetic chemical species transport and distribution comprising: an ion exchanger; a polymer coated magnetic microbead material; and a graded density layer, wherein the ion exchanger and the polymer coated magnetic microbead material are sorbed into the graded density layer forming a gradient in the density of the polymer coated magnetic microbead material substantially perpendicular to a density gradient in the graded density layer.

These and other objects, advantages and features are further accomplished by a magnetic composite material for controlling magnetic chemical species transport and distribution comprising: an ion exchanger; a polymer coated magnetic microbead material; and a graded density layer, wherein the ion exchanger and the polymer coated magnetic microbead material are sorbed into the graded density layer forming a gradient in the density of the polymer coated magnetic microbead material substantially parallel to a density gradient in the graded density layer.

These and other objects, advantages and features are also accomplished by an ion exchange composite with graded transport and chemical properties controlling chemical species transport comprising: an ion exchanger; and a staircase-like graded density layer having a first side and a second side, wherein the ion exchanger is one of sorbed into the graded density layer and cocast on the graded density layer and the staircase-like graded density layer and the ion exchanger are contained within the first side and the second side, wherein the first side is in closer proximity to the source of the chemical species and the second side is more distal to the source of the chemical species, and wherein the staircase-like graded density layer has lower density toward the first side and higher density toward the second side, substantially increasing in density in a direction from the first side toward the second side.

These and other objects, advantages and features are also accomplished by an ion exchange composite with graded transport and chemical properties controlling chemical species transport comprising: an ion exchanger; and a staircase-like graded density layer having a first side and a second side, wherein the ion exchanger is one of sorbed into the graded density layer and cocast on the graded density layer, and the ion exchanger and the stair case-like graded density layer are contained within the first side and the second side, wherein the first side is in closer proximity to the source of the chemical species and the second side is more distal to the source of the chemical species, and wherein the staircase-like graded density layer has higher density toward the first side and lower density toward the second side, substantially decreasing in density in a direction from the first side toward the second side.

These and other objects, advantages and features are accomplished also by a dual sensor for distinguishing between a paramagnetic species and a diamagnetic species comprising: a magnetically modified membrane sensor; and an unmodified membrane sensor, wherein the magnetically modified membrane sensor preferentially enhances the concentration of and allows the detection of the paramagnetic species over the diamagnetic species and the unmodified membrane sensor enhances the concentration of and allows the detection of the diamagnetic species and the paramagnetic species, enabling the measurement of the concentration of at least the paramagnetic species.

These and other objects, advantages and features are further accomplished by a dual sensor for distinguishing between a paramagnetic species and a nonmagnetic species comprising: a magnetically modified membrane sensor; an unmodified membrane sensor, wherein the magnetically modified membrane sensor preferentially enhances the concentration of and allows the detection of the paramagnetic species over the nonmagnetic species and the unmodified membrane sensor enhances the concentration of and allows the detection of the nonmagnetic species and the paramagnetic species, enabling the measurement of the concentration of at least the paramagnetic species.

These and other objects, advantages and features are further accomplished by a dual sensor for distinguishing between a first diamagnetic species and a second diamagnetic species comprising: a magnetically modified membrane sensor; and a differently magnetically modified membrane sensor; wherein the magnetically modified membrane sensor preferentially enhances the concentration of and allows the detection of the first diamagnetic species over the second diamagnetic species and the differently magnetically modified membrane sensor enhances the concentration of and allows the detection of the second paramagnetic species and the diamagnetic species, enabling the measurement of the concentration of at least the first diamagnetic species.

These and other objects, advantages and features are further accomplished by a dual sensor for distinguishing between a first paramagnetic species and a second paramagnetic species comprising: a magnetically modified membrane sensor; and a differently magnetically modified membrane sensor, wherein the magnetically modified membrane sensor preferentially enhances the concentration of and allows the detection of the first paramagnetic species over the second paramagnetic species and the differently magnetically modified membrane sensor enhances the concentration of and allows the detection of the second paramagnetic species and the first paramagnetic species, enabling the measurement of the concentration of at least the first paramagnetic species.

These and other objects, advantages and features are further accomplished by a dual sensor for distinguishing between a diamagnetic species and a nonmagnetic species comprising: a magnetically modified membrane sensor; and an unmodified membrane sensor, wherein the magnetically modified membrane sensor preferentially enhances the concentration of and allows the detection of the diamagnetic species over the nonmagnetic species and the unmodified membrane sensor enhances the concentration of and allows the detection of the nonmagnetic species and the diamagnetic species, enabling the measurement of the concentration of at least the diamagnetic species.

These and other objects, advantages and features are further accomplished by a flux switch to regulate the flow of a redox species comprising: an electrode; a coating on the electrode, wherein the coating is formed from a composite comprising: a magnetic microbead material with aligned surface magnetic field; an ion exchange polymer; and an electroactive polymer in which a first redox form is paramagnetic and a second redox form is diamagnetic, wherein the flux switch is actuated by electrolyzing the electro-active polymer from the first redox form ordered in the magnetic field established by the coating to the second redox form disordered in the magnetic field.

These and other objects, advantages and features are also accomplished by a flux switch to regulate the flow of a chemical species comprising: an electrode; and a coating on the electrode, wherein the coating is formed from a composite comprising: a non-permanent magnetic microbead material; an ion exchange polymer; and a polymer with magnetic material contained therein in which a first form is paramagnetic and a second form is diamagnetic, wherein the flux switch is actuated by reversibly converting from the paramagnetic form to the diamagnetic form when an externally applied magnetic field is turned on and off.

These and other objects, advantages and features of the present invention are accomplished by a method for forming a magnetically modified electrode, which comprises: providing a substrate comprising a magnetic material; and forming a coating layer on said substrate, wherein said coating layer comprises particles capable of generating electrochemical energy in the presence of a magnetic field.

These and other objects, advantages and features of the present invention are accomplished by a method for forming a magnetically modified electrode, which comprises: providing a substrate; and forming a coating layer on said substrate, wherein said coating layer comprises particles capable of generating electrochemical energy in the presence of a magnetic field and magnetic particles.

These and other objects, advantages and features of the present invention are accomplished by a method for forming a magnetically modified electrode, which comprises: providing a substrate; and forming a coating layer comprising particles capable of generating electrochemical energy in the presence of a magnetic field on said substrate, wherein said method further comprises subjecting said particles to an external magnetic field before, during or after forming said coating layer.

These and other objects, advantages and features of the present invention are accomplished a magnetically modified electrode, which comprises: a substrate and a coating layer formed on said substrate, wherein said coating layer comprises particles capable of generating electrochemical energy in the presence of a magnetic field and magnetic particles.

These and other objects, advantages and features of the present invention are accomplished a magnetically modified electrode, which comprises: a magnetic substrate and a coating layer formed on said substrate, wherein said coating layer comprises particles capable of generating electrochemical energy, in the presence of a magnetic field.

These and other objects, advantages and features of the present invention are accomplished a magnetically modified electrode, which comprises: a substrate and a coating layer formed on said substrate, wherein said coating layer comprises particles capable of generating electrochemical energy in the presence of a magnetic field and further wherein said particles capable of generating electrochemical energy in the presence of a magnetic field are subjected to an external magnetic field before, during or after said coating layer is formed on said substrate.

The above and other objects, advantages and features of the invention will become more apparent from the following description thereof taken in conjunction with the accompanying drawings.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
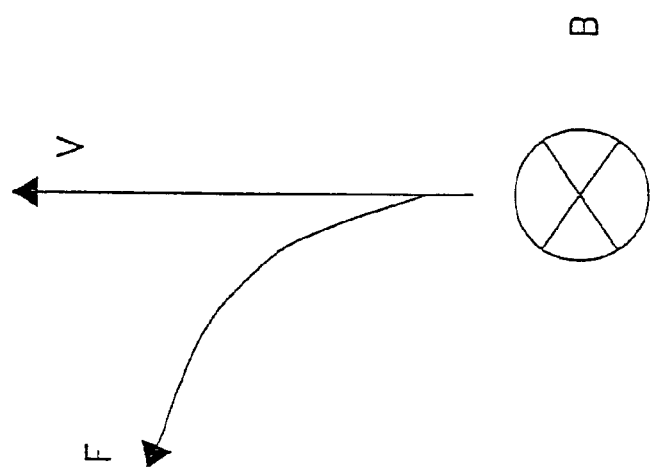
FIG. 1 shows the influence of electrode orientation and solvent motion on magnetohydrodynamic fluid motion for one geometry.

According to the present invention, it has been found that the performance of batteries may be improved by employing magnetically modified electrodes. Such magnetically modified electrodes provide improved electrode performance as compared to batteries not having magnetically modified electrodes. For instance, in rechargeable batteries, it has been found that magnetically modified electrodes provide decreased discharge and recharge times.

Such magnetically modified electrodes may be produced, for instance, by (1) employing an electrode substrate which includes a magnetic material and depositing particles capable of generating electrochemical energy in the presence of a magnetic field on the substrate; (2) incorporating particles capable of generating electrochemical energy in the presence of a magnetic field and magnetic particles into a coating layer on an electrode substrate; (3) subjecting particles capable of generating electrochemical energy in the presence of a magnetic field to magnetization before, during or after electrode manufacture; (4) providing an external magnet in association with a battery which includes in the electrode thereof particles capable of generating electrochemical energy in the presence of a magnetic field; or (5) any combination of the foregoing.

A first preferred embodiment of the present invention is directed to a method for forming a magnetically modified electrode, which comprises: providing a substrate comprising a magnetic material; and forming a coating layer on said substrate, wherein said coating layer comprises particles capable of generating electrochemical energy in the presence of a magnetic field.

A second preferred embodiment of the present invention is directed to a method for forming a magnetically modified electrode, which comprises: providing a substrate; and forming a coating layer on said substrate, wherein said coating layer comprises particles capable of generating electrochemical energy in the presence of a magnetic field and magnetic particles.

A third preferred embodiment of the present invention is directed to a method for forming a magnetically modified electrode, which comprises: providing a substrate; and forming a coating layer comprising particles capable of generating electrochemical energy in the presence of a magnetic field on said substrate, wherein said method further comprises subjecting said particles to an external magnetic field before, during or after forming said coating layer.

A fourth preferred embodiment of the present invention is directed to a magnetically modified electrode, which comprises: a substrate and a coating layer formed on said substrate, wherein said coating layer comprises particles capable of generating electrochemical energy in the presence of a magnetic field and magnetic particles.

A fifth preferred embodiment of the present invention is directed to a magnetically modified electrode, which comprises: a magnetic substrate and a coating layer formed on said substrate, wherein said coating layer comprises particles capable of generating electrochemical energy in the presence of a magnetic field.

A sixth preferred embodiment of the present invention is directed to a magnetically modified electrode, which comprises: a substrate and a coating layer formed on said substrate, wherein said coating layer comprises particles capable of generating electrochemical energy in the presence of a magnetic field and further wherein said particles capable of generating electrochemical energy in the presence of a magnetic field are subjected to an external magnetic field before, during or after said coating layer is formed on said substrate.

Suitable substrates according to the present invention include materials known in the art. Preferably the substrate is a conductor or an insulator, more preferably a conductor. Examples of suitable substrates include, but are not limited to, metals, carbon, such as graphite, zinc, semiconductors, semi-metals, magnetic materials and combinations thereof. Examples of suitable metals according to the present invention include transition metals, such as Ni, Fe, Zn or Cd and precious metals, such as Ag, Au, Pt, Ir, Ru, Rh, Os and Ir. Particularly preferred metal substrates include nickel and platinum, more preferably nickel. Additionally, the substrate may include a mixture of two or more metals, or a metal and a non-metal, such as a polymeric material. Other substrate according to the present invention include a metal matrix including magnetic particles.

In certain preferred embodiments of the present invention the substrate comprises a magnetic material. Examples of magnetic materials include, but are not limited to, Co, Ni, Fe, samarium cobalt, neodymium-iron-boron and combinations thereof Most preferably the substrate is nickel.

The substrate may be continuous with no openings therein, such as a rod, foil or sheet, or may be configured to have openings therein, such as a mesh or screen. The substrate can have any geometrical shape suitable for a predetermined use. Non-limiting examples of such geometries include rods (hollow or solid), circles, squares, triangles, rectangles and the like. In preferred embodiments of the present invention, the substrate is circular.

According to the present invention, the particles capable of generating electrochemical energy in the presence of a magnetic field include, but are not limited to, magnetizable particles, metals and the like. Examples of such particles include transition metal compounds, such oxides, carbonates and hydroxides. Suitable examples include, but are not limited to, nickel hydroxides, zinc hydroxides, cobalt oxides, lithium hydroxides, lithium carbonate, manganese oxides and combinations thereof In other preferred embodiments of the present invention, the particles are metal, most preferably lithium.

While any magnetic particles may be used according to the present invention, in preferred embodiments of the present invention, the magnetic particles are Co, Fe, Ni, samarium cobalt, such as $Sm_2Co_7$, neodymium-iron-boron, such as NeFeB and combinations thereof.

Other suitable particles according to the present invention include $AB_5$ alloys, such as $La_{0.9}Sm_{0.1}Ni_{2.0}Co_{3.0}$, and $AB_2$ alloys such as $Ti_{0.51}Zr_{0.49}V_{0.70}Ni_{1.18}Cr_{0.12}$ or $MmNi_{3.2}Co_{1.0}Mn_{0.6}Al_{0.2}$, where Mm is misch metal (25 wt. % La, 50 wt. %. Ce, 7 wt. % Pr and 18 wt. % Nd). Such materials can be used alone or in combination. In certain preferred embodiments of the present invention, the coating layer does not include $AB_5$ alloys. In another preferred embodiment of the present invention, the coating layer does not include $AB_2$ alloys. In yet another preferred embodiment of the present invention, the coating layer does not include $AB_5$ or $AB_2$ alloys. In another preferred embodiment of the present invention, the coating layer does not include $La_{0.9}Sm_{0.1}Ni_{2.0}Co_{3.0}$. According to the present invention, the coating layer includes either stoichiometric, such as $Sm_2Co_7$ or $Fe_3O_4$, or non-stoichiometric, such as $La_{0.9}Sm_{0.1}Ni_{2.0}Co_{3.0}$ particles.

In certain preferred embodiments of the present invention the coating layer includes a binder. Examples of suitable binders include, but are not limited to, polymers, KOH, NaOH, LiOH, fatty acids, liposomes and combinations thereof. Other suitable binders include chemically modified cellulosic polymers and polyacrylates. In certain preferred embodiments of the present invention, the binder is hydroxypropyl methylcellulose (HPMC), hydroxy methylcellulose, carboxymethyl cellulose, methyl cellulose, or combinations thereof Other examples of polymeric binders include polyvinylalcohol and polyethylene oxide. In other preferred embodiments of the present invention, the binder is HPMC.

In other preferred embodiments of the present invention, at least a portion of the magnetic particles are coated with an inert material. Suitable inert materials include those materials that do not adversely interact with the environment in which the particles are used. Such coatings can be used, for instance, to render the magnetizable particles inert to corrosive effects of solvents. Examples of inert materials suitable in practicing the present invention include, but are not limited to, substituted and unsubstituted polystyrenes, silanes and combinations thereof. Preferably, the inert material is a silane. Preferred silane coatings include trialkoxysilanes, more preferably 3-aminopropyltrimethoxysilane. In certain preferred embodiments of the present invention, the magnetizable particles are silane coated $Fe_3O_4$ or NdFeB. According to the present invention, the polymer coatings are preferably cross-linked. Such coatings may be made by methods known in the art. For example, silane coated magnetizable particles can be made as disclosed in PCT WO01/99127, the disclosure of which is incorporated by reference herein where appropriate for teachings of additional or alternative details, features and/or technical background.

A preferred embodiment of the present invention is directed to a method of making a magnetically modified electrode, which comprises providing a substrate comprising a magnetic material; and forming a coating layer on said substrate, wherein the coating layer comprises particles capable of generating electrochemical energy in the presence of a magnetic field.

Another preferred embodiment of the present invention is directed to a method for forming a magnetically modified electrode, which comprises providing a substrate; and forming a coating layer on said substrate, wherein said coating layer comprises particles capable of generating electrochemical energy in the presence of a magnetic field and magnetic particles.

Still another preferred embodiment of the present invention is directed to a method for forming a magnetically modified electrode, which comprises: providing a substrate; and forming a coating layer comprising particles capable of generating electrochemical energy in the presence of a magnetic field on said substrate, wherein said method further comprises subjecting said particles to an external magnetic field before, during or after forming said coating layer.

According to the methods of the present invention, the coating layer is preferably formed by mixing particles capable of generating electrochemical energy in the presence of a magnetic field, a solvent and, optionally, a binder and applying the mixture to at least a portion of a substrate. Optionally, the mixture may be dried for a time effective to remove at least a portion of the solvent from the mixture. The components of the mixture can be mixed in any order.

In certain preferred embodiments of the present invention, the binder is dissolved in the solvent and then the particles capable of producing electrochemical energy in the presence of a magnetic field are added to the solution. Preferably, the solvent is heated prior to addition of the binder. More preferably, the solvent is heated to boiling prior to addition of the binder. In other preferred embodiments of the present invention, the solvent is cooled below room temperature prior to addition of the binder.

Solvents suitable in practicing the present invention include any solvent capable of dissolving the binder, if employed, that do not adversely the particles of the coating layer. Examples of suitable solvents include non-polar and polar solvents. Preferably, the solvent is polar. Non-limiting examples of preferred solvents include water; alkanes, such as benzene, toluene and hexane; and alcohols, such as methanol, ethanol, isopropanol and t-butanol. In certain preferred embodiments of the present invention, the solvent is water. Such solvents can be used alone or in combination.

While the size of the magnetic particles is not limited, in certain preferred embodiments of the present invention, the magnetic particles have sizes ranging from about 1 micron to about 20 microns, preferably about 2 to about 15 microns and more preferably about 5 to about 10 microns.

Similarly, while the size of the particles capable or producing electrochemical energy in the presence of a magnetic filed is not limited, in certain preferred embodiments of the present invention, such particles have sizes ranging from about 1 micron to about 20 microns, preferably about 2 to about 15 microns and more preferably about 5 to about 10 microns. In certain preferred embodiments of the present invention, nickel hydroxide particles having a diameter of about 9 to about 12 microns are used.

In preferred embodiments of the present invention, the particles capable of generating electrochemical energy in the presence of a magnetic field are nickel hydroxide. Preferably, the coating layer includes nickel hydroxide and magnetic particles. Preferably the magnetic particles are at least one of cobalt, samarium cobalt compounds, such as $Sm_2Co_7$, iron oxide, such as $Fe_3O_4$, iron-neodymium-boron compounds, such as NdFeB, or combinations thereof.

According to certain preferred embodiments of the present invention, the magnetic particles are present in an amount of from about 0.1 wt. % to about 50 wt. % of the total magnetizable particles, more preferably about 1 to about 30 wt. %, still more preferably about 3 to about 25 wt. % and most preferably about 5 to about 15 wt. %, based on the total weight of particles. In preferred embodiments of the present invention the coating layer comprises the balance nickel hydroxide, based on the total weight of the magnetizable particles. In particularly preferred embodiments of the present invention, coating layer comprises about 5 wt. % to about 10 wt. % of $Fe_3O_4$, NdFeB, Co or $Sm_2Co_7$ and the balance nickel hydroxide.

In embodiments of the present invention employing a mixture of particles, it is preferable to shake or stir the mixture prior to use. For instance, in preferred embodiments of the present invention, the magnetizable particles are weighed and placed into a container and the container is sealed. The container is then shaken at a rate and for a time effective to form a heterogeneous mixture of magnetizable particles. In a preferred embodiment of the present invention, the container is shaken at a rate of about 1,000 oscillations per minute for about 30 minutes.

In addition to the foregoing, the coating layer may include additives. Non-limiting examples of such additives include stabilizers, gelling agents, surfactants, cross-linking agents, viscosity reducing agents, viscosity enhancing agents, agents that enhance drying and other compounds or materials that affect the physical properties of the mixture.

In practicing the methods of the present invention, at least a portion of the mixture comprising a solvent, a non-ionic polymer and magnetizable particles is applied to a substrate. Depending upon the volume of the mixture, the entire mixture or a portion thereof is applied to a substrate. The mixture is applied to the entire surface of the substrate or a lesser portion thereof.

The mixture is applied to the substrate by methods known in the art. Suitable methods include spray coating, spin coating, painting, drop depositing, decal transferring, laminating, rolling and the like. In preferred embodiments of the present invention, the mixture is applied by spreading a wet slurry onto the substrate and allowing the slurry to dry.

According to the present invention, the mixture preferably is dried following application to the substrate. Preferably, the mixture is dried for a time effective to remove at least a portion of the solvent therefrom. More preferably, the mixture is dried for a time effective to remove substantially all of the solvent.

The mixture may be dried at a temperature suitable for evaporation of the particular solvent used. Preferably the mixture is dried at room temperature. In other preferred embodiments of the present invention, the mixture is dried with heating. In certain preferred embodiments of the present invention, the mixture is dried under vacuum. In still other preferred embodiments of the present invention, the mixture is dried with heating and under vacuum.

According to certain preferred methods of the present invention, the particles capable of producing electrochemical energy in the presence of a magnetic field are subjected to an external magnetic field before, during or after forming the coating layer. The magnetic field is applied, for instance, by use of a permanent magnet or an electromagnet. For instance, a magnet is brought near or in contact with a substrate having a mixture applied thereto. Alternatively, a magnet is immersed into the container holding the mixture. In another preferred embodiment of the present invention, a circular permanent magnet is placed around the coated substrate. Examples of suitable permanent magnets include, but are not limited to, neodymium-iron-boron magnets and iron oxide magnets.

In other preferred embodiments of the present invention, prior to forming the coating mixture, the particles capable of producing electrochemical energy in the presence of a magnetic field are exposed to an external magnetic field. In certain preferred embodiments, a magnetic field is not applied before, during or after forming said coating layer.

Preferably, the magnetic field strength is about 0.05 to about 2.0 T, more preferably about 0.1 to about 1.0 T and even more preferably about 0.2 to about 0.5 T. In certain preferred embodiments of the present invention, the magnetic field strength is about 0.2 T.

Another preferred embodiment of the present invention is directed to a magnetically modified electrode, which comprises: a substrate and a coating layer formed on said substrate, wherein said coating layer comprises particles capable of generating electrochemical energy in the presence of a magnetic field and magnetic particles.

Another preferred embodiment of the present invention is directed to a magnetically modified electrode, which comprises: a magnetic substrate and a coating layer formed on said substrate, wherein said coating layer comprises particles capable of generating electrochemical energy in the presence of a magnetic field.

Still another preferred embodiment of the present invention is directed to a magnetically modified electrode, which comprises: a substrate and a coating layer formed on said substrate, wherein said coating layer comprises particles capable of generating electrochemical energy in the presence of a magnetic field and further wherein said particles capable of generating electrochemical energy in the presence of a magnetic field are subjected to an external magnetic field before, during or after said coating layer is formed on said substrate.

In preferred embodiments of the present invention, the electrodes are used in a battery comprising a positive electrode, a negative electrode and an electrolyte. Such batteries include, but are not limited to, Ni—Cd batteries, Ni—Fe batteries, Ni—Zn batteries and nickel metal hydride (Ni-MH) batteries. The electrode can be a positive electrode or a negative electrode. According to the present invention, batteries having magnetized electrodes exhibit improved properties compared to batteries not having magnetized electrodes. For instance, magnetized nickel electrodes including a nickel substrate coated with nickel hydroxide particles exhibit improved properties compared to non-magnetized electrodes.

Nickel Metal Hydride Batteries

Currently, most consumer Ni-MH batteries utilize $AB_5$ alloys as the active material for the negative electrode. The $AB_5$-type alloys appear to offer the best set of features for commercial nickel metal hydride cell applications, but $AB_2$-type alloys yield superior energy storage densities. The commonly used $AB_5$ alloys are able to deliver a capacity of around 300 Ah kg$^{-1}$, while $AB_2$-type alloys can deliver a capacity of about 450 Ah kg$^{-1}$. However, the production of $AB_2$ alloys is more complex, the alloy itself being more susceptible to corrosion.

Nickel hydroxide is used as the active material in nickel metal hydride battery positive electrodes. Because the nickel metal hydride battery capacity is positive electrode controlled, the performance of nickel metal hydride batteries is strongly influenced by the nickel electrode. Additives such as nickel metal, cobalt, and cobalt oxide are sometimes used.

The electrochemical reaction schemes of nickel hydroxide in the nickel metal hydride batteries are not completely understood. During the charge-discharge, the electrochemical mechanism is as follows:

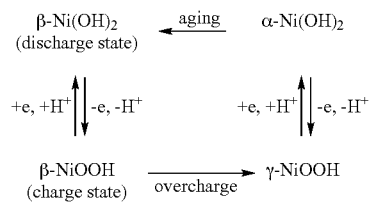

The reactions for the nickel hydroxide positive electrode in a nickel metal hydride battery can be represented by the following:

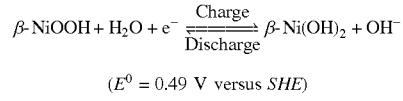

In the preparation of the nickel electrode, discharge-state β-Ni(OH)$_2$ is used because it is stable in alkaline electrolytes and has a good reversibility to β-NiOOH. β-Ni(OH)$_2$ has a hexagonal brucite structure with an inter-sheet distance of 4.6 Å. β-NiOOH has a similar structure to β-Ni(OH)$_2$ and the lattice constant of inter-sheets is 4.85 Å.

The theoretical oxidation state of nickel is +2 in β-Ni(OH)$_2$ and +3 in β-NiOOH. In the charge/discharge process, both electrons and protons are exchanged and the processes are thought to be controlled by bulk solid diffusion of protons. The mechanism involves an equivalent diffusion of hydrogen ions through the solid-state lattices of β-Ni(OH)$_2$ and β-NiOOH so that there is a continuous change in the composition of the active material between fully charged β-NiOOH and fully-discharged β-Ni(OH)$_2$. However, under real conditions, the average nickel oxidation state of β-NiOOH is ~2.8, and only 0.8 electrons are available in β-Ni(OH)$_2$/β-NiOOH conversion.

Nickel oxyhydroxide (NiOOH) is thermodynamically unstable in the nickel metal hydride battery. Oxygen evolution occurs at the positive electrode as a parallel and competing reaction in the charge process. The parasitic reaction is represented as follows:

$$4OH^- \rightarrow 2H_2O + O_2 + 4e^-$$

Figure 21:
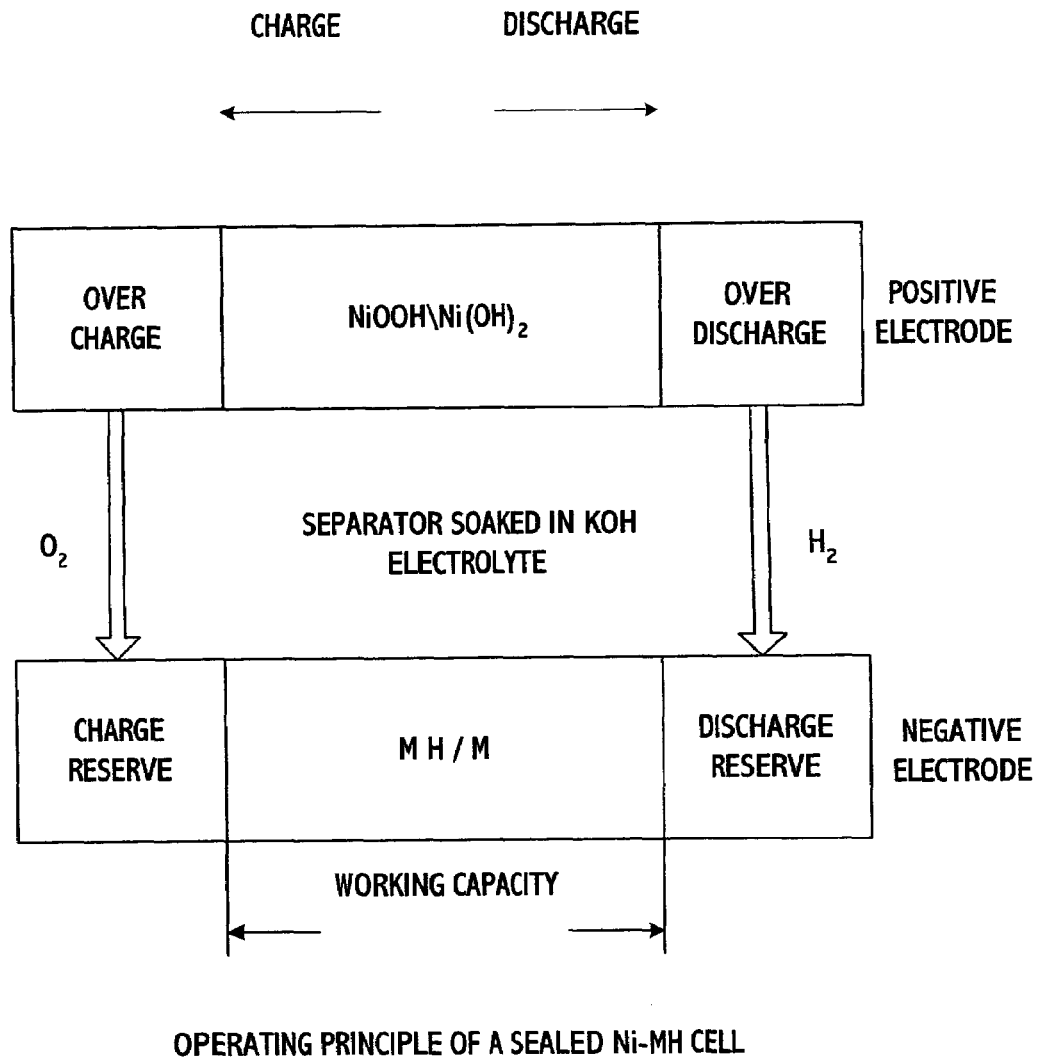
FIG. 21 shows the operating principle of a nickel-metal hydride battery.

To ensure proper functioning of a sealed Ni-MH battery, the capacity of a nickel metal hydride battery is limited by the nickel positive electrode. The negative electrode to positive electrode capacity ratio typically varies between 1.3 and 2.0. This means that the negative electrode has extra capacity. When a battery is charged, the positive electrode will reach full capacity first. If the charge process continues, oxygen evolves. The oxygen gas then diffuses to the negative electrode where it is recombined to form water. This oxygen cycle is very important for sealed nickel metal hydride battery applications. The mechanism is shown in FIG. 21.

Accordingly, the overall cell reaction for a nickel metal hydride battery is charge.

$$NiOOH + MH \underset{discharge}{\overset{}{\rightleftharpoons}} Ni(OH)_2 + M$$

Overall, this is a one electron process with a standard potential of about 1.32 V. The charge state active material for nickel positive electrode is NiOOH and the discharge state is Ni(OH)$_2$.

The electrolyte in a nickel metal hydride cell is typically a concentrated potassium hydroxide (KOH) solution. Typical KOH solutions include, but are not limited to, 30 wt. % potassium hydroxide, since such solutions have good ionic conductivity over a wide range of temperatures. In addition to KOH, additives such as LiOH or KBH$_4$ may be added to the electrolyte. The addition of LiOH can increase the stability of the nickel hydroxide positive electrode, and the KBH$_4$ can react with the oxide layer of the negative electrode.

During the charge and discharge cycle of a Ni-MH battery, there is no net change in the electrolyte quantity or concentration. Water is generated during charge and consumed during discharge.

A separator is used in batteries to separate the positive electrode from the negative electrode. Examples of suitable materials for the separator include, but are not limited to, sulphonated or carbonated polypropylene. Such materials show good resistance to oxidation during charge and discharge cycles.

FIG. 21 gives the basic operating principle of a sealed Ni-MH rechargeable battery. Normally, in nickel metal hydride battery, the negative electrode has extra capacity to avoid hydrogen gas generation during overcharge and oxygen gas generation during overdischarge.

In charging, at the negative electrode in the presence of the alloy and with an electrical potential applied, a hydrogen atom adsorbs on the surface of the alloy by electrolysis of water. The hydrogen atom diffuses into the metal and is stored in the alloy. The alloy is reduced to an alloy hydride, forming hydroxyl ions. The mechanism is illustrated below:

$$M + H_2O + e^- \rightarrow MH + OH^-$$

At the positive electrode, nickel hydroxide is oxidized to nickel oxyhydroxide. The hydroxide ion combines with the hydrogen from the nickel hydroxide to form water, as follows:

$$\beta\text{-Ni(OH)}_2 + OH^- \rightarrow \beta\text{-NiOOH} + H_2O + e^-$$

At the negative electrode, hydrogen is desorbed and combines with hydroxyl ion to form water, as shown below:

$$MH + OH^- \rightarrow M + H_2O e^-$$

At the positive electrode, nickel oxyhydroxide is reduced to nickel hydroxide.

$$\beta\text{-NiOOH} + H_2O + e^- \rightarrow \beta\text{-Ni(OH)}_2 + OH^-$$

Because there is no net change in the electrolyte concentration or quantity, maintenance of electrolyte concentration results in good gas recombination, good high and low temperature performance, and good cycle life.

Once the battery is fully charged or discharged, if current is forced to flow through the battery, an overcharge or overdischarge process proceeds. Because both overcharge and overdischarge are harmful to battery performance, they are minimized in battery operation.

When the cell is fully charged, the Ni(OH)$_2$ is almost used up. As the charge process goes on, the overcharge reactions proceed. On overcharge, in the positive electrode, β-NiOOH transforms irreversibly to γ-NiOOH. The oxidation state of nickel in γ-NiOOH is +3.7. γ-NiOOH is electrochemically reversible with α-Ni(OH)$_2$. Because a large number of electrons are exchanged per nickel atom during the α⇔γ phase transition, a higher theoretical capacity is expected for a nickel positive electrode comprising α-Ni(OH)$_2$. However, in an alkaline medium, α-Ni(OH)$_2$ transforms to β-Ni(OH)$_2$ on aging, resulting in the loss of positive electrode capacity. γ-NiOOH contains Ni$^{4+}$ and has a lattice constant of about 7 Å. Thus, the conversion of β-Ni(OH)$_2$ to γ-NiOOH is accompanied by a large volumetric change during overcharge process and this may result in loss of contact between the active materials, thus causing capacity loss during charge-discharge cycling. Therefore, overcharging of the electrode is avoided in battery applications.

Besides the conversion of β-Ni(OH)$_2$ to γ-NiOOH on overcharge, the oxygen evolution reaction also occurs. Hydroxide ion is forced to lose electrons to form oxygen gas during the overcharge process, which causes the buildup of oxygen gas. For a sealed nickel metal hydride battery, the oxygen gas needs to cross the separator and move to the negative electrode where it reacts with the metal hydride. These reactions during cell overcharge are represented as follows:

$$4OH^- \rightarrow 2H_2O + O_2 + 4e^-$$

$$M + H_2O + e^- \rightarrow MH + OH^-$$

$$4MH + O_2 \rightarrow 4M + 2H_2O$$

Thus, the oxygen that crosses the cell consumes the charge of the negative electrode.

After the battery is completely discharged, an overdischarging process proceeds if the battery is forced to discharge further. Under deep-discharge conditions, due to the difference in storage capacities of the positive and negative electrodes, hydrogen evolution occurs at the positive electrode which is oxidized to water at the negative electrode. The reactions during the overdischarge process can be represented as follows:

$$H_2O + e^- \rightarrow \tfrac{1}{2}H_2 + OH^-$$

$$MH + OH^- \rightarrow M + H_2O + e^-$$

$$H_2 + 2OH^- \rightarrow 2H_2O + 2e^-$$

Thus, there are recombination mechanisms for both oxygen and hydrogen evolved during overcharge and overdischarge, respectively, permitting sealed operation of the Ni/MH batteries. Both reactions, however, reduce the charge on the negative electrode.

Magnetic effects on chemical reactions have been examined for many years. See, e.g., Turro et al., *Magnetic Field and Magnetic Isotope Effects in Organic Photochemical Reactions. A Novel Probe of Reaction Mechanisms and a Method for Enrichment of Magnetic Isotopes* Accounts of Chemical Research 1980, 13, 369-377 and Buckachenko, A L. *Magnetic Effects in Chemical Reactions*, Ress. Chem. Rev. 1976, 45, 373-390. The field effect on fuel cells has been studied during the last several years. See, Leddy et al., *Magnetically Modified Fuel Cells*, in 39*th Power Sources Proceedings;* 2000 pages 144-147. It has been shown that magnetic modification enhances fuel cell performance. Enhancements are most substantial in the kinetically controlled region above 0.5 V where power is increased several fold over similarly formed nonmagnetic fuel cells.

Gu and coworkers have identified three limitations to Ni-MH cell performance: finite diffusion rates inside the active material particles (Ni(OH)$_2$/NiOOH and ABE), ohmic drop in the electrolyte associated with ion motion in a viscous matrix, and charge transfer processes at the electrode/electrolyte interfaces, see, e.g., Gu et al., *Modeling Discharge an Charge Characteristics of Nickel-Metal Hydride Batteries*, Electrochimica ACTA 1999, 146, 2769-2779. According to the present invention, magnetic modification of the electrodes have the largest impact on processes at the electrode/electrolyte interface.

The film thickness an important parameter in determining the utilization of the active electrode material. It is reported that for the Ni(OH)$_2$ coated Pt electrodes, especially with electrodes having high Ni(OH)$_2$ content, only the material close to the Pt surface participates in the charging-discharging processes, while the outer part of Ni(OH)$_2$ film remains inactive. According to the present invention, magnetic fields can enhance the utilization of the Ni(OH)$_2$, and other magnetizable particles. While not wishing to be bound by theory, it is thought that in the presence of a magnetic field, the electron transmission between Ni(OH)$_2$ and NiOOH is faster than for non-magnetized electrodes. For the magnetized electrodes, the materials close to the Pt surface can pass through the electrons to inner materials faster, thus improving the electrode performance. As noted above, common additives for nickel metal hydride batteries include cobalt and nickel. These materials are magnetizable, although they are not magnetized in conventional nickel-metal hydride batteries. According to the present invention, the electrode is intentionally magnetized. While not wishing to be bound by theory, it is thought that such magnetization promotes interfacial electron transfer reactions.

Interfacial Gradients in General

It has been found that interfacial gradients of concentration, charge, dielectric constant, and potential tend to establish strong, interfacial forces which decay over a microstructural distance (1 to 100 nm). (For example, for an applied potential of 10 mV to 100 mV past the potential of zero charge at an electrode in 0.1 M aqueous electrolyte, the interfacial potential gradient (|electric field|) is $10^5$ V/cm to $10^6$ V/cm, but it decays over a distance of about 1 nm.) In a homogeneous matrix, with few interfaces, interfacial gradients have a negligible effect on bulk material properties. However, in a microstructured matrix where the ratio of surface area to volume is high, interfacial gradients can have a large effect on, or even dictate the properties of a composite. Models appropriate to the description of bulk materials have been found to be unsatisfactory when applied to these composites. Moreover, such composites provide an opportunity to design matrices to perform functions and exhibit properties not found in homogeneous materials as will be discussed.

The effects of gradients, associated with the interfaces between the ion exchanger and its support matrix, to enhance the transport of ions and molecules have been studied in ion exchange polymer composites. The composites were formed by sorbing ion exchange polymers into high surface area substrates with well-established geometries. The flux of solutes through the composites was determined voltammetrically. When the solute flux through the ion exchange portion of the composites and the flux through simple films of the ion exchanger were compared, flux enhancements were observed. These enhancements were often greater than an order of magnitude. Consistently, the ratio of surface area of the substrate to the volume of sorbed ion exchanger (SA/Vol) has been the critical factor in quantifying the flux enhancements. The flux enhancement characteristics were found to be dominated by the interface between the ion exchanger and the support. Several interfacial gradients have so far been identified as important: concentration gradients, leading to surface diffusion; electric potential gradients, leading to migration; and magnetic field gradients, leading to flux enhancements and electric potential shifts at electrodes.

Forming Composites

Composites were made by intimately mixing two or more components to form a heterogeneous matrix as will be discussed in more detail below. While composites retain some characteristics of their components, properties distinct from those of the starting materials have been demonstrated that make composites of special interest.

Results

The impact of microstructure on transport and selectivity in ion exchange polymers and their composites has been found to be significant. Novel characteristics arose not from the individual components of the composites, but from gradients established at the interfaces between the components. Ion exchange polymers with inherent microstructure, such as Nafion, exhibit superior transport, selectivity, and stability characteristics compared to polymers with no inherent microstructure, such as poly(styrene sulfonate). When ion exchange polymers were supported on inert substrates with microstructural (5 to 100 nm) features similar in length scale to the microstructural features of the ion exchanger (e.g., 5 nm micelles in Nafion), the structure of the ion exchanger was disrupted in an ordered manner. The relationship between the flux characteristics of the composites and the microstructure imposed by the substrates has yielded information about how microstructure contributes to the properties of ion exchangers. This relationship allows the specification of design paradigms for tailoring composites with specific transport and selectivity characteristics.

Surface Diffusion

The first composites studied were formed by sorbing Nafion into the collinear cylindrical pores of neutron track etched polycarbonate membranes. The ion exchange polymer, Nafion is a perfluorinated, sulfonic acid polymer with the following structure:

The $SO_3^-$ groups adsorb on the inert substrates to form a loosely packed monolayer of perfluorinated alkyl chains, $OCF_2CF_2OCF_3CF_2SO_3^-$, shown above in boldface. This creates a unique interfacial zone approximately 1 to 2 nm thick along the edge formed between the ion exchange polymer and the inert substrate. In systems with high ratio of surface area to volume, a large fraction of the molecules and ions which passed through these composites actually moved through this interfacial zone. That is, it was found that the molecules and ions have higher flux in this thin interfacial zone, where the interfacial fields were strongest.

Figure 4A:
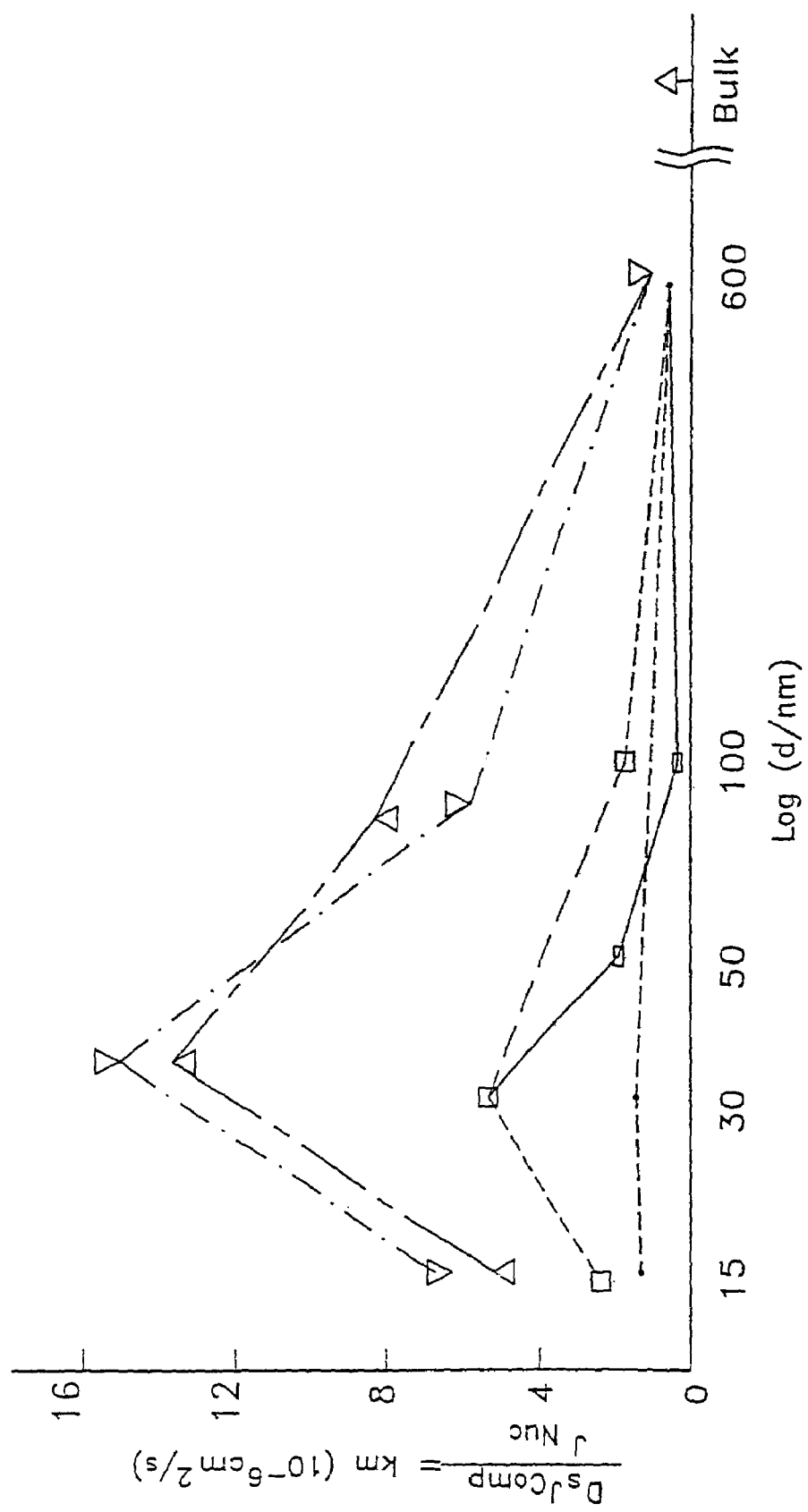
FIGS. 4A and 4B show plots of 6m values for neutron-track etched polycarbonate/Nafion composites versus functions of pore diameter, d.

In a given membrane, all pores had approximately the same diameter, d, ranging between 15 and 600 nm. The flux of electro-active species through the composites was determined by rotating disk voltammetry. In rotating disk voltammetry, the product $6m(cm^2/s)$ parameterizes the flux of a redox species through the Nafion portion of the composites, where 6 is the partition coefficient of the species into the Nafion and $m(cm^2/s)$ is its mass transport coefficient. Simple Nafion films cast directly onto the electrode were also studied. The resulting plots of 6m as a function of log(d) are shown in FIG. 4A. As indicated in FIG. 4A, as the pore diameter decreased towards 30 nm, the flux through the Nafion portion increased as much as 3600% over the simple films. These studies showed that the interface between Nafion and a support matrix was pivotal in determining the flux characteristics of the composites.

Figure 4B:
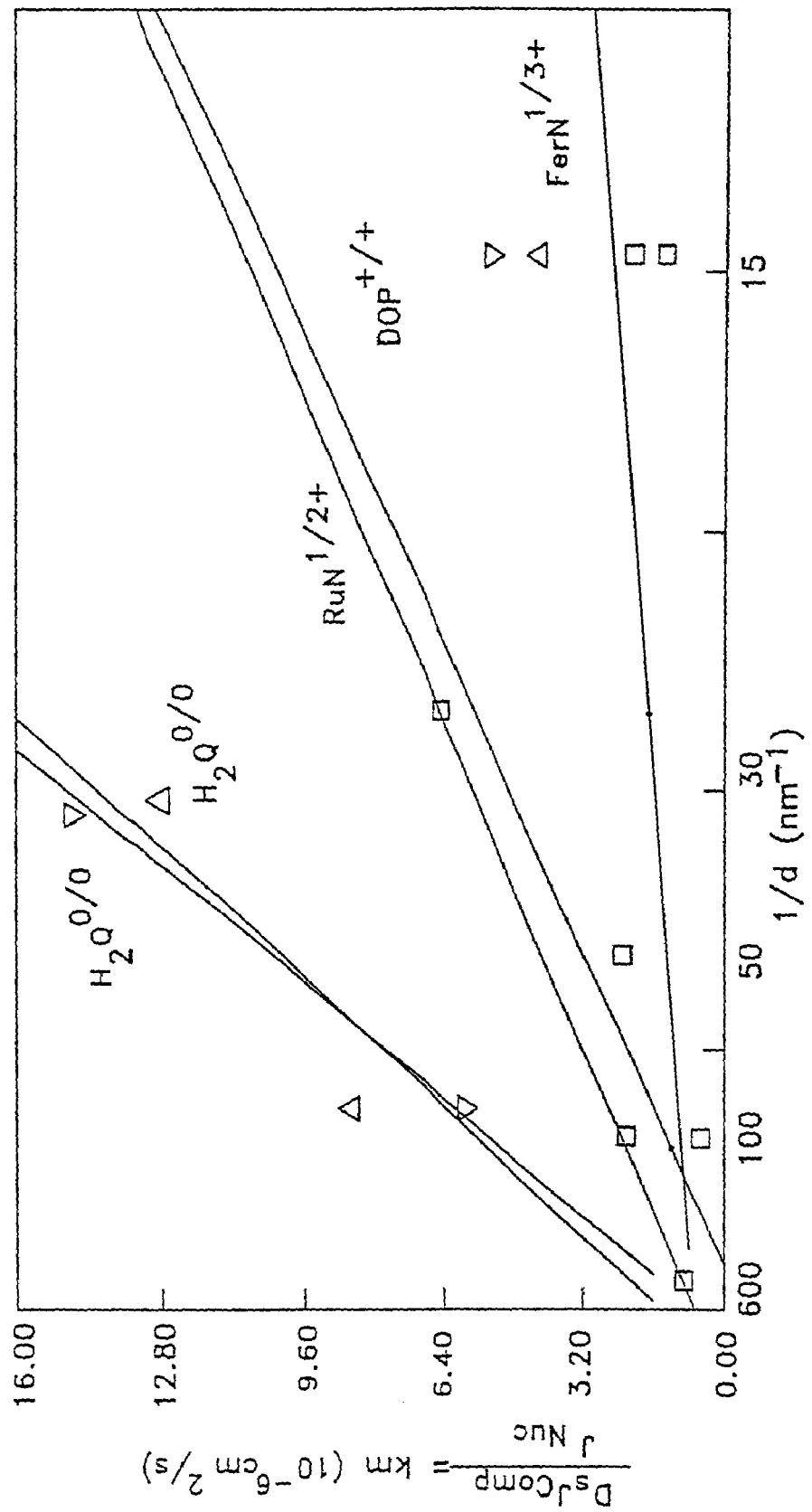

The flux enhancement model proposed here depends on the interface formed between the Nafion and the polycarbonate providing facile transport pathway to the electrode for the redox species. Bulk Nafion located in the center of the pore had a smaller transport coefficient (m) than the support matrix wall, but provided a volume to extract redox species from the center of the pore to feed the wall transport zone. The critical parameter for flux enhancement was found to be (for a cylindrical cross section path) the ratio of the surface area of the wall providing facile transport ($\pi d\lambda$), where 8 is the layer thickness, to the volume of Nafion feeding the interface ($\pi d^2\lambda/4$), i.e., 4/d. Plots of 6m versus 1/d are shown in FIG. 4B. Note that the plots are linear in FIG. 4B for d≧30 nm, and with the exception of dopamine, the intercepts as d→∞(1/d →0) correspond to 6m for bulk Nafion.

Figure 5B:
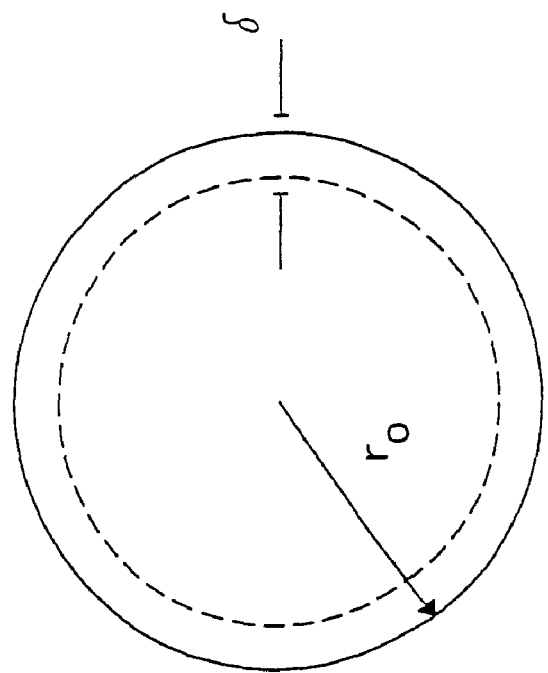
FIGS. 5A and 5B show the surface diffusion model assuming no limitations to the transport rate in the radial direction.
Figure 5A:
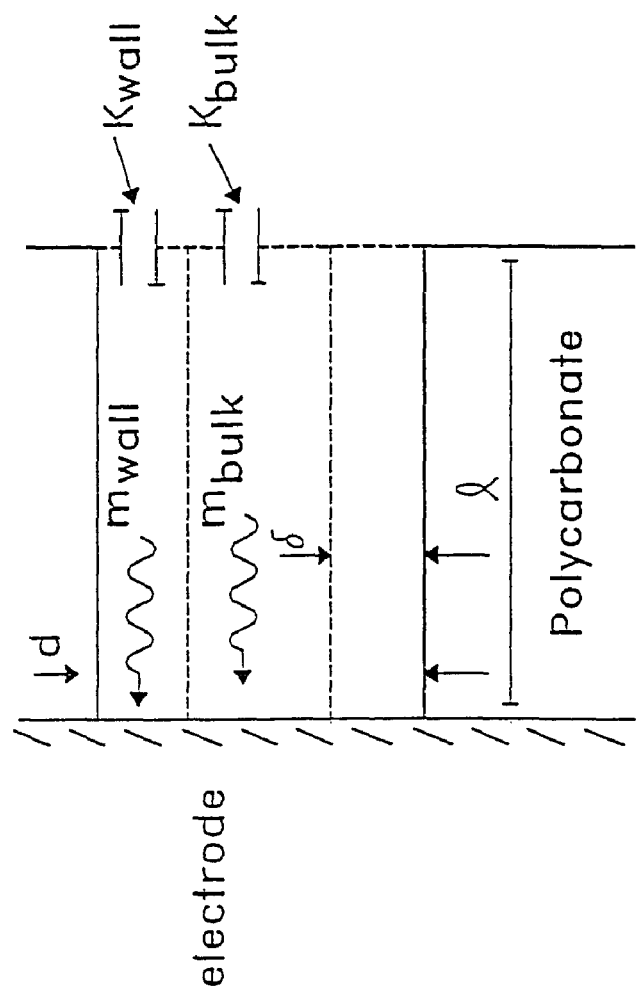

Predictive models of how interfaces and their associated concentration, field, etc. gradients dictate interface properties and function are provided below and further aid in the design of new composites tailored for specific applications. A simple surface diffusion model assuming no limitations to the transport rate in the radial direction is outlined. FIGS. 5A and 5B show the simple model where transport in the radial direction is not rate limiting. In the model $J_{comp}$ is the total flux through the composites, $J_{Nuc}$ is the flux through an empty pore, and $J_{bulk}$ and $J_{wall}$ are the fluxes in the bulk (center) of the pore and along the surface of the pore, respectively. To analyze the flux, as in FIG. 4B, $J_{bulk}$ and $J_{wall}$ must be normalized to the cross sectional area of the pore used to determine 6m, the product of the effective extraction and transport coefficients. From the final equation, the plot in FIG. 4B can be interpreted to have the slope and intercept shown in FIGS. 5A and 5B. If δ, the thickness of the interfacial zone, is taken as 1.5 nm, the values cited for $6_{wall}m_{wall}$ and $6_{bulk}m_{bulk}$ are found. The diffusion coefficients of each species in solution are also listed for comparison. In general, $6_{wall}m_{wall} \simeq (10$ to $10^2)@6_{bulk}m_{bulk} \simeq (1$ to $10)@D_{soln}$. In other words, for an interfacial zone thickness, δ, of 1.5 nm, $6_{wall}m_{wall}$ is up to one order of magnitude higher than $D_{soln}$, and one to two orders of magnitude higher than $6_{bulk}m_{bulk}$.

The interfacial transport zone occurs because of the irreversible exchange of Nafion sulfonic acid groups to polycarbonate surface sites to form a monolayer of inactive sulfonic acid groups. The side chains linking the sulfonic acid sites to the Nafion backbone form a loosely packed monolayer along the pore wall which facilitates the flux through the transport zone compared to transport through the tortuous environment of bulk Nafion. Given the length of the chains, a δ value of about 1.5 nm is consistent with $6_{wall}m_{wall}$ (and $6m/D_{soln}$) decreasing as transport is more hindered with increasing diameter of the redox species; i.e., $6_{wall}m_{wall}$ decreases as $H_2Q(0.6$ nm$)>Ru(NH_3)_6^{3+}(0.8$ nm$)>DOP^+(0.8$ nm$^6)>$ FerN$^+(1$ nm$)$. Discrimination between these species has also been observed based on molecular shape in the neutron track-etched composites. For example, disk shaped molecules exhibit higher flux than comparably sized spherical molecules.

Radial Migration

Figures 6A, 6B:
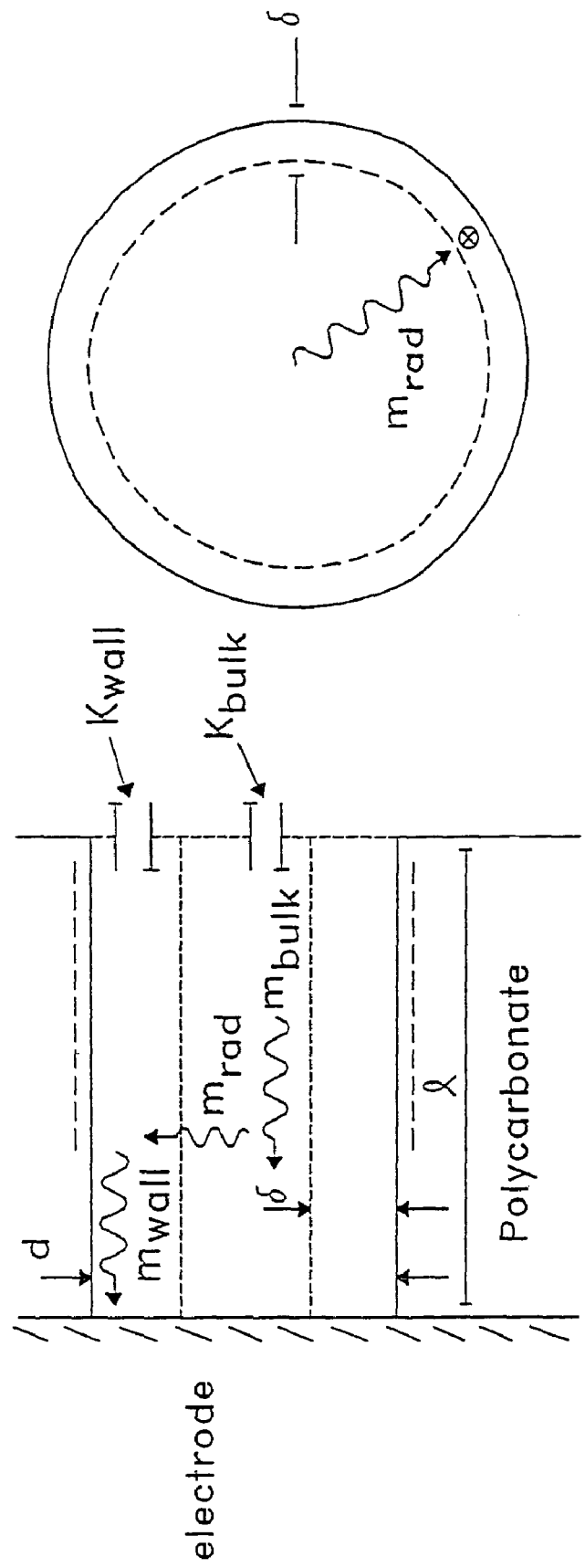
FIGS. 6A and 6B show the surface diffusion model including radial migration.

The pore walls have a surface charge density of −0.2 μC/cm$^2$. For a 30 nm pore diameter composite, the corresponding charge is 0.5% of the total charge in the pore, and will have negligible effect on the number of cations extracted from the solution to move into the pore. However, the surface charge establishes a potential gradient (electric field) from the pore to the wall which tends to move positively charged ions radially outward from the center of the pore to the wall. An issue is whether this radial, interfacial potential gradient can be coupled to the concentration gradient along the wall to enhance solute flux to the electrode, as illustrated in FIGS. 6A and 6B.

The model was tested by varying the concentration of the electrolyte, nitric acid, from 0.50 to 0.01 M, for fixed dopamine concentration (2 mM). Flux was determined by rotating disk voltammetry at 400 rpm for the bare electrode and at infinite rotation rate for the modified electrodes (See Table 1). The electrolyte concentration did not dramatically affect the flux for the bare electrode, the 30 nm membrane containing no Nafion, and the Nafion film.

TABLE 1

| | Flux (nmol/cm²s) for Dopamine Oxidation at Various [H+] | | | |
|---|---|---|---|---|
| $[H+]_{soln}$ | $Flux_{unmodified}^{400\ rpm}$ | $Flux_{30\ nm}$ | $Flux_{Film}^{Nafion}$ | $Flux_{30\ nm}^{Nafion}$ |
| 0.50 M | 38.6 | 54.8 | 4.2 | 2.4 |
| 0.10 M | 36.7 | 57.5 | 4.3 | 10.5 |
| 0.01 M | 44.6 | 73.1 | — | 39.0 |

However, for the 30 nm Nafion composite a fifty-fold decrease in electrolyte concentration led to >1600% increase in flux. Coupling of radial flux, driven by the interfacial potential gradient, to surface diffusion generates the enhancement. No enhancements were observed for a similar study of neutral hydroquinone. It should be noted that only charged species move by migration; dopamine is charged, while hydroquinone is not.

Since the selectivity coefficient for dopamine over protons is about 500 in Nafion, decreasing the electrolyte concentration fifty-fold only decreases the dopamine concentration by 10%. The dramatic effect produced by varying the proton concentration means that the protons, not the dopamine, compensate the wall charge to establish the interfacial potential gradient and enhance the radial flux of dopamine. This is possible because the dopamine, a cationic amine, is heavily ion paired to the sulfonic acid sites. With a dielectric constant of 20, substantial ion pairing can be anticipated in Nafion. Ion pairing may explain why the flux of cationic amines is lower than neutral hydroquinone as can be seen with reference to FIGS. 4A and 4B which show 6m values for neutron-track etched polycarbonate/Nafion composites. FIG. 4A shows 6m versus log(d), where d is the pore diameter. 6m increases above the values for bulk Nafion as d approaches 30 nm. The concentrations are 2 mM redox species and 0.1 M electrolyte for RuN+—Ruthenium (II) hexamine (□), $H_2Q$—Hydroquinone (Δ,∇), DOP+—Dopamine (○), and FerN+—Trimethylammninomethyl ferrocene (◇). The electrolyte is $H_2SO_4$ in all cases except for DOP+ and $H_2Q$(∇). Lines represent no model and are only intended to indicate the trend in the data. FIG. 4B shows 6m versus $d^{-1}$, where $4d^{-1}$ is the surface area of the pore/volume of Nafion in the pore. As illustrated in FIGS. 6A and 6B, the slopes in FIG. 4B are indicative of the surface flux, and the intercept corresponds to the flux in bulk Nafion. Note, all the redox species except hydroquinone are charged amines, and all have lower flux than hydroquinone.

Vapor Phase Electrochemistry/Microstructure in Two-Dimensions

One way to alter microstructure is to reduce the conduction matrix from three to two-dimensions. A two-dimensional system is made by sulfonating the nonionic, polymeric insulator between the electrodes of a microelectrode assembly. Conduction across the surface cannot be studied in either an electrolyte solution or a pure solvent as the liquid provides a conductive path between the electrodes. However, by supporting the microelectrode assembly in an evacuated flask, and injecting hydrogen or hydrogen chloride and a small amount (:L) water, conduction can be studied by electrolyzing the gas. In these lower dimensional systems, the role of the ion exchange site and its concentration, as well as the role of water in ionic conduction can be studied. Preliminary studies were performed to study conduction through solvent layers adsorbed from the vapor phase across the nonionic surface of a microelectrode assembly. Electrolysis of gas phase solvents required the solvent to adsorb at greater than monolayer coverage to bridge the gap between the electrodes. Solvents with high autoprotolysis and acidity constants sustain higher currents than solvents less able to generate ions. These studies provided information about gas phase electrochemical detection and systems as well as atmospheric corrosion.

Composites Formed with Polymerized Microspheres

Figure 7A:
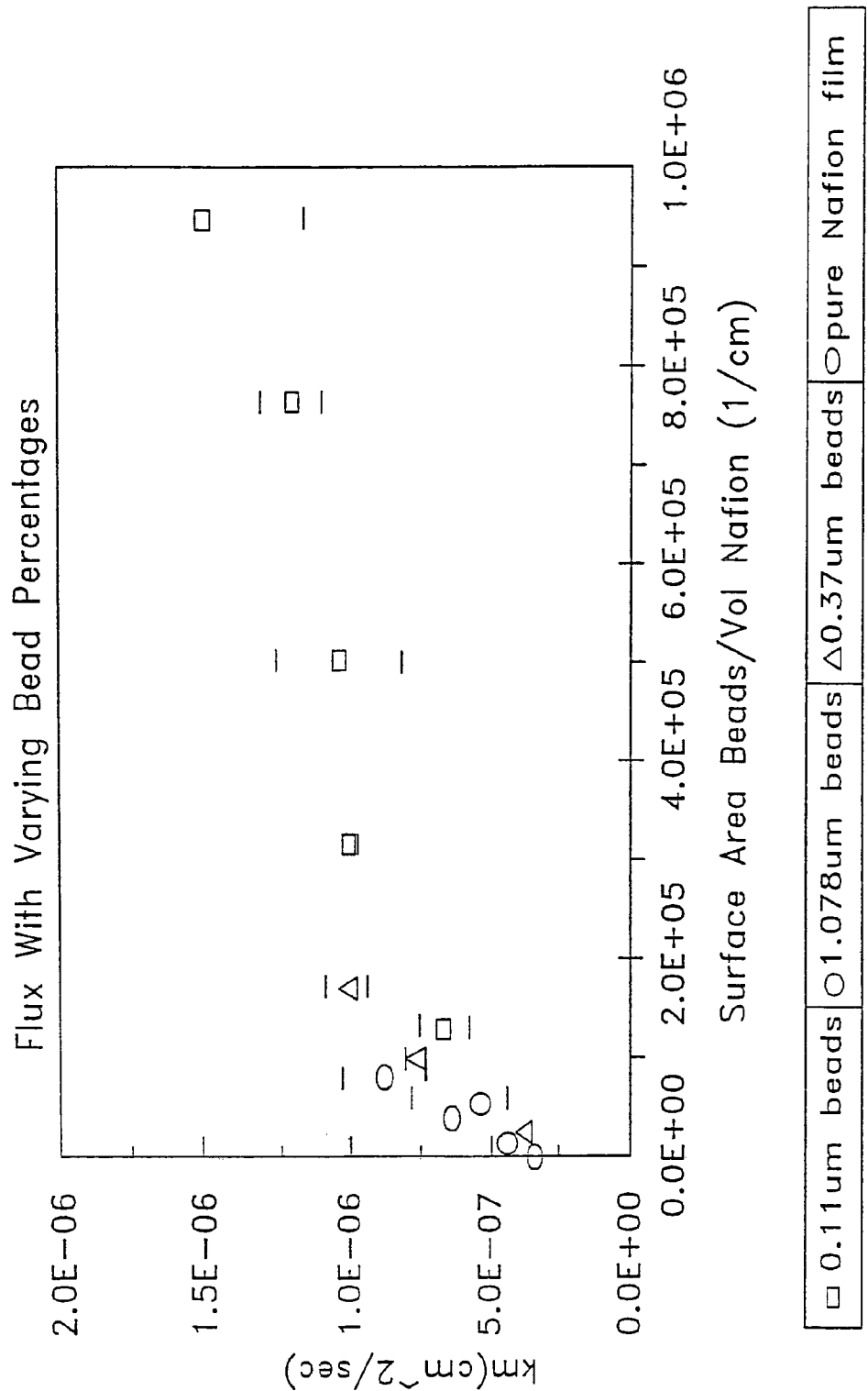
FIGS. 7A and 7B show 6m values of hydroquinone through polystyrene/Nafion composites for ratios of surface area of the microbeads to volume of Nafion.
Figure 7B:
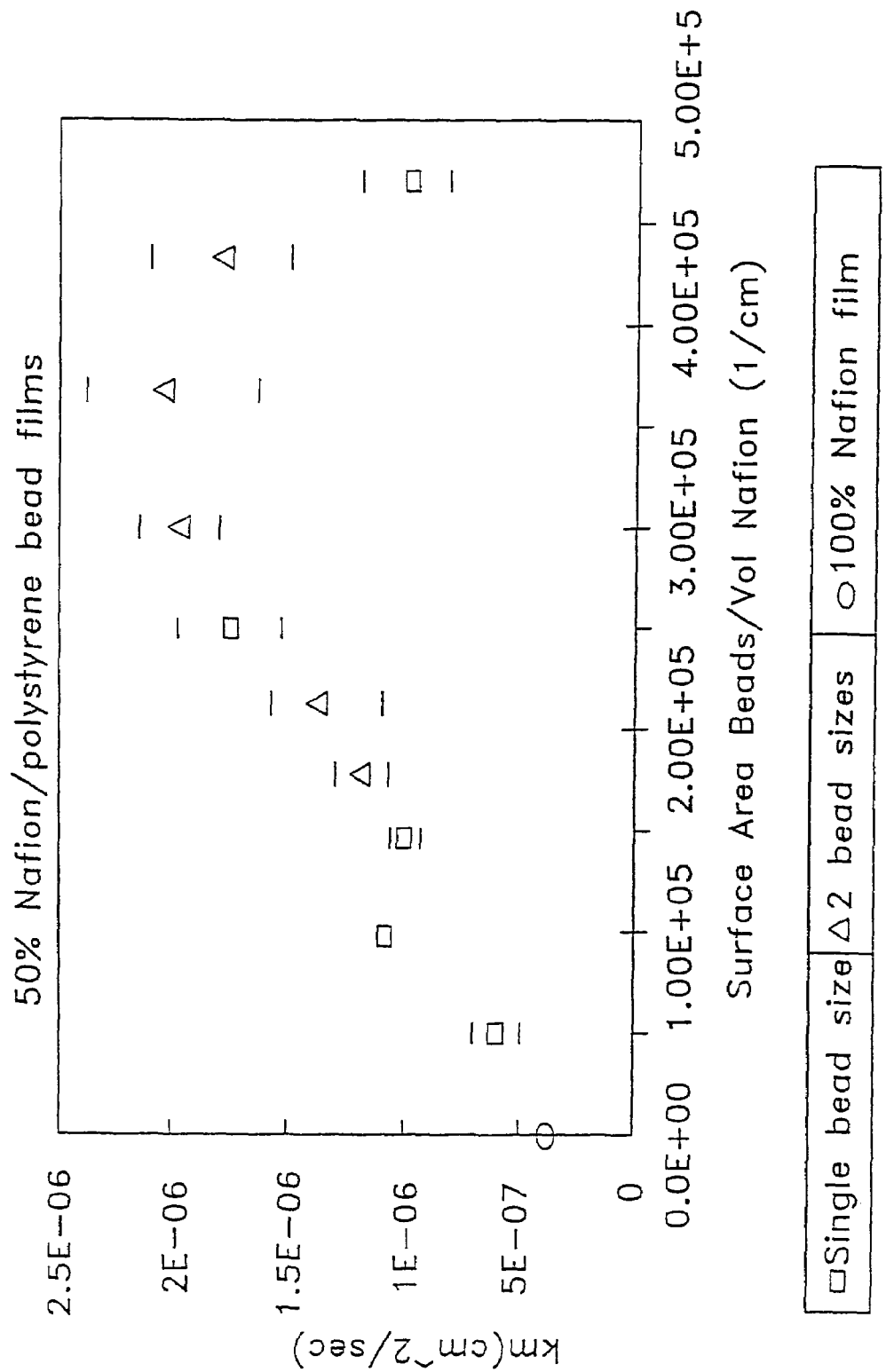

To test the generality of flux enhancement by interfacial forces, composites of Nafion and polymerized polystyrene microspheres were formed; diameters of 0.11 to 1.5 μm were used. FIGS. 7A and 7B show 6m of hydroquinone through polystyrene microbead/Nafion composites versus ratios of surface area of the microbeads to volume of Nafion. In particular, values of Km found for various ratios of bead surface area for transport to volume of Nafion for extraction (SA/Vol) are shown for three different bead diameters. As for the neutron track etched composites, linear plots were found, at least for the larger sizes, with intercepts comparable to bulk Nafion. Of these sizes, 0.37 μm beads exhibited the largest flux enhancement (600%). FIG. 7A shows results for composites formed with single size beads, where the ratio of surface area to volume was varied by varying the volume fraction of beads in the composites. Positive slopes are shown consistent with flux enhancement by surface diffusion along the surface of the beads. The intercepts are consistent with transport through bulk Nafion.

The fraction of microspheres in the composite can be varied and different sizes mixed to allow a continuous range of SA/Vol. In particular, FIG. 7B shows results for composites for a range of SA/Vol with 50% total fraction of Nation by volume in the film. 6m increases as SA/Vol increases to about $3.5A10^5\ cm^-$, analogous to $1.3A10^6\ cm^{-1}$ found for the neutron track etched composites (FIG. 4A). Scanning electron micrographs of the 50% Nafion, single bead size composites showed packing of the 0.11 μm beads was different and may account for the lower 6m values found for $d^{-1} > 3.5A10^5\ cm^{-1}$, where 0.11 μm beads were used. FIG. 7B shows results for composites formed with 50% Nafion by volume. The ratio of surface area to volume was varied by making composites with beads of one and two sizes. Flux increases as the ratio of surface area to volume increases to $3.5A10^5\ cm^{-1}$; at the highest ratio, the composite contains 0.11 μm beads.

Figure 8:
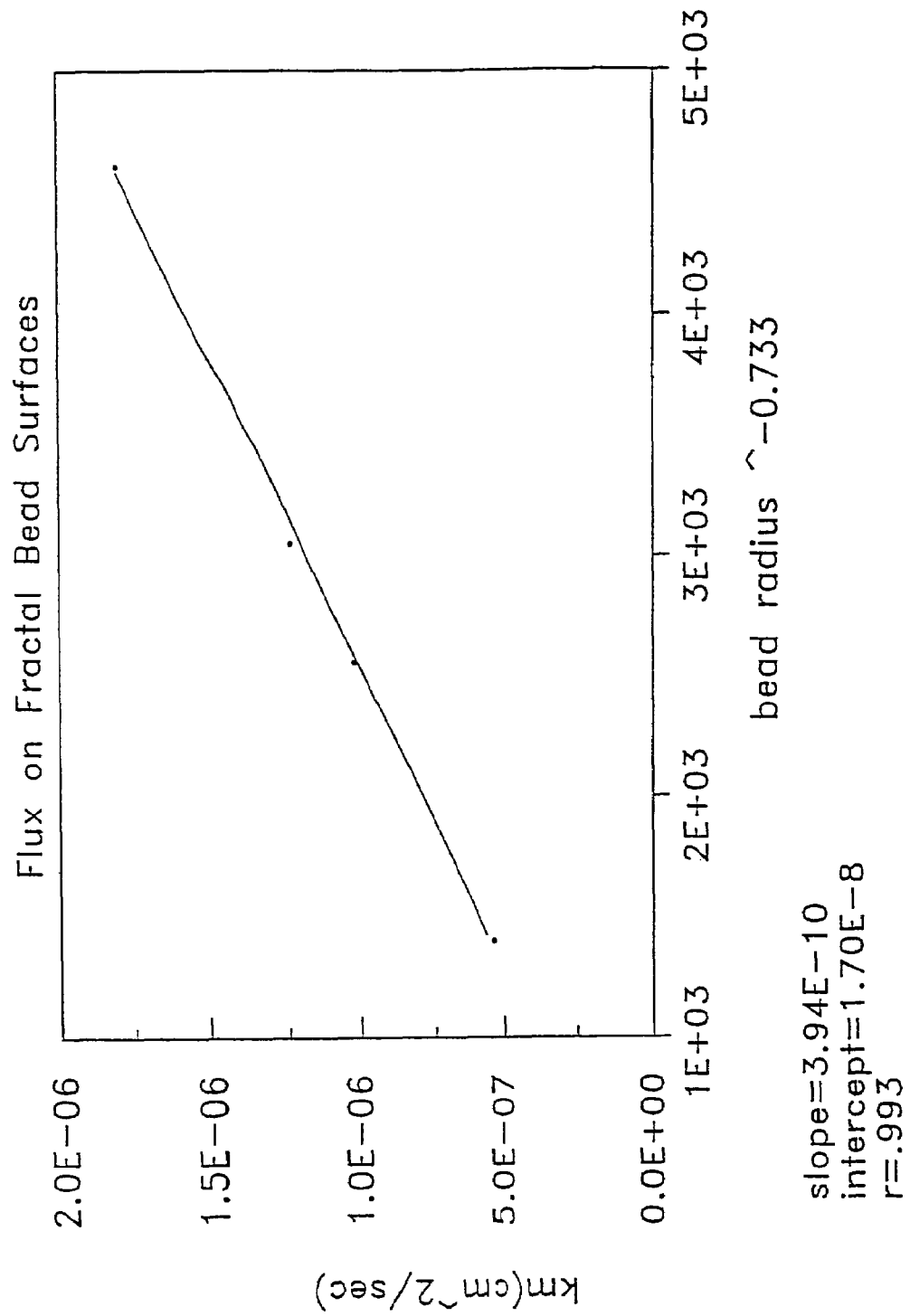
FIG. 8 shows an analysis of fractal diffusion along the surface of the microbeads in polystyrene Microbead/Nafion composites.

From the scanning electron micrographs, composites of beads larger than 0.11 μm exhibit the self-similarity typical of fractal materials. When ln(6m) for these beads is plotted versus log(d), where d is the bead diameter, a linear plot with a slope of −0.733 was obtained; 6m versus $d^{-0.733}$ is shown in FIG. 8. For diffusion on a fractal of finitely ramified structure (e.g., the Sierpinski gasket), this is the power dependence expected for diffusion in a two-dimensional system. Thus, microbead composites exhibit transport typical of fractal diffusion along the microbead surface. This system confirms that surface diffusion provides a mechanism of flux enhancement. It also introduces the concept of fractal transport processes and the importance of surface dimensionality in ion exchange composites.

Poly(4-Vinylpyridine) Composites Formed on Neutron Track Etched Membranes

Figure 9:
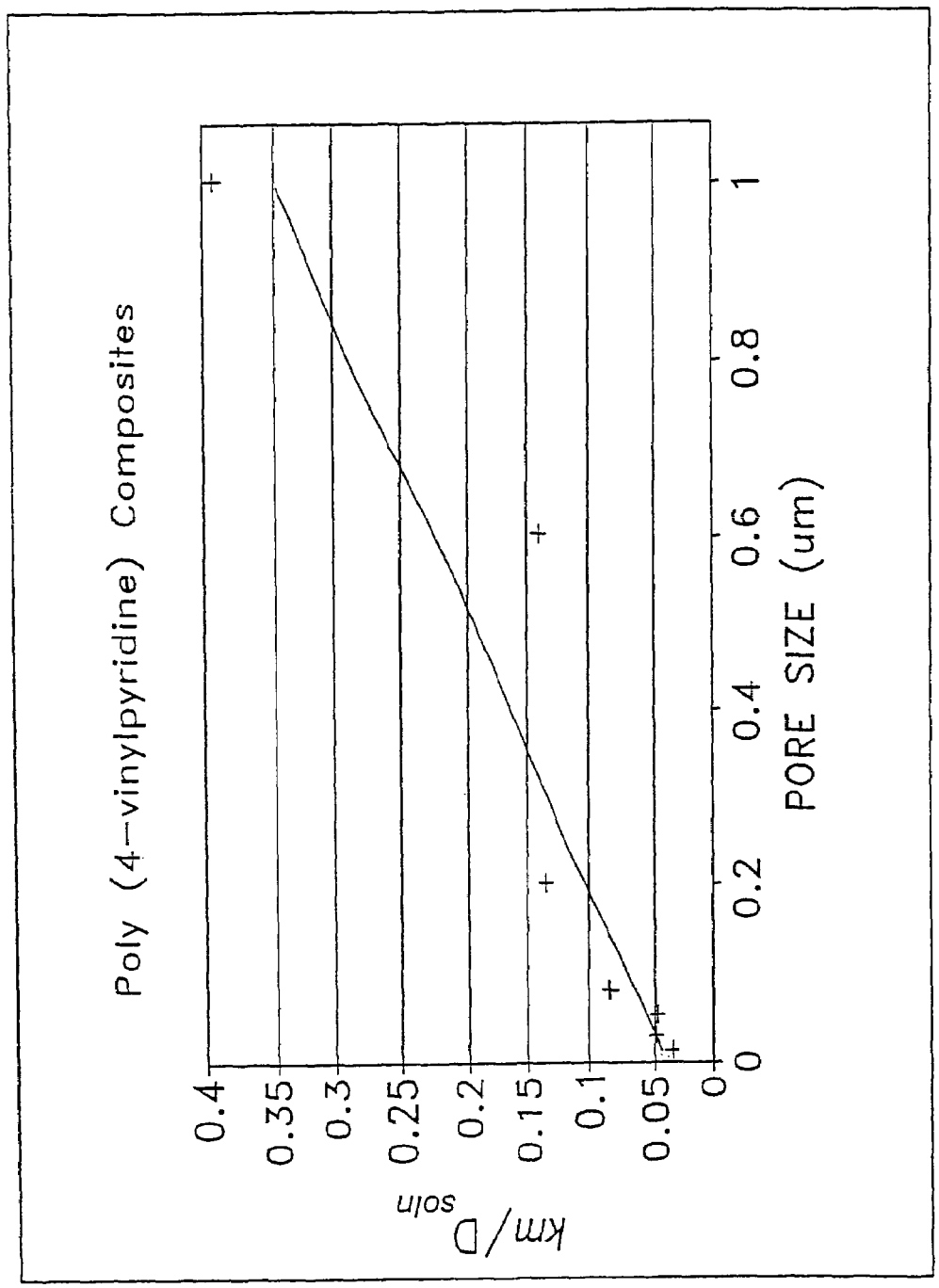
FIG. 9 shows preliminary 6m values for neutron-track etched polycarbonate/poly(4-vinylpyridine) composites.

To investigate surface diffusion in other ion exchangers, composites were formed of protonated poly(vinyl pyridine) and track etched membranes. From preliminary results, flux enhancements in these composites increased with d (volume/ surface area); see FIG. 9. Such a dependency may be consistent with a transport rate which varies monotonically in the radial coordinate. Physically, a non-uniform density of PVP, produced by interaction with the wall charge, could generate a radially dependent transport rate.

Thermal Processing of Nafion

While commercial Nafion is heat cast, a process that yields inverted micelles, the vast majority of academic studies of Nafion have been performed on cold cast Nafion which produces normal micelles. A study of the mechanical properties of Nafion hot cast from organic solvents has been reported. Attempts have been made to hot cast Nafion films with microwave heating. In the highly ionic casting solution, the glass transition temperature of Nafion (105° C.) should be reached as the water evaporates. Plots of flux as a function of the time microwaved have a break at approximately 15 minutes. The flux changed by no more than a factor of three with a decrease in the flux of hydroquinone, and from preliminary studies, an increase in the flux of $Ru(NH_3)_6^{3+}$. This may indicate different transport mechanisms for the two species in the film. Microwaved, cold cast and commercial hot cast films have been compared.

Magnetic, Demagnetized, and Nonmagnetic Composites

Polystyrene coated, 1 to 2 μm Iron oxide (nonpermanent magnetic material) or organo-Fe (superparamagnetic or ferrofluid or permanent magnetic) microbeads are available (Bangs Labs or Polyscience) as a 1% suspension in water, and Nafion (C. G. Processing) is available as a 5% suspension in alcohol/water (other inert or active polymer coatings besides polystyrene could be employed as well, and in nonaqueous environments, it is possible to eliminate the polymer coating completely if, for example, its purpose is normally only to prevent oxidation in an aqueous environment). This discussion holds for superparamagnetic or ferrofluid or permanent magnetic or nonpermanent magnetic or ferromagnetic or ferrimagnetic material microbeads in general. This discussion also holds for other magnets and other magnetic materials which include, but are not limited to superconductors, and magnetic materials based on rare earth metals such as cobalt, copper, iron, samarium, cerium, aluminum and nickel, and other assorted metal oxides, or magnetic materials based on neodymium, e.g., magnequench, which contains iron and boron in addition to neodymium. The polymer coatings are required for use of these microbeads in an aqueous environment to prevent oxidation, but in a nonaqueous environment the polymer coating may not be required. Magnetic composites incorporating organo-Fe material microbeads are formed by casting appropriate volumes of each suspension onto an electrode centered inside a cylindrical magnet (5 cm inside diameter, 6.4 cm outside diameter, 3.2 cm height; 8 lb pull). Once the solvents evaporate and the magnet is removed, the oriented beads are trapped in the Nafion, stacked in pillars normal to the electrode surface. To minimize interbred repulsion, pillars form by stacking the north end of one bead to the south end of another; to minimize interpillar repulsion, the pillars arrange in a roughly hexagonal array. These aligned composites were formed with microbead fractions of ≦15%. Aligned composites were compared to other composites: unaligned composites—formed as above but with Iron oxide-microbeads and without the magnet; nonmagnetic composites—formed with 1.5 μm nonmagnetic polystyrene beads; simple Nafion films; and demagnetized composites—aligned composites that were demagnetized. Demagnetized composites had the pillared structure, but it is not clear if they were fully demagnetized. Nonmagnetic composites had a coral-like structure (i.e., they do not form pillars). Note, composites may be formed wherein at least one component is reversibly changeable between a paramagnetic form and a diamagnetic form with, for example, a temperature variation with or without the presence of an externally applied magnetic field.

Magnetic Composites

Electrochemical Studies of Magnetic Composites

The composite was equilibrated in a solution of 1 mM electro-active species and 0.1 M electrolyte. The mass transport-limited current for the electrolysis of the redox species through the composite ($i_{meas}$) was then determined by steady-state rotating disk voltammetry at several different rotation rates (w). A plot of $i_{meas}^{-1}$ versus $w^{-1}$ yielded a slope characteristic of transport in solution, and an intercept characteristic of transport through the composite as:

$$\frac{nFA}{i_{meas}} = \frac{<^{1/6}}{0.62c^* D_{soln}^{2/3}} w^{-1/2} + \frac{l}{Km\epsilon c^*}. \quad (3)$$

In Equation (3), n is the number of electrons, F is the Faraday constant, A is the electrode area, $c^*$ and $D_{soln}$ are the concentration and diffusion coefficient of the redox species in solution, respectively, < is the kinematic viscosity, l is the composite thickness, 6 is the partition coefficient of the redox species, m is the mass transport rate of the redox species in the composite, and ∈ is the porosity of the composite. The partition coefficient, 6, is the ratio of the equilibrium concentration in the ion exchange portion of the composite to the solution concentration, in the absence of electrolysis. Equation (3) is appropriate for rate-limiting transport perpendicular to the electrode. This is ensured by choosing l and $D^{1/3}_{soln} w^{-1/2} <^{1/6}$ large compared to the microstructural dimensions of the composite, and is verified by the slope. Then, the composite can be treated as homogeneous with an effective 6m, and microstructural effects can be ascertained with rotating disk studies. Cyclic voltammetry yielded quantitative information for scan rates, v, sufficient to contain the transport length within the composite. For a reversible couple, the peak current, $i_{peak}$, is $$i_{peak} = 0.4463(nF)^{1/2}[v/RT]^{1/2}, \quad (4)$$

where R is the gas constant and T is the temperature. When both rotating disk and cyclic voltammetry data are obtainable, 6 and m are separable because of their different power dependencies in Equations (3) and (4).

The flux of redox species through magnetic composites is enhanced in proportion to the absolute value of the difference in the magnetic susceptibilities of the products and reactants of the electrolysis. From cyclic voltammetry, the $\Delta E_p$ observed for reversible species, whether paramagnetic or diamagnetic, was little changed, but $E_{0.5}$ was shifted, where $E_{0.5}$ is the average of the anodic and cathodic peak potentials, and is a rough measure of the free energy of the electron transfer reaction. For a quasireversible, diamagnetic species which passed through a radical intermediate, dramatic changes in $\Delta E_p$ were found. The shifts and peak splittings were consistent with the stabilization and the concentration of the paramagnetic species. Results are summarized below.

Flux Enhancements for Paramagnetic Species

Values of 6m found by rotating disk voltammetry for diamagnetic hydroquinone and $Ru(bpy)_3^{2+}$, and paramagnetic $Ru(NH_3)_6^{3+}$ using Nafion films, nonmagnetic polystyrene microbead composites, and magnetic microbead composites are summarized in Table 2. Both bead composites contained 15% beads of 1 to 2 μm diameter; all modifying layers were 3.6 to 3.8 μm thick.

TABLE 2

6 m ($10^{-6}$ cm$^2$/s) for Various Magnetic/Nonmagnetic Species and Films

|  | 6 m$_{Nafion\ film}$ | 6 m$_{Nonmagnetic}$ | 6 m$_{Magnetic}$ |
|---|---|---|---|
| Hydroquinone | 0.925 | 1.02 | 2.21 |
| Ru(bpy)$_3^{2+}$ | 0.290 | 0.668 | 0.869 |
| Ru(NH$_3$)$_6^{3+}$ | 0.570 | 1.01 | 3.80 |

In these examples, as in general, when flux of redox species through the magnetic composite was compared to flux through either Nafion films or composites formed with nonmagnetic beads, the flux was enhanced. In general, we find the flux enhancement is not dependent on whether the electrolysis is converting a diamagnetic to a paramagnetic species or a paramagnetic to a diamagnetic species, but that the enhancement increases as the absolute value of the difference in the molar magnetic susceptibility of the product and reactant.

Figure 10:
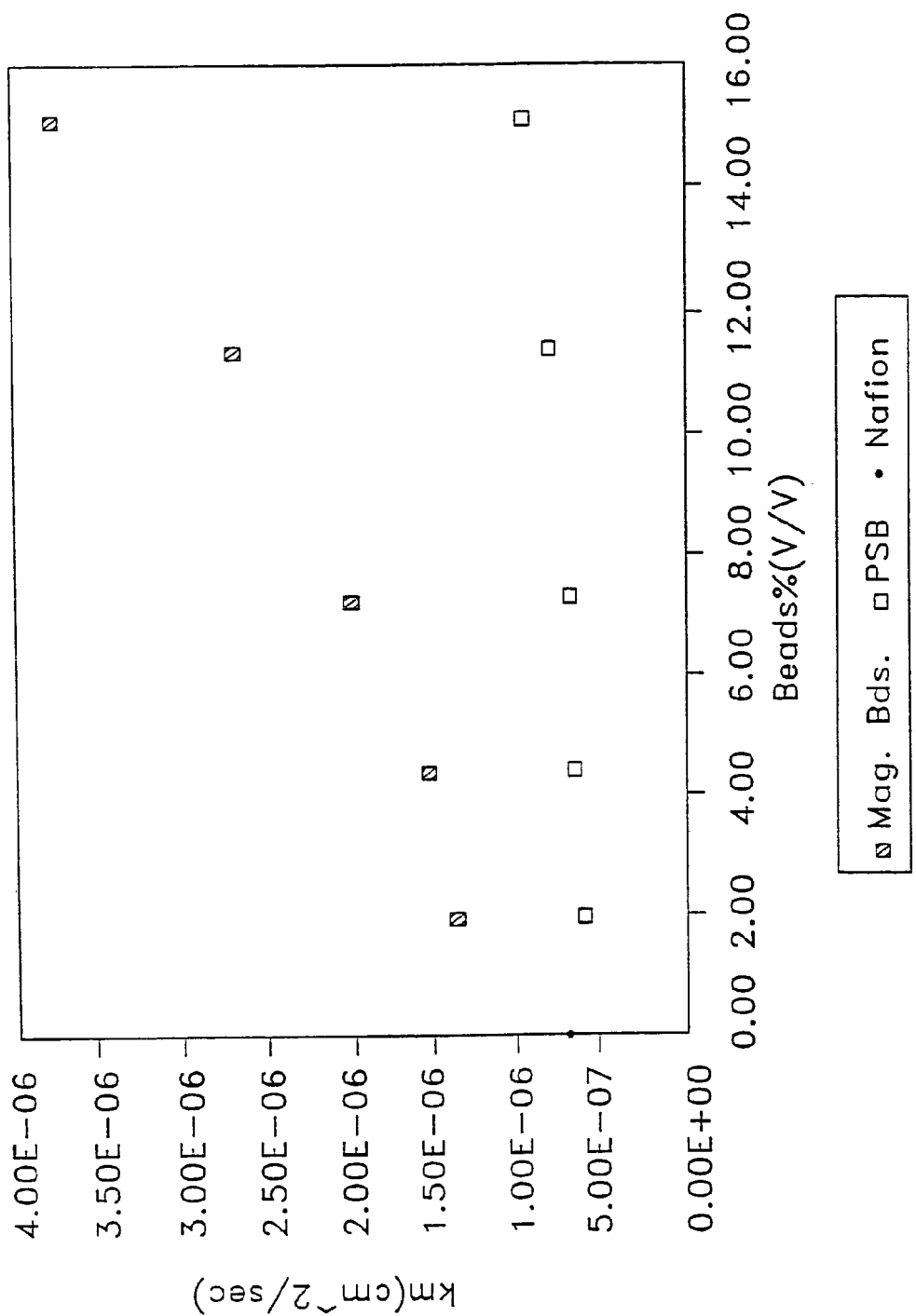
FIG. 10 shows 6m values for Ru(NH3)63+ as a function of volume fraction of microbeads in magnetic and nonmagnetic composites.

To further investigate paramagnetic $(Ru(NH_3)_6^{3+}$, 6m values were found for magnetic and nonmagnetic composites made with various fractions of beads. Results are shown in FIG. 10. First, in FIG. 10 the flux of $Ru(NH_3)_6^{3+}$ increased strongly with the fraction of magnetic beads, but not with the fraction of nonmagnetic beads. Second, since the enhancement is not linear with the magnetic bead fraction, the enhancement was not due to either a simple concentration increase of the paramagnetic species about each bead or a simple increase in surface diffusion associated with more pillars at higher bead concentration. (Data are equally well linearized with correlation coefficient >0.99 as either In[6m] versus percent beads, or 6m versus volume of Nafion/surface area of the beads. Plots of both showed intercepts comparable to 6m for simple Nafion films.) Third, substantially higher flux was achieved with the magnetic beads than with the same fraction of nonmagnetic beads.

Magnetohydrodynamic models neither account for the discrimination between paramagnetic and diamagnetic species by the magnetic composites, nor do they predict the shape of the curve shown in FIG. 10.

Electrochemical flux of various redox species from solution through either composites or films to the electrode surface was determined by cyclic and steady-state rotating disk voltammetry. Electrochemical flux of species through the composites is parameterized by 6 and m, where 6 is the extraction coefficient of the redox species from solution into the composite, and m (cm$^2$/s) is its effective diffusion coefficient. For steady-state rotating disk voltammetry, the parameterization is 6m (determined from the intercept of a Koutecky Levich plot [12a]), and for cyclic voltammetry, the parameterization is 6m$^{1/2}$ (extracted from the slope of peak current versus the square toot of the scan rate (20 to 200 mV/s) [12b]). All measurements were made in solutions containing 1 to 2 mM redox species at a 0.45 cm$^2$ glassy carbon electrode. The electrolyte was 0.1 M HNO$_3$, except for the reduction of Co(bpy)$_3^{2+}$(0.2 M Na$_2$SO$_4$) and for the oxidation of Co(bpy)$_3^{2+}$ and reduction of Co(bpy)$_3^{3+}$(0.1 M sodium acetate/acetic acid buffer at pH=4.5). Anionic ferricyanide was not detected electrochemically through the anionic Nafion films and composites, consistent with defect-free layers. All potentials were recorded versus SCE.

First, 6m values were determined for the oxidation of paramagnetic $Ru(NH_3)_6^{3+}$ to diamagnetic $Ru(NH_3)_6^{2+}$ through magnetic and nonmagnetic composites as the bead fraction was increased. $|\Delta\chi_m|=1,880A10^{-6}$ cm$^3$/moles[13]. From FIG. 10, 6m for the nonmagnetic composites varies little with bead fraction, while 6m for the magnetic composites increases superlinearly by several fold.

Figure 11:
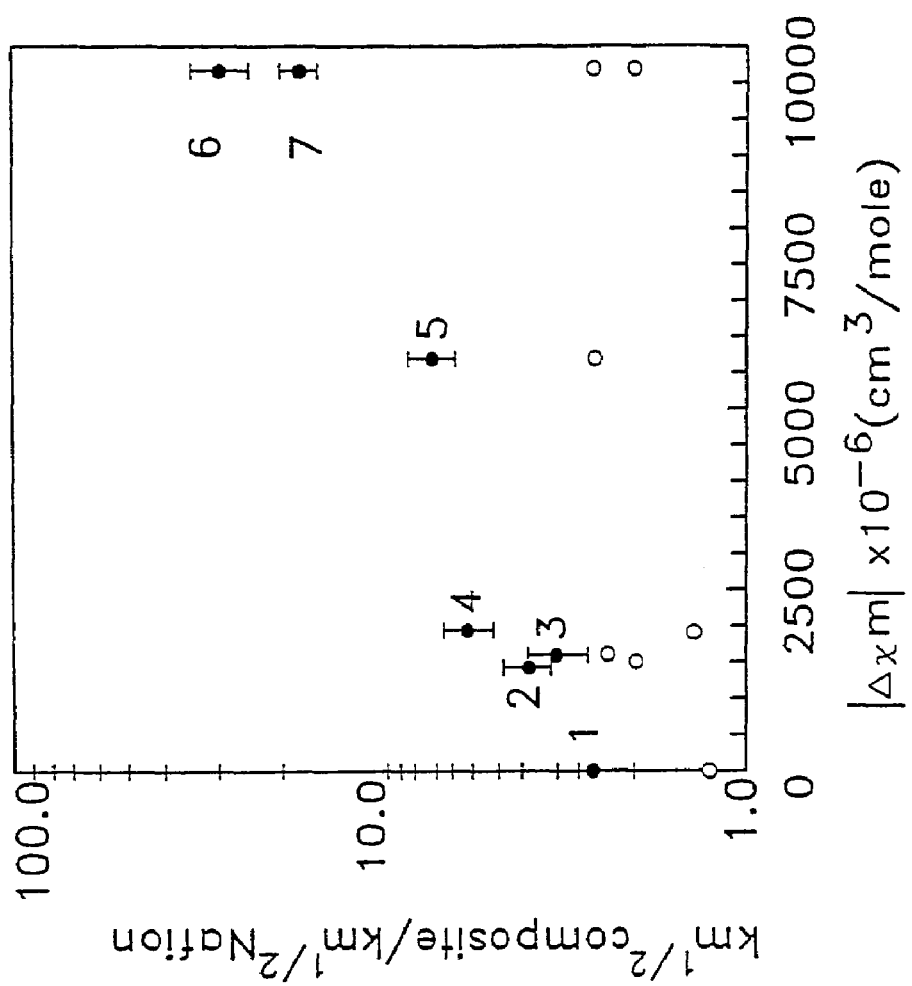
FIG. 11 shows the relative flux of redox species on the y-axis, where the maximum cyclic voltammetric current for a composite with magnetic microbeads is normalized by the maximum cyclic voltammetric current for a Nafion film containing no magnetic material, with the ratio giving the flux enhancement.

Second, 6m$^{1/2}$ values were determined for various redox reactions for magnetic composites, nonmagnetic composites, and Nafion films. Exclusive of any magnetic field effects, electrochemical flux through Nafion can be altered by the size, charge, and hydrophobicity of the transported species, interaction and binding with the exchange sites, and intercalation into the hydrated and perfluorinated zones of the Nafion. To minimize effects not related to interactions between the redox moieties and the magnetic beads, 6m$^{1/2}$ values for the magnetic and nonmagnetic composites are normalized by 6m$^{1/2}$ for the Nafion films. The normalized 6m$^{1/2}$ values are plotted in FIG. 11 versus $|\Delta\chi_m|$ for the various redox reactions [13], [14]. FIG. 11 illustrates the relative flux of redox species on the y-axis, where the maximum cyclic voltammetric current for a composite with magnetic microbeads is normalized by the maximum cyclic voltammetric current for a Nafion film containing no magnetic material. The ratio is the flux enhancement. On the x-axis is the absolute value of the difference in the molar magnetic susceptibilities of the products and reactants of the electrolysis, $|P_m|$. The composites contain 15% magnetic microbeads and 85% Nafion by volume. The redox species are numbered as follow, where the reactant products are listed sequentially: (1) hydroquinone to benzoquinone; (2) Cr(bpy)$_3^{3+}$ to Cr(bpy)$_3^{2+}$; (3) Ru(bpy)$_3^{2+}$ to Ru(bpy)$_3^{3+}$; (4) Ru(NH$_3$)$_6^{3+}$ to Ru(NH$_3$)$_6^{2+}$; (5) Co(bpy)$_3^{2+}$ to Co(bpy)$_3^{1+}$; (6) Co(bpy)$_{32}^{2+}$ to Co(bpy)$_3^{3+}$; and (7)Co(bpy)$_3^{3+}$ to Co(bpy)$_3^{2+}$. All redox species are 1 mM to 2 mM. Film thicknesses are 3.6 micrometers to 3.8 micrometers. For the nonmagnetic composites, the normalized 6m$^{1/2}$ values are independent of $|\Delta\chi_m|$. This suggests the normalization is effective in minimizing steric and electrostatic differences in the interactions of the various redox species with Nafion. For the magnetic composites, normalized 6m$^{1/2}$ increases monotonically with $|\Delta\chi_m|$, with the largest enhancements approaching 2000%.

The logarithmic increase of electrochemical flux in FIG. 11 with $|\Delta\chi_m|$ is consistent with a free energy effect of a few kJ/mole. Effects of this magnitude have not been generated in uniform, macroscopic magnetic fields. Strong, non-uniform magnetic fields established over short distances (a few nanometers) at the interface between Nafion and magnetic microbeads could produce local effects of this magnitude. Magnetic concepts appropriate to uniform macroscopic magnetic fields and to molecular magnetic interactions are not applicable to this system, and instead, a microscopic parameterization is necessary. Establishing sufficiently strong and nonuniform local magnetic fields at interfaces in microstructured systems makes it possible to orchestrate chemical effects in micro-environments which cannot otherwise be achieved with uniform fields applied by large external magnets.

Cyclic Voltammetric Peak Splittings for Quasireversible Species

Figure 12A:
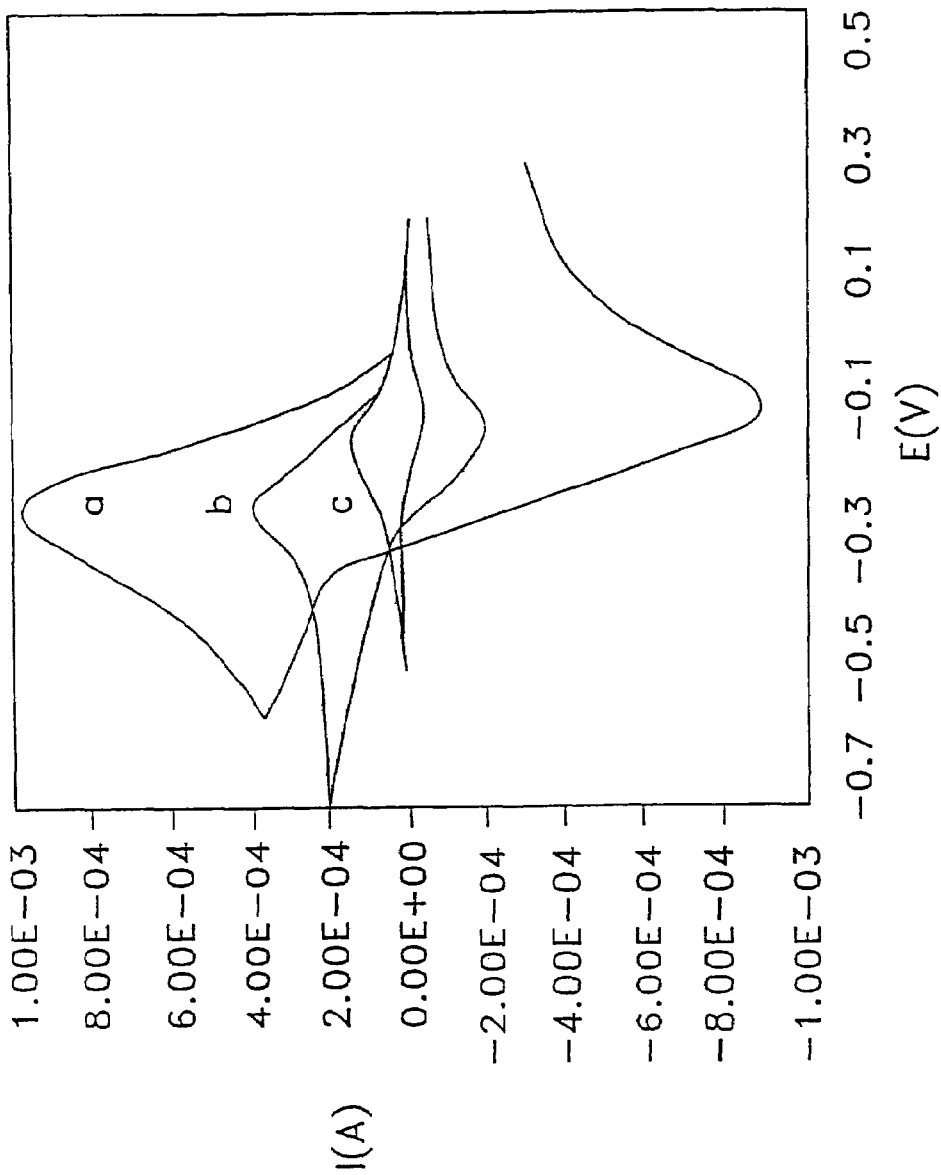
FIGS. 12A, 12B and 12C show cyclic voltammetric results for the reversible species Ru(NH3)63+ and Ru(bpy)32+ and for the quasireversible species hydroquinone.
Figure 12B:
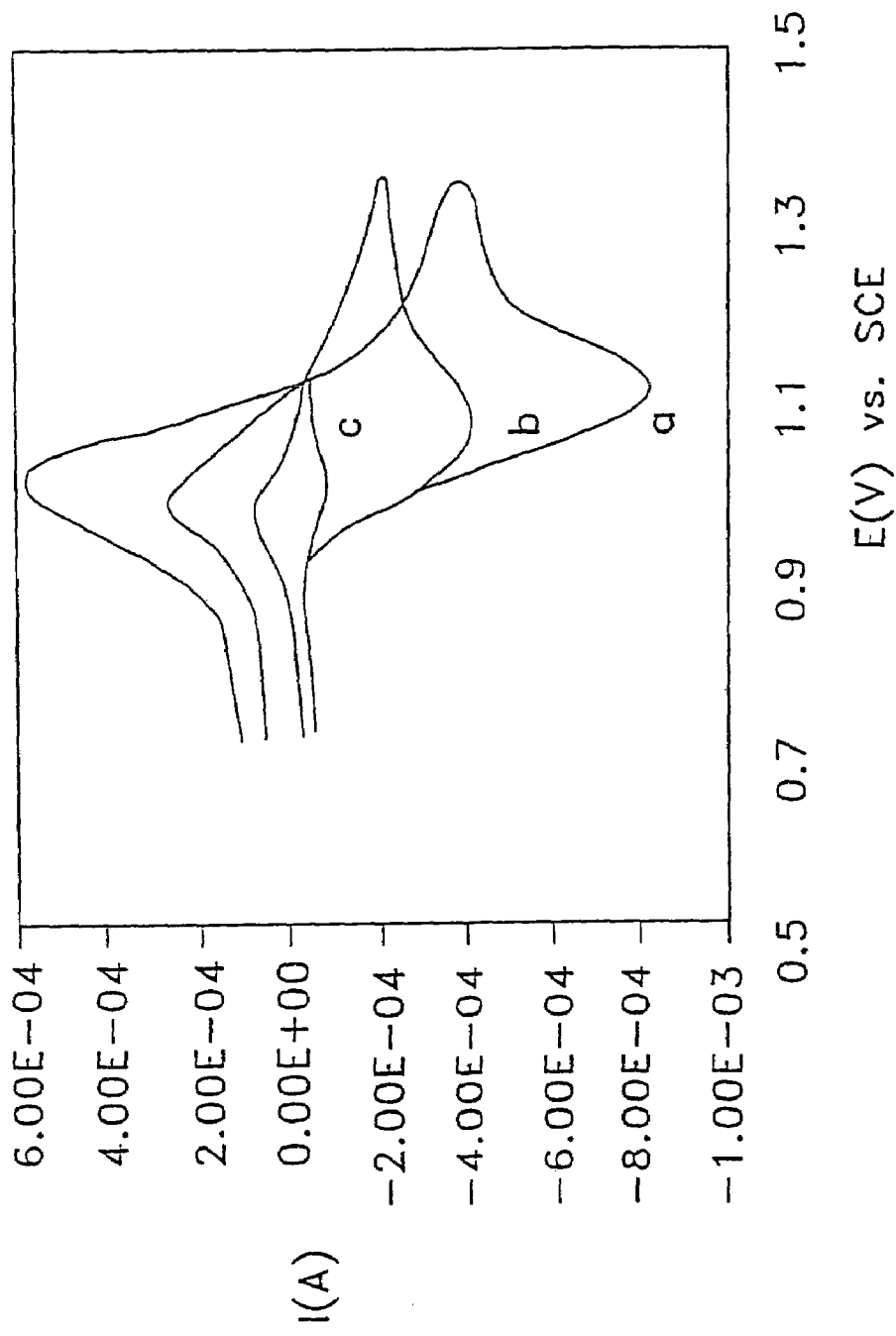

Peak splittings in cyclic voltammetry are used to determined heterogeneous electron transfer rates. FIGS. 12A and 12B show cyclic voltammetric results for the reversible species $Ru(NH_3)_6^{3+}$ and $Ru(bpy)_3^{2+}$, respectively. Cyclic voltammograms at 100 mV/s are shown for $Ru(NH_3)_6^{3+}$ (FIG. 12A) and $Ru(bpy)_3^{2+}$ (FIG. 12B) for magnetic composites, Nafion films, and the bare electrode. Cyclic voltammetric results are shown for the reduction of paramagnetic Ru $(NH_3)_6^{3+}$ in FIG. 12A. The concentration of the redox species is 1 mM, and the electrolyte is 0.1 M $HNO_3$; the reference is an SCE; and the films are 3.6 μm thick. For both species, when $E_{0.5}$ is compared for the magnetic composite and the Nafion films, the shift in $E_{0.5}$ is to positive potentials. The electron transfer kinetics for $Ru(NH_3)_6^{3+}$ are fairly strong with $k^0 > 0.2$ cm/s. Note that the peak splittings for the magnetic composites and Nafion film are similar, consistent with the resistance of the two layers being similar. Similar peak splittings are also observed for $Ru(bpy)_3^{2+}$, as shown in FIG. 12B. Therefore, when compared to the Nafion films, the magnetic composites have little effect on the rate of electron transfer of reversible species.

Figure 12C:
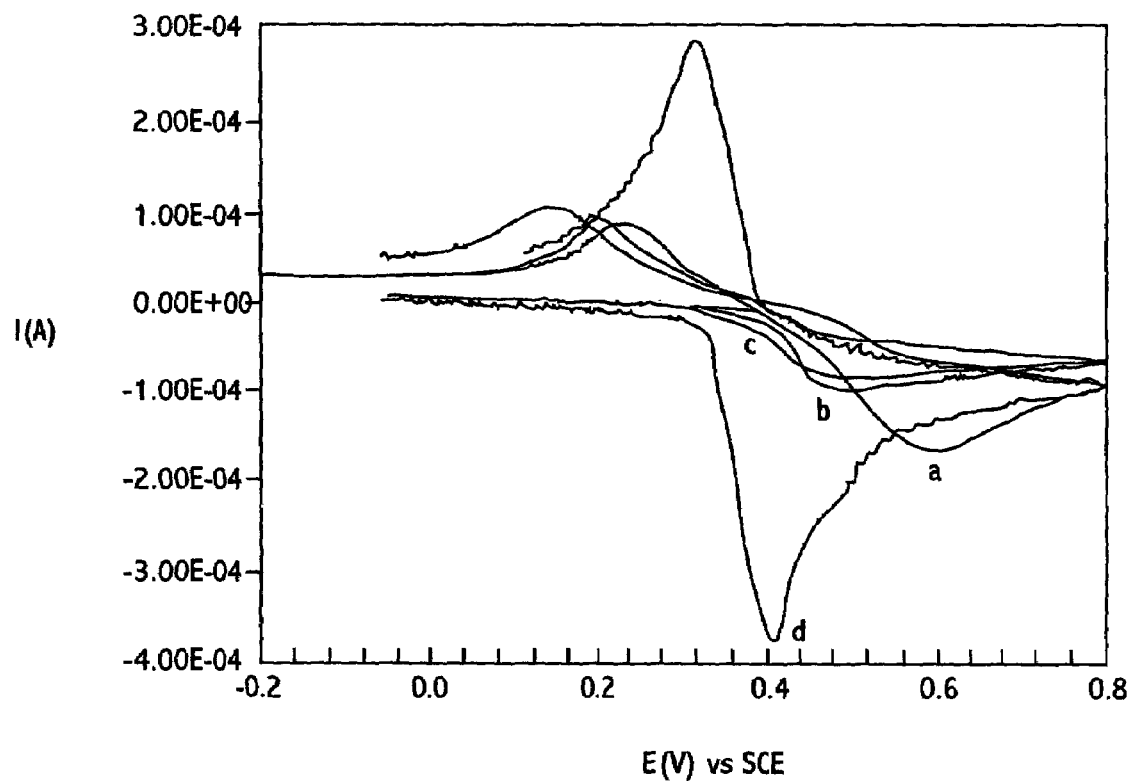

In particular, FIG. 12C shows cyclic voltammograms at 100 mV/s for 1 mM hydroquinone in 0.1 M $HNO_3$ for magnetic composites, nonmagnetic composites, Nafion films, and the bare electrode. The films are 3.6 μm thick. It is observed in the voltammogram of FIG. 12C that the peak splitting is almost doubled for the magnetic composite compared to the Nation film. The question arises as to whether the enhanced peak splitting is consistent with the stabilization of the paramagnetic semiquinone intermediate in the two electron/two proton oxidation. In FIG. 12C, voltammograms are shown at 0.1 V/s for hydroquinone, diamagnetic species that undergoes quasireversible, two electron/two proton oxidation to diamagnetic benzoquinone while passing through a radical, semiquinone intermediate. The voltammograms for the Nafion film and the nonmagnetic composites are fairly similar, with $\Delta E_p$ values of 218 and 282 mV, respectively. For the magnetic composite, $\Delta E_p = 432$ mV, or twice that of the Nafion film. From the results for the reversible couples above, this is not due to a higher resistance in the magnetic composites. The asymmetry in the peak shifts compared to the other three systems shown in FIG. 12C also argues against a resistance effect. (Note that the interpretation of the kinetics can be complicated by the proton concentration. However, there is no reason to think the concentration is drastically different in the magnetic and nonmagnetic composites.) The peak shift may be due to the stabilization of the paramagnetic semiquinone intermediate.

While the hydroquinone electrolysis is too complex to interpret cleanly, it does raise the interesting question of whether quasireversible electron transfer rates can be influenced by an applied magnetic field. Reversible rates will not be affected, but it is not clear what would happen with quasireversible rates. There are many quasireversible electron transfer species uncomplicated by homogeneous kinetics and disproportionation reactions which can be used to better resolve this question. If the kinetics of quasireversible processes can be influenced by magnetic fields, numerous technological systems could be improved.

Cyclic Voltammetric Peak Shifts

When magnetic composites and Nafion films were compared, voltammograms taken at 0.1 V/s for the reversible species exhibited no change in $\Delta E_p$. However, the peak potential for reduction, $$E_p^{red},$$

for $Ru(NH_3)_6^{3+}$ was shifted 14 mV positive. Similarly, the oxidation potential peak, $$E_p^{ox},$$

for $Ru(bpy)_3^{2+}$ was shifted 64 mV positive. Shifts of $E_{0.5}$ while $\Delta E_p$ is unchanged are consistent with one species being held more tightly in the composites, and thereby, having a lower diffusion coefficient. In general, a shift in potential of approximately +35 mV is observed for all reversible redox species, whether the electron transfer process converts the redox species from diamagnetic to paramagnetic or paramagnetic to diamagnetic. Larger potential shifts are observed with less reversible electron transfer processes. Shifts as large as 100 mV have been observed. (Note that for the film thicknesses used herein ($\approx 3.6$ μm) and a scan rate of 0.1 V/s, $m \leq 10^{-8}$ cm$^2$/s is needed for the diffusion length to be confined within the film during the sweep. Since m is not known in these systems, it is not clear whether the voltammetric results also probe behavior at the composite/solution interface.)

The above discussion further shows that interfacial gradients other than concentration and electric potential, e.g., magnetic gradients, can be exploited effectively in microstructured matrices. In composites formed with magnetic materials, locally strong (and nonuniform) magnetic fields could alter transport and kinetics. The influence of the magnetic field on species in composites may be substantial because the species are concentrated in a micro-environment, where the distance between the field source and chemical species is not large compared to the field decay length. Magnetic composites were made by casting films of polystyrene coated magnetic beads and the perfluorinated, cation exchange polymer, Nafion, onto an electrode. Approximately 1 μm diameter magnetic beads were aligned by an external magnet as the casting solvents evaporated. Once the solvents evaporated and the external magnet was removed, the beads were trapped in the Nafion, stacked as magnetic pillars perpendicular to the electrode surface.

Preliminary voltammetric studies comparing the magnetic composites to simple Nafion films yielded several interesting results. First, flux of redox species through magnetic microbead composites is enhanced compared to flux through composites formed with nonmagnetic microbeads. Second, for species which underwent reversible electron transfer (i.e., $Ru(NH_3)_6^{3+}$ and $Ru(bpy)_3^{2+}$), the cyclic voltammetric peak potential difference ($\Delta E_p$) was unaffected, but the average of the peak potentials ($E_{0.5}$) shifted consistent with the stabilization of the paramagnetic species. Third, hydroquinone oxidation was quasireversible and proceeded through paramagnetic semiquinone. For hydroquinone at 0.1 V/s, voltammograms for the magnetic composites exhibited a 40 mV positive shift of $E_{0.5}$ and $\Delta \Delta E_p$ twice that of Nafion. The potential shifts and flux enhancements, while consistent with concentration and stabilization of the paramagnetic form of the redox couples, are as yet unexplained.

Electrochemical flux of ions and molecules through magnetic composites formed of Nafion ion exchange and polystyrene coated Iron oxide particles has been observed to be as much as twenty-fold higher than the flux through simple Nafion films. Flux enhancements have been observed with increasing difference in the magnetic susceptibility of the halves of the redox reaction.

Figure 13:
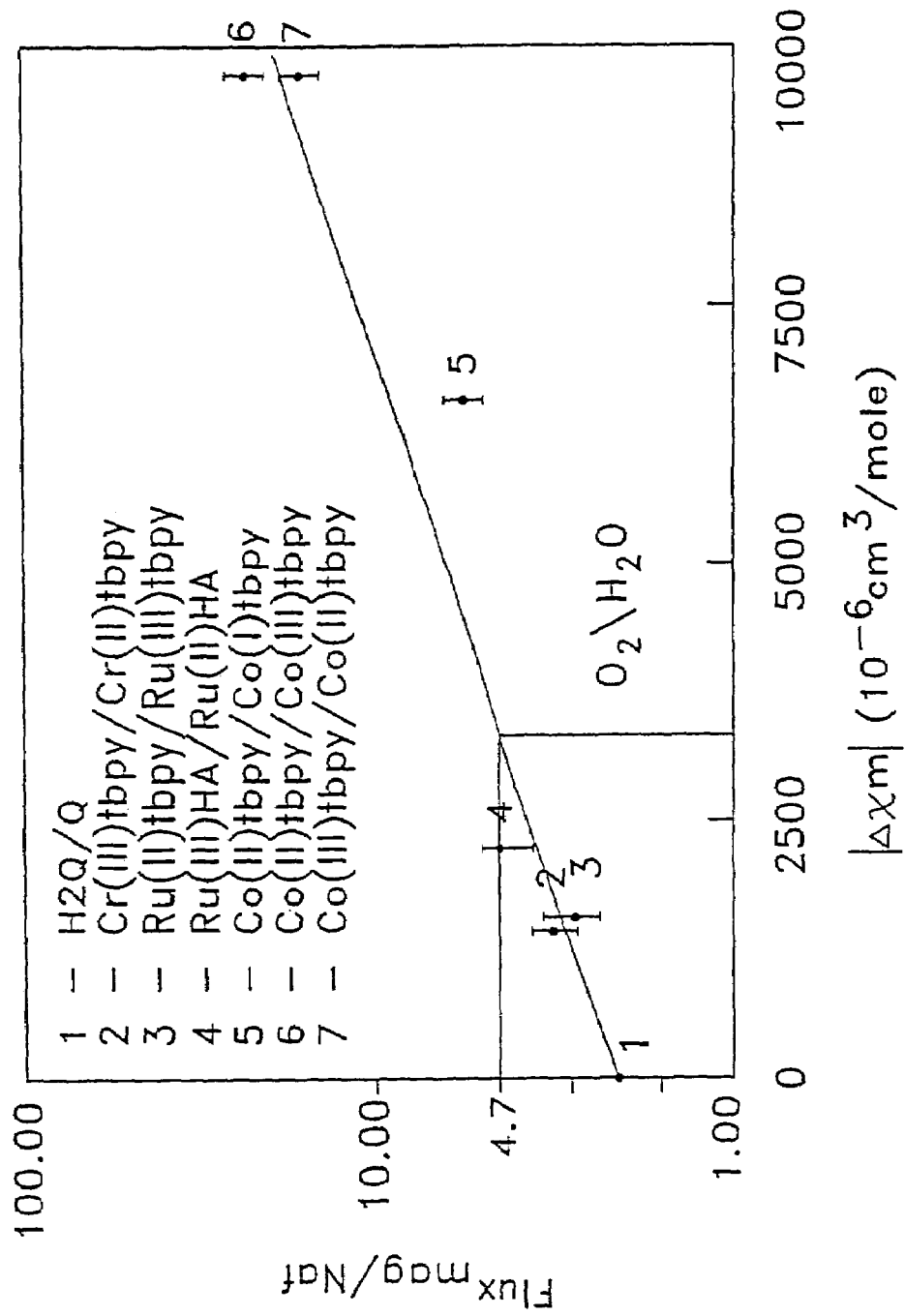
FIG. 13 shows a plot of the flux for seven redox species that is used for predicting a roughly five-fold flux enhancement of oxygen through a 15% magnetic Nafion composite over Nafion.

A passive, magnetic composite may be used to enhance the flux of oxygen at the cathode in a fuel cell. Oxygen has two unpaired electrons, and is therefore susceptible to this magnetic field in the same way as described in the experiments above. If oxygen is consistent with the observations made thus far for other ions and molecules, the electrochemical flux of oxygen to a magnetically modified cathode can be enhanced by approximately 500% as compared to a nonmagnetic cathode (FIG. 13). Such an enhancement would be comparable to that achieved by pressurization to 5 atmospheres at the cathode.

Based on the above discussion, it is possible to predict a roughly five-fold flux enhancement of oxygen through a 15% magnetic/Nafion composite over Nafion. This is understood by considering the fluxes through magnetic/Nafion composites and Nafion films of the seven redox species listed in the upper left hand corner of FIG. 13 and are the same species as listed in FIG. 11. The fluxes were determined by cyclic voltammetry. The flux ratio for magnetic composites to Nafion films is the y-axis and the absolute value of the difference in the molar magnetic susceptibilities $\theta_{\chi_m}|$) of products and reactants of the electrolysis reaction is the x-axis of FIG. 13, respectively. (The larger the value of $\chi_m$, the more susceptible a species is to interaction with a magnetic field.) From FIG. 13, the flux increases exponentially as $|\chi_m|$ increases. For the most extreme case, the flux is increased about twenty-fold. For the reduction of oxygen to water, $|\chi_m| \approx 3500 A 10^{-6}$ cm$^3$/mole. This point on the x-axis is extrapolated to therefore suggest that the flux enhancement for oxygen in the magnetic composite will approach five-fold.

Figure 14:
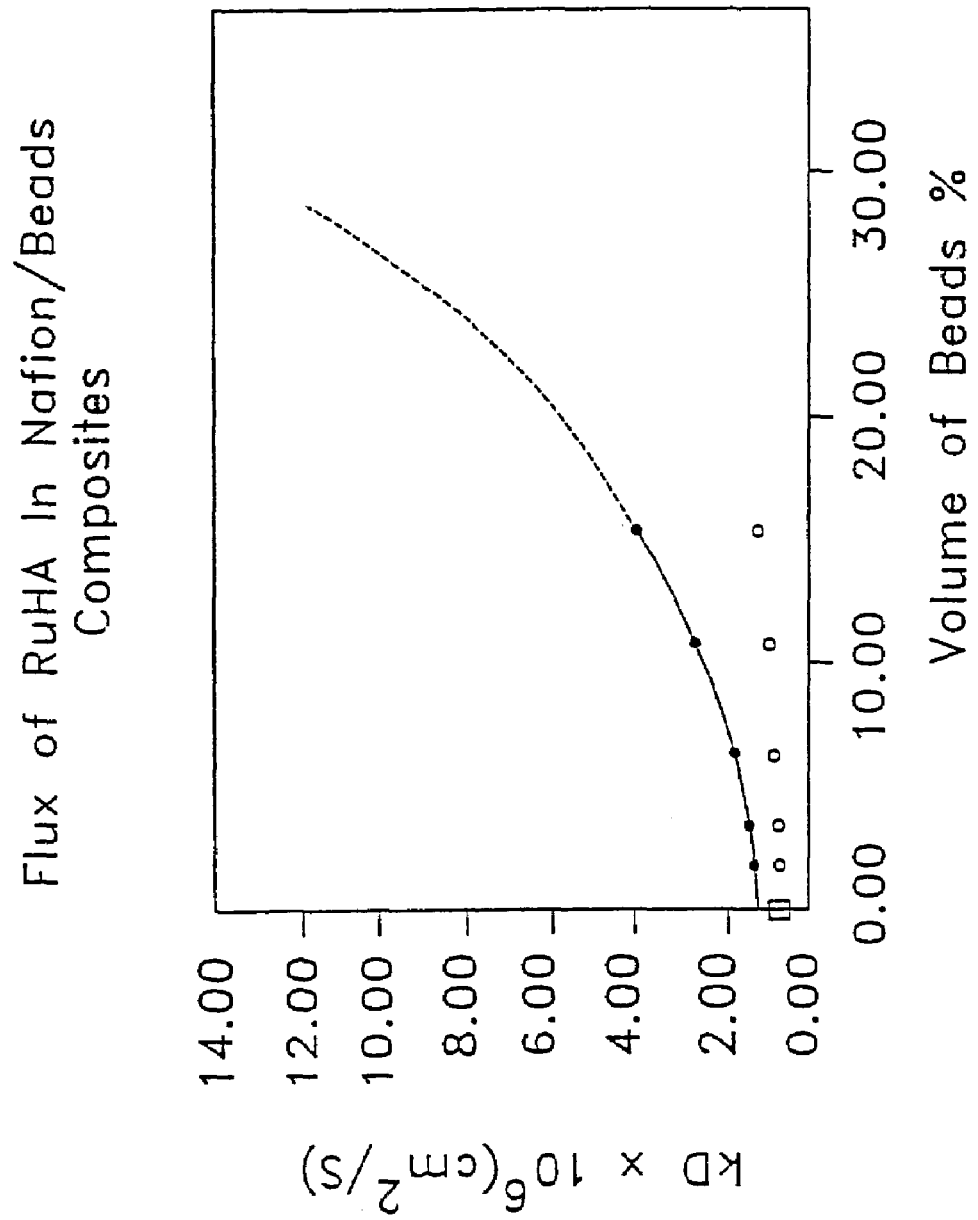
FIG. 14 shows a plot of the flux of Ru(NH3)63+ in magnetic bead/Nafion composites increasing as the fraction of magnetic beads increases.

Experiments have been conducted with Nafion composites of up to 15% Iron oxide particle beads. FIG. 14 shows a curve of the increase in flux based on the percentage of magnetic beads. The dotted line on FIG. 14 is the projected effect on flux of higher bead concentrations.

For paramagnetic species, the flux through the magnetic composites increases as the fraction of magnetic beads increases. In FIG. 14, the flux of Ru(NH$_3$)$_6^{3+}$ through magnetic bead/Nafion composites (●) increases as the fraction of magnetic beads in the composite is increased to 15%. Larger enhancements may be possible with higher bead fraction composites or composites formed with magnetic beads containing more magnetic material. Compared to a simple Nafion film (☐), the flux is 4.4 fold larger. Ru(NH$_3$)$_6^{3+}$ is less paramagnetic than oxygen. For comparison, composites formed with nonmagnetic polystyrene beads (o) were examined; these exhibited no flux enhancement as the bead fraction increased. The line shown on the plot is generated as a logarithmic fit to the data for the magnetic composites. It illustrates the flux enhancement that might be found for composites formed with a higher fraction of magnetic beads. The extrapolation suggests that at 30% magnetic beads, the flux through the magnetic composites of Ru(NH$_3$)$_6^{3+}$ might approach twenty times its value in simple Nafion films. As oxygen is more paramagnetic than Ru(NH$_3$)$_6^{3+}$ even larger enhancements might be anticipated for oxygen.

Oxygen Susceptibility to Magnetic Composites and Magnetic Concepts

Paramagnetic molecules have unpaired electrons and are drawn into (aligned by) a magnetic field (i.e., a torque will be produced; if a magnetic field gradient exists, magnetic dipoles will experience a net force). Radicals and oxygen are paramagnetic. Diamagnetic species, with all electrons paired, are slightly repelled by the field; most organic molecules are diamagnetic. (Metal ions and transition metal complexes are either paramagnetic or diamagnetic.) How strongly a molecular or chemical species responds to a magnetic field is parameterized by the molar magnetic susceptibility, $P_m$(cm$^3$/mole). For diamagnetic species, $P_m$ is between $(-1$ to $-500)A10^{-6}$ cm$^3$/mole, and is temperature independent. For paramagnetic species, $P_m$ ranges from 0 to $+0.01$ cm$^3$/mole, and, once corrected for its usually small diamagnetic component, varies inversely with temperature (Curie's Law). While ions are monopoles and will either move with or against an electric field, depending on the sign of the potential gradient (electric field), paramagnetic species are dipoles and will always be drawn into (aligned in) a magnetic field, independent of the direction of the magnetic vector. A net force on a magnetic dipole will exist if there is a magnetic field gradient. The magnetic susceptibilities of species relevant to this proposal are summarized below.

TABLE 3

Molar Magnetic Susceptibilities, $P_m$

| Species | Temperature (K) | $P_m$ (10$^{-6}$ cm$^3$/mole) |
|---|---|---|
| O$_2$ | 293 | 3449 |
| H$_2$O | 293 | −13 |
| H$_2$O$_2$ | — | −18 |

Figure 2:
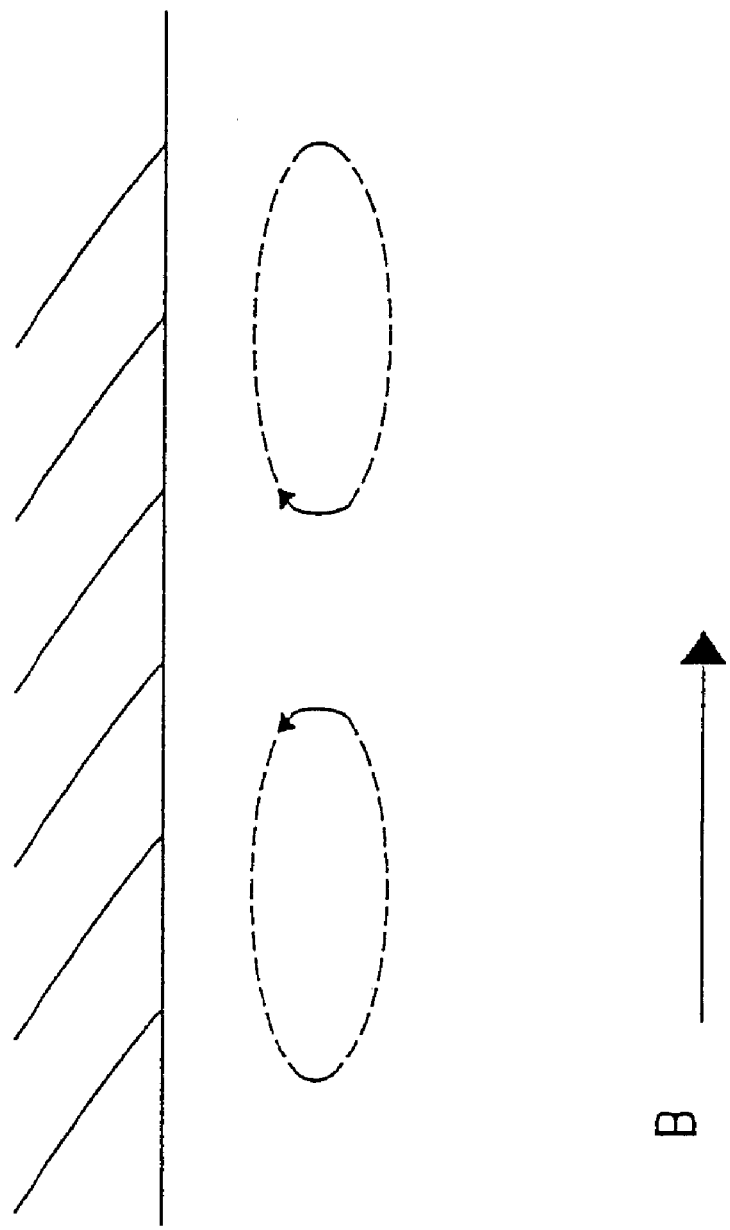
FIG. 2 shows the influence of electrode orientation and solvent motion on magnetohydrodynamic fluid motion for a second geometry.
Figure 3:
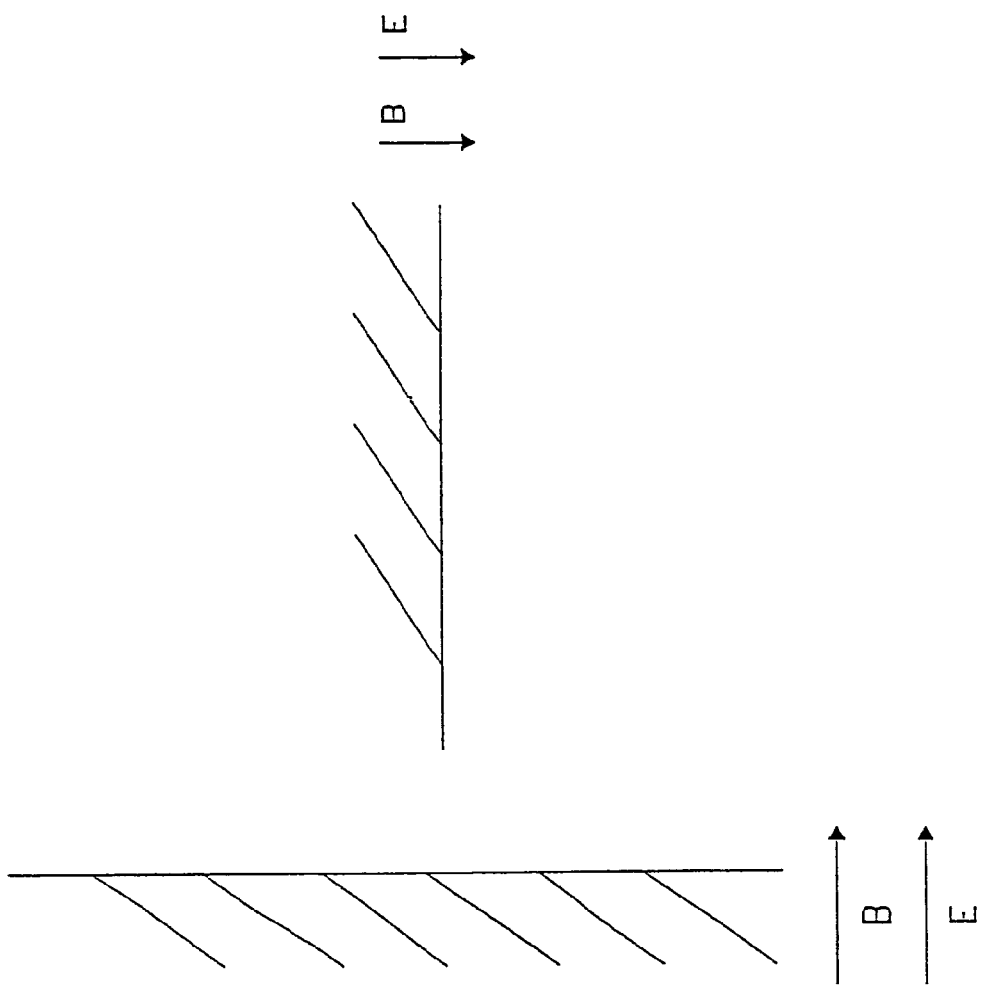
FIG. 3 shows the influence of electrode orientation and solvent motion on magnetohydrodynamic fluid motion for a third geometry.

Magnetic field effects were observed in electrochemical systems. Because electrochemistry tends to involve single electron transfer events, the majority of electrochemical reactions should result in a net change in the magnetic susceptibility of species near the electrode. Little has been reported, however, in electrochemistry on magnetic fields. What has been reported relates to magnetohydrodynamics. Magnetohydrodynamics describes the motion of the charged species (i.e., an ion) perpendicular to the applied magnetic field and parallel to the applied electric field (Lorentz force). In the composites described herein, the magnetic field, the direction of motion, and the electric field were all normal to the electrode. Because magnetohydrodynamics (see FIGS. 1-3) does not predict a motion dependence on the magnetic susceptibility of the moving species and requires that all the field and motion vectors are perpendicular (i.e., for magnetic effects), the effects described here are unlikely to be macroscopic magnetohydrodynamic effects.

Graded Density Composites

The following protocol is used to form density layers on electrodes with the density layers parallel to the electrode surface or other surface: A solution of a copolymer of sucrose and epichlorhydrin (commercially available as Ficoll and used to make macroscopic graded density columns for separations of biological cells by their bouancy) are made in water at concentrations varying from a few percent to 50% by weight. The viscosity of the solution is a monotonic function of the weight percent polymer. Small volumes of polymer solution (5 to 100 microliters) are pipetted onto to an electrode surface and the electrode spun at 400 rpm for two minutes; this creates a single polymer layer. By repeating this process with polymer solutions of different concentrations, a graded interface with density and viscosity varied as a function of the composition of the casting solution can be created. The thickness of each step in the staircase structure depends on the number of layers cast of a given concentration, and can range from 200 nm to several micrometers.

A similar structure with graded layers of ion exchange sites in ion exchange polymers can be formed by (1) spin casting a mixture of density gradient polymer and ion exchange polymer on the electrode or other surfaces as described above; (2) forming a density graded layer of density polymer first, and then adsorbing the ion exchange polymer into the matrix; (3) spin coating layers of ion exchange polymers on surfaces from solution of different concentrations. It should be possible to cast such layers, and then peel them off surfaces to form free standing films. Such films would have utility in controlling solvent transport across electrochemical cells, including fuel cells.

A protocol is proposed to form density layers on electrodes with the density layers perpendicular to the electrode surface or other surface. Electrodes and surfaces can be envisioned in which more than one gradient is established on the surface for purposes of separating molecules in more than one spatial and temporal coordinate and by more than one property. One example is to form composites with a magnetic gradient in one coordinate and a density gradient in the other. These materials could be formed by creating a magnetic gradient perpendicular to the electrode surface by placing magnetic beads on an electrode or surface and allowing the composite to be cast in a nonuniform field, where the external magnet is aligned so the beads are on the surface but not in columns perpendicular to the surface. A density payer could be cast (as opposed to spun coat) by pipetting small volumes of different concentration of density gradient polymer and/or ion exchange polymer and allowing the solvents to evaporate, thereby building up a graded layer parallel to the electrode surface. Once the entire layer is cast, the external magnet can be removed if the magnetic material is superparamagnetic, and left in place if the magnetic material is paramagnetic.

These would be fairly sophisticated composites, and complex to understand, but unusual flux enhancements and separations should be possible in several dimensions. It should be possible to design even more complex structures than these.

Modified Ion Exchangers

The surface of the magnetic microbeads have ion exchange groups on them which would allow ready chemical modification, e.g., like coating with a magnetically oriented liquid crystal for a local flux switch. Examples of such modified structures may have use in the quest to build microstructured devices and machines.

Applications

General Applications

Figure 15A:
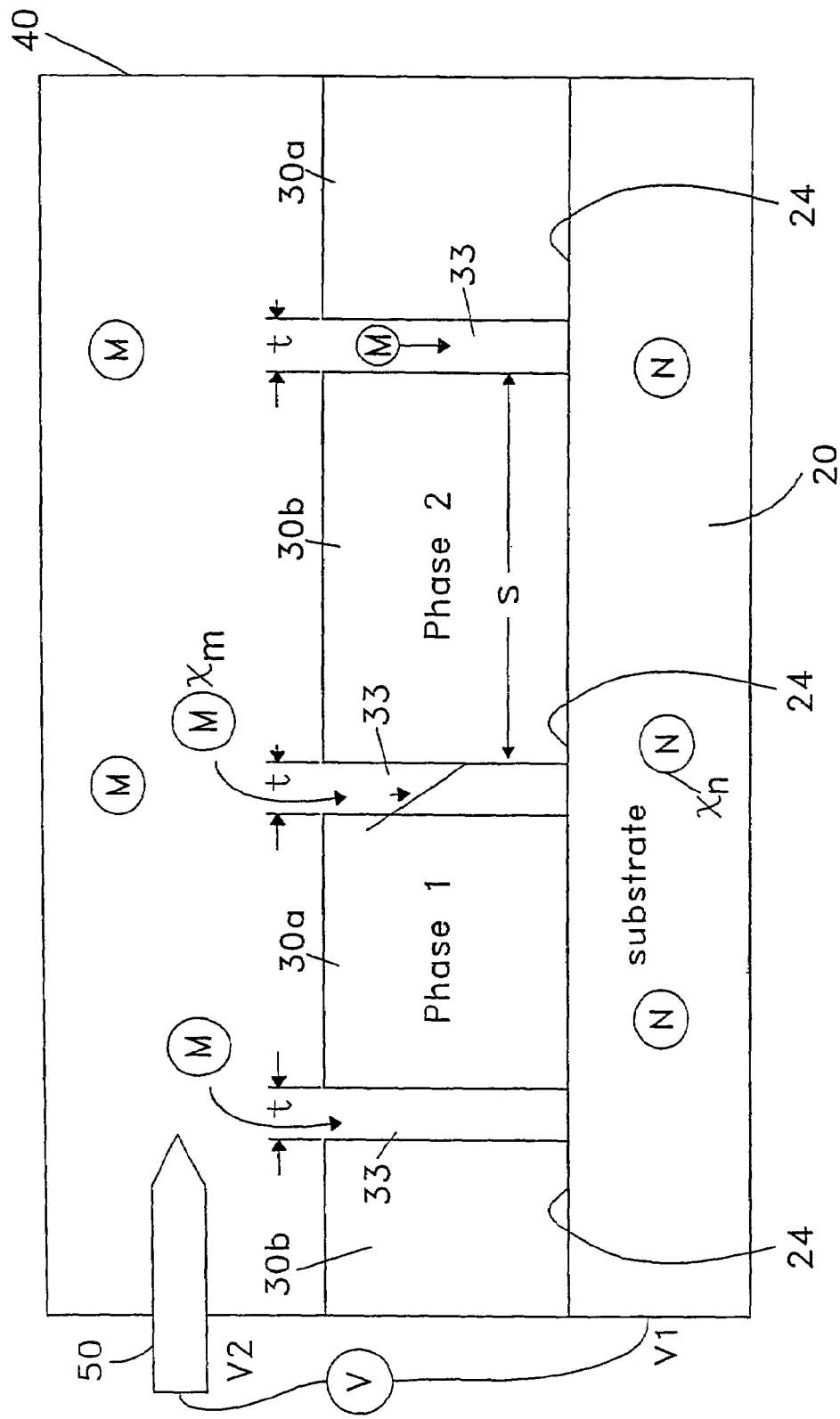
FIG. 15A shows a simplified representation used to describe how magnetic microboundaries influence a standard electrochemical process.

FIG. 15A shows a simplified representation which will be used to describe how magnetic microboundaries influence a standard electrochemical process. Here, a substrate 20 with a surface 24 serves as a conductor and hence can electrically conduct like a metal, a semiconductor or a superconductor. Substrate 20 is maintained at a first potential V1. Two different phases of materials 30a and 30b have two different magnetic fields. i.e., are in two different magnetic phases, phase 1 and phase 2, and are applied to surface 24 of substrate 20. Since materials 30a and 30b have different magnetic fields, boundary regions 33 have magnetic gradients. Boundary regions 33 are not necessarily sharp or straight, but the magnetic field of material 30a smoothly changes into the magnetic field of material 30b according to electromagnetic boundary conditions. Therefore width t represents an average width of boundaries 3. Width t should be approximately between a few nanometers to a few micrometers and preferably between one nanometer and approximately 0.5 micrometers. Boundary regions 33 are separated from each other by varying distances and S represents the average of those distances. The effect of varying distances S will be described below.

Particles M have a magnetic susceptibility $\chi_m$ and are in an electrolyte 40 which is at a potential V2 due to an electrode 50. This makes a potential difference of V between electrolyte 40 and substrate 20 (substrate 20 can effectively act as a second electrode). Boundary regions 33 are paths which can pass particles M. Particles M are then either driven electrically or via a concentration gradient toward substrate 20. Once particles M reach substrate 20, they either acquire or lose electrons, thereby turning into particles N with magnetic susceptibility $P_n$. The absolute value of the difference between the magnetic susceptibilities of phase 1 and phase 2 is a measure of the magnitude of the magnetic gradient in region 33 and will be referred to as the magnetic gradient of boundary region 33. It will be shown below that the flux of particles M increases approximately exponentially with respect to increasing the magnetic gradient of boundary region 33 with materials 30a and 30b when compared to the flux without materials 30a and 30b. This increase in flux can be over a factor of 35-fold or 3500% resulting in significant improvements in efficiency of many electrochemical processes.

Specific examples of electrochemical systems where magnets might improve an electrochemical cell or process include: chloralkali processing, electrofluoridation, corrosion inhibition, solar and photocells of various types, and acceleration of electrochemical reactions at the electrode and in the composite matrix. Potential shifts of $E_{0.5}$ are always observed and suggest an energy difference is generated by the magnetic fields and gradients in the composites; generically, this could improve performance of all electrochemical energy devices, including fuel cells, batteries, solar and photocells. In other application, sensors, including dual sensors for parametric species; optical sensors; flux switching; and controlled release of materials by control of a magnetic field, including release of drugs and biomaterials. There may also be applications in resonance imaging technology.

Boundaries 33 do not have to be equally spaced and do not have to have equal widths or thicknesses t. Materials 30a and 30b can be liquid, solid, gas or plasma. The only restriction is that a boundary 33 must exist, i.e., materials 30a and 30b must have two different magnetic fields to create the magnetic gradient within the width t. Magnetic gradient of region 33 can be increased by (1) increasing the magnetic content of the microbeads; (2) increasing the bed fraction in the composite; (3) increasing the magnetic strength of the beads by improving the magnetic material in the beads; and (4) enhancing the field in the magnetic microbeads by means of an external magnet. In general, the flux of particles M and N is correlated with magnetic susceptibility properties, $P_m$ and $P_n$. The above phenomena can be used to improve performance of fuel cells and batteries.

Figure 15B:
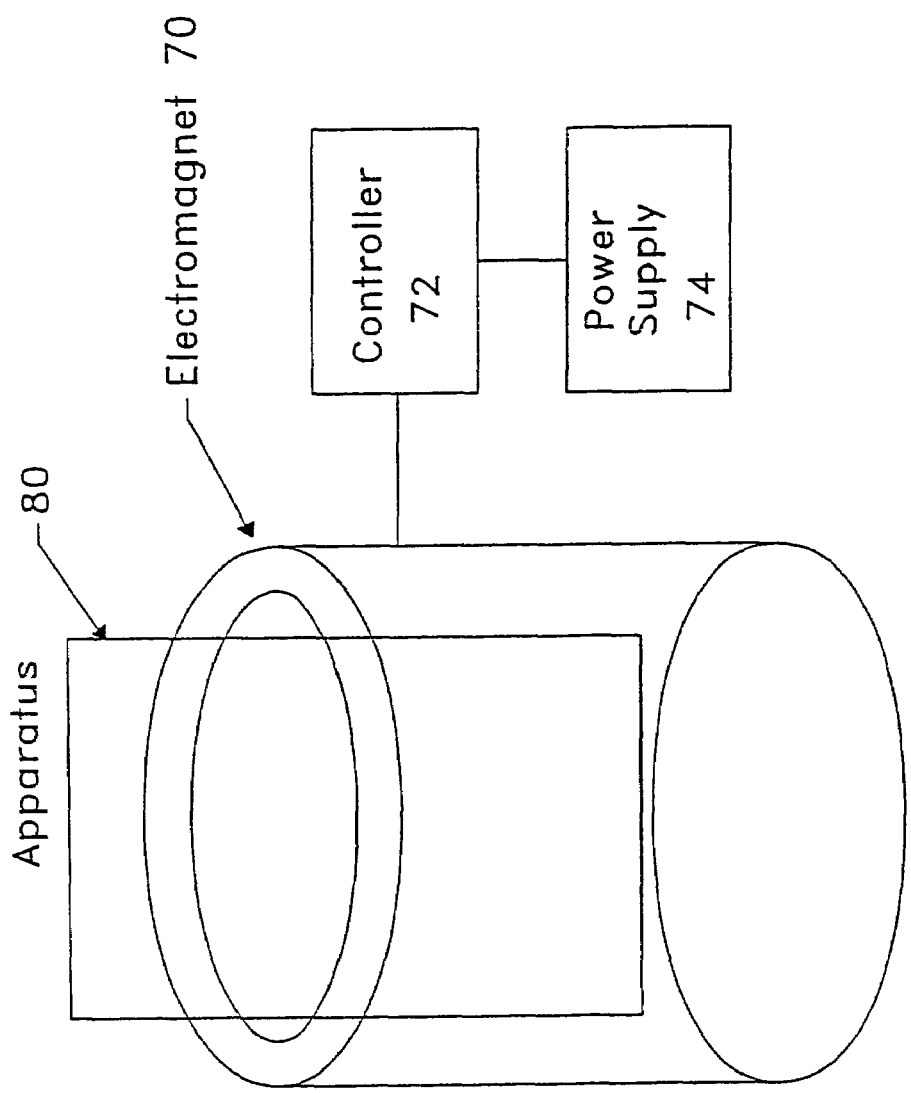
FIG. 15B shows a simplified representation of embodiments of the invention placed in an externally applied magnetic field provided by an electromagnet to alter the magnetic properties of those embodiments, where the field may be turned on or off, or it may be oscillated.
Figure 16:
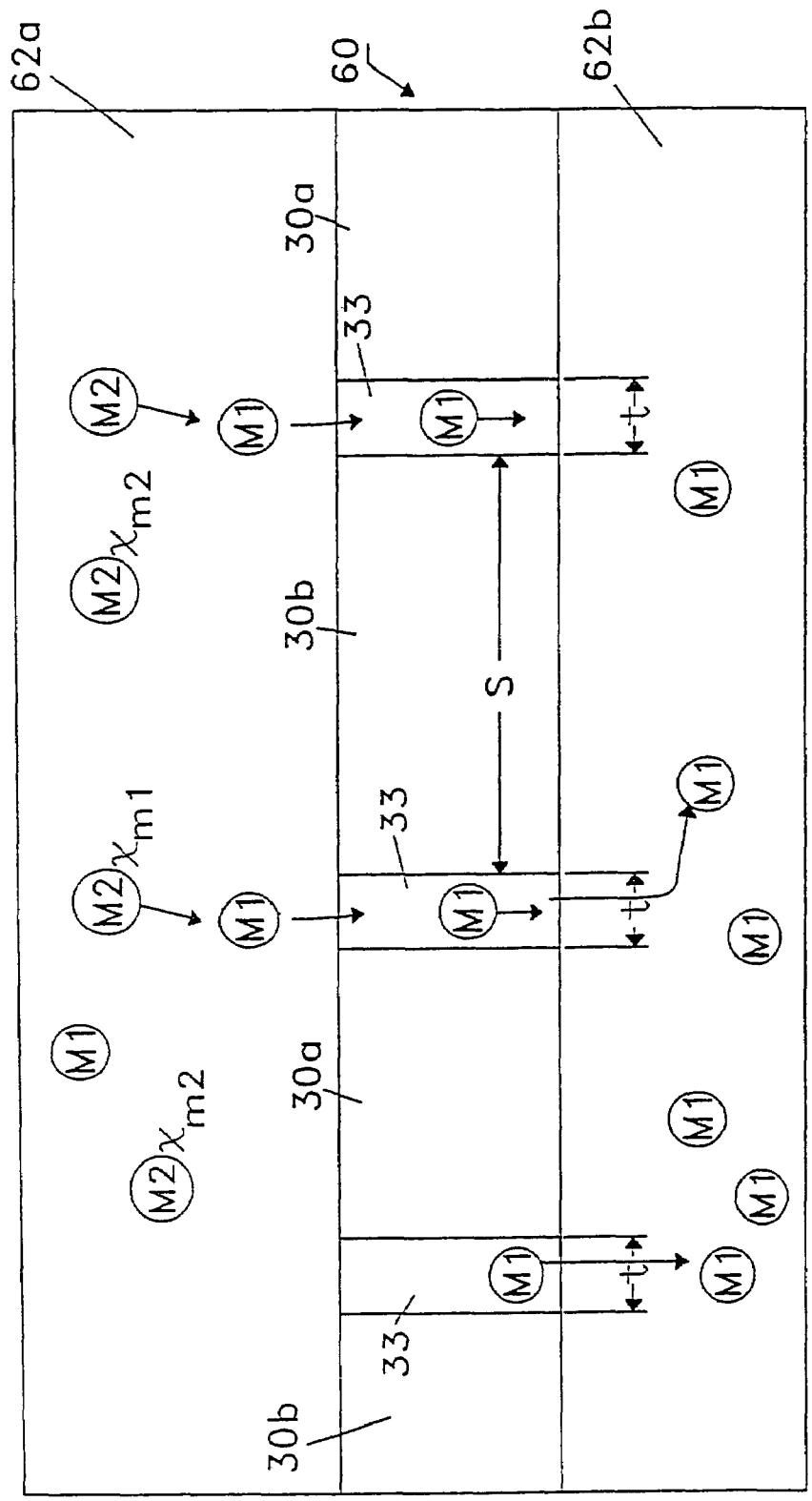
FIG. 16 shows a simplified diagram of a separator with no electrode or conductive substrate which separates a mixture of particles between a first solution and a second solution.

FIG. 15B shows apparatus 80 which corresponds to any of the above discussed embodiments as well as the embodiments shown in FIG. 16 or after. Some of the embodiments in their implementation require the presence of a magnetic field such as that produced by electromagnet 70 and some of the embodiments do not require electromagnet 70, although they can do so. Apparatus 80 corresponds to, for example, some embodiments of the magnetically modified electrode, the fuel cell, the battery, the membrane sensor, the dual sensor, and the flux switch. Electromagnet 70 can be any source of a magnetic field. Electromagnet 70 can also be used in the above discussed methods of forming the composite magnetic materials that require the presence of an externally applied magnetic field. Electromagnet 70 can be controlled by controller 72 to produce a constant or oscillating magnetic field with power supplied by power supply 74.

FIG. 16 shows another simplified diagram showing a second manifestation of the above described phenomenon and hence a second broad area of application. Namely, FIG. 16 shows a separator 60 which separates a first solution 62$a$ from a second solution 62$b$. Here, there is no electrode or conductive substrate 20. Solution 62$a$ has at least two different types of particles $M_1$ and $M_2$ with two different magnetic susceptibilities $\chi_{m1}$ and $\chi_{m2}$, respectively. Once particles $M_1$ or $M_2$ drift into an area near any one of boundaries 33, they are accelerated through the boundaries 33 by the magnetic gradient therein. Here, $\chi_{m1}$ is greater than $\chi_{m2}$, which causes the flux of particles $M_1$ through separator 60 to be greater than the flux of particles $M_2$ through separator 60. This difference in flux can again be over a factor of 3500%, and may somewhat cancel out any difference in acceleration due to different masses of particles $M_1$ and $M_2$. Consequently, if the above process is allowed to proceed long enough, most of the particles $M_1$ will have passed through separator 60 before particles $M_2$, thereby making first solution 62$a$ primarily made up of particles $M_2$ and second solution 62$b$ primarily made up of particles $M_1$. Note, separation of particles $M_1$ and $M_2$ may require some special tailoring of the separator 60 and also relies on how much time is allowed for particles $M_1$ and $M_2$ to separate. In an infinite amount of time, both particles $M_1$ and $M_2$ may cross separator 60. Particle size may also have a bearing on the ultimate separation of particles $M_1$ and $M_2$ by separator 60.

The above discussion with respect to FIG. 16 involves two types of particles, $M_1$ and $M_2$, but the discussion also holds for any number of particles. Consider, for example, solution 62$a$ having particles $M_1$, $M_2$, $M_3$ and $M_4$ with susceptibilities $\chi_{m1}$, $\chi_{m2}$, $\chi_{m3}$, and $\chi_{m4}$, respectively. If $\chi_{m1} > \chi_{m2} > \chi_{m3} > \chi_{m4}$, then $M_1$ would pass more easily through separator 60, followed by $M_2$, $M_3$, and $M_4$. The greater the difference between magnetic susceptibilities, the better the separation. The above phenomenon can be used to improve performance of fuel cells and batteries. Other applications include separation technology in general, chromatographic processes—includes higher transition metal species (lanthanides and actinides), and photography.

In the above discussion with respect to FIGS. 15 and 16, the greater the number of boundary regions 33 per unit area (i.e., the smaller S), the greater the effects due to the presence of boundary regions 33 macroscopically manifest themselves. S can vary from fractions of a micrometer to hundreds of micrometers. In quantum systems with smaller structures, S is further reduced to less than approximately 10 nm.

Design paradigms are summarized below to aid in tailoring composites for specific transport and selectivity functions.

Forces and gradients associated with interfaces, which are of no consequence in bulk materials, can contribute to and even dominate the transport processes in composites.

Increasing the microstructure of composites can enhance the influence of interfacial gradients.

The closer a molecule or ion is placed to the interface, the stronger the effect of the interfacial field on the chemical moiety. Systems should be designed to concentrate molecules and ions near interfaces.

The ratio of surface area for transport to volume for extraction parameterizes surface transport.

Fields in a microstructural environment can be non-uniform, but locally strong.

Strong but short range electrostatic and magnetic fields are better exploited in microstructured environments than in systems with externally applied, homogeneous fields.

Vectorial transport is plumbed into microstructured matrices by coupling two or more field or concentration interfacial gradients; the largest effects will occur when the gradients are either perpendicular or parallel to each other.

Control of surface dimensionality (fractality) is critical in optimizing surface transport in composites.

Several advantages are inherent in ion exchange composites over simple films. First, composites offer properties not available in simple films. Second, composites are readily formed by spontaneous sorption of the ion exchanger on the substrate. Third, while surfaces dominate many characteristics of monolayers and composites, three-dimensional composites are more robust than two-dimensional monolayers. Fourth, interfaces influence a large fraction of the material in the composite because of the high ratio of surface area to volume. Fifth, composites offer passive means of enhancing flux; external inputs of energy, such as stirring and applied electric and magnetic fields, are not required. Sixth, local field gradients can be exploited in composites because the fields and molecular species are concentrated in a micro-environment where both the decay length for the field and the microstructural feature length are comparable. In some of the composites, the field may be exploited more effectively than by applying an homogeneous field to a cell with an external source.

Specific Examples

Fuel Cells

Hence it would be very beneficial to achieve high efficiency compressor/expander power recovery technology. One way to improve the efficiency of the compressor/expander would be to reduce the pressure requirement. If a passive pressurization process could be provided within the fuel cell itself, at no cost to the power output of the fuel cell, power production from present day fuel cells would be increased by approximately 20%.

Magnetically modified cathodes may reduce the need for pressurization as oxygen is paramagnetic. The field may also alter oxygen kinetics. Potential shifts of +35 mV to +100 mV represent a 5% to 15% improvement in cell efficiency, a comparable savings in weight and volume. Also, in fuel cells, as hydrated protons cross the cell, the cathode floods and the anode dehydrates. Water transport may be throttled by composite separators of graded density and hydration.

Membrane Sensors

Membrane sensors for the paramagnetic gases $O_2$, $NO_2$, and NO (recently identified as a neurotransmitter) could be based on magnetic composites where enhanced flux would reduce response times and amplify signals. Sensors for other analytes, where oxygen is an interferant, could distinguish between species by using dual sensors, identical except one sensor incorporates a magnetic field. Examples of these sensors could be optical, gravimetric, or electrochemical, including amperometric and voltammetric. In sensors, the measured signal is proportional to the concentration of all species present to which the sensor applies. The presence of a magnetic component in the sensor will enhance sensitivity to paramagnetic species. Through a linear combination of the signal from two sensors, similar in all respects except one contains a magnetic component, and the sensitivity of the magnetic sensor to paramagnetic species (determined by calibration), it is possible to determine the concentration of the paramagnetic species. In a system where the sensors are only sensitive to one paramagnetic and one diamagnetic species, it is possible to determine the concentration of both species.

Flux Switches

As nanostructured and microstructured materials and machines develop into a technology centered on dynamics in micro-environments, flux switches will be needed. Externally applied magnetic fields can actuate flux switches using electrodes coated with composites made of paramagnetic polymers and iron oxide or other non-permanent magnetic material, or internal magnetic fields can actuate flux switches using electrodes coated with composites made of electroactive polymers or liquid crystals, where one redox form is diamagnetic and the other is paramagnetic, and organo-Fe or other superparamagnetic or ferrofluid materials or permanent magnetic or aligned surface magnetic field material. Also, an external magnet can be used to orient paramagnetic polymers and liquid crystals in a composite containing paramagnetic magnetic beads. Enhanced orientation may be possible with magnetic beads containing superparamagnetic of ferrofluid materials.

Batteries

Batteries with increased current densities and power, as well as decreased charge and discharge times may be made with magnetic bead composites. The improvements would be driven by flux enhancement, transport enhancement, electron kinetic effects, or by capitalizing on a potential shift. The required mass of microbeads would little affect specific power. Since magnetic fields can suppress dendrite formation, secondary battery cycle life may be extended. Examples include magnetically modified electrodes. The magnetic coatings may be on the electrodes or elsewhere in the battery structure.

Figure 17:
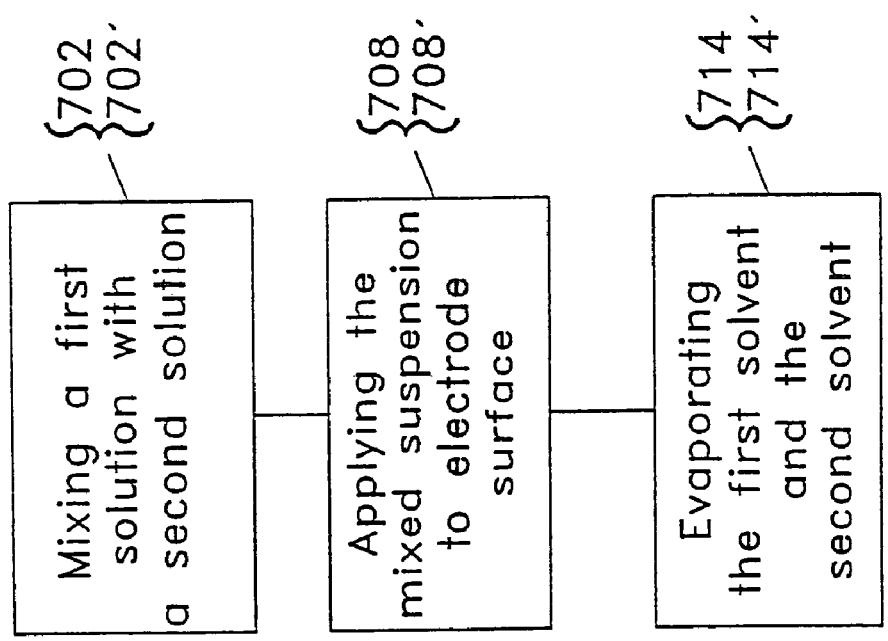
FIG. 17 is a short summary of steps involved in a method of making an electrode according to two embodiments of the invention.

FIG. 17 is a short summary of steps involved in a method of making an electrode according to two embodiments of the invention. In one embodiment, the method is a method of making an electrode with a surface coated with a magnetic composite with a plurality of boundary regions with magnetic gradients having paths to the surface of the electrode according to one embodiment of the invention. In particular step 702 involves mixing a first solution which includes a suspension of at least approximately 1 percent by weight of inert polymer coated magnetic microbeads containing between approximately 10 percent and approximately 90 percent magnetizable polymer material having diameters at least about 0.5 micrometers in a first solvent with a second solution of at least approximately 2 percent by weight of ion exchange polymers in a second solvent to yield a mixed suspension. Step 708 then involves applying the mixed suspension to the surface of the electrode. The electrode is arranged in a magnetic field of at least approximately 0.05 Tesla, wherein the magnetic field has a component oriented approximately along the normal of the electrode surface and preferably is entirely oriented approximately along the normal of the electrode surface. Step 714 then involves evaporating the first solvent and the second solvent to yield the electrode with a surface coated with the magnetic composite having a plurality of boundary regions with magnetic gradients having paths to the surface of the electrode.

Step 702 can include mixing the first solution which includes a suspension of between approximately 2 percent and approximately 10 percent by weight of inert polymer coated magnetic microbeads with the second solution. Alternatively, step 702 can include mixing the first solution which includes inert polymer coated magnetic microbeads containing between 50 percent and 90 percent magnetizable polymer material with the second solution. Alternatively, step 702 can include mixing the first solution which includes inert polymer coated magnetic microbeads containing 90 percent magnetizable polymer material with the second solution.

In addition, step 702 can include mixing a first solution which includes a suspension of at least approximately 5 percent by weight of inert polymer coated magnetic microbeads containing between approximately 10 percent and approximately 90 percent magnetizable polymer material having diameters ranging between approximately 0.5 micrometers and approximately 12 micrometers. Alternatively, step 702 can include mixing a first solution which includes a suspension of at least approximately 5 percent by weight of inert polymer coated magnetic microbeads containing between approximately 10 percent and approximately 90 percent magnetizable polymer material having diameters ranging between approximately 1 micrometer and approximately 2 micrometers.

Mixing step 702 can also involve mixing a first solution which includes a suspension of at least approximately 5 percent by weight of inert polymer coated magnetic microbeads containing between approximately 10 percent and approximately 90 percent magnetizable polymer material having diameters at least 0.5 micrometers in a first solvent with a second solution of at least approximately 5 percent by weight of Nafion in a second solvent to yield the mixed suspension.

Step 702 can involve mixing a first solution which includes a suspension of at least approximately 5 percent by weight of inert polymer coated magnetic microbeads containing between approximately 10 percent and approximately 90 percent organo-Fe material having diameters at least 0.5 micrometers in a first solvent with a second solution of at least approximately 5 percent by weight of ion exchange polymers in a second solvent to yield the mixed suspension.

Step 708 can include applying approximately between 2 percent and approximately 75 percent by volume of the mixed suspension to the surface of the electrode. Alternatively, step 708 can include applying between 25 percent and 60 percent by volume of the mixed suspension to the surface of the electrode. In yet another approach step 708 can involve applying the mixed suspension to the surface of the electrode, the electrode being arranged in a magnetic field between approximately 0.05 Tesla and approximately 2 Tesla and preferably the magnetic field is approximately 2 Tesla.

An alternative embodiment involving steps 702' through 714' (also shown is FIG. 17) involves the use of an external magnetic field. That is, again the method of making an electrode with a surface coated with a composite with a plurality of boundary regions with magnetic gradients having paths to the surface of the electrode when the external magnetic field is turned on. The steps 702 through 714 are then modified into steps 702' through 714' as follows. Step 702' involves mixing a first solution which includes a suspension of at least 5 percent by weight of inert polymer coated microbeads containing between 10 percent and 90 percent magnetizable non-permanent magnet material having diameters at least 0.5 micrometers in a first solvent with a second solution of at least 5 percent of ion exchange polymers in a second solvent to yield a mixed suspension. Step 708' then involves applying the mixed suspension to the surface of the electrode. Step 714' involves evaporating the first solvent and the second solvent to yield the electrode with a surface coated with the composite having a plurality of boundary regions with magnetic gradients having paths to the surface of the electrode when the external magnet is turned on.

Figure 18A:
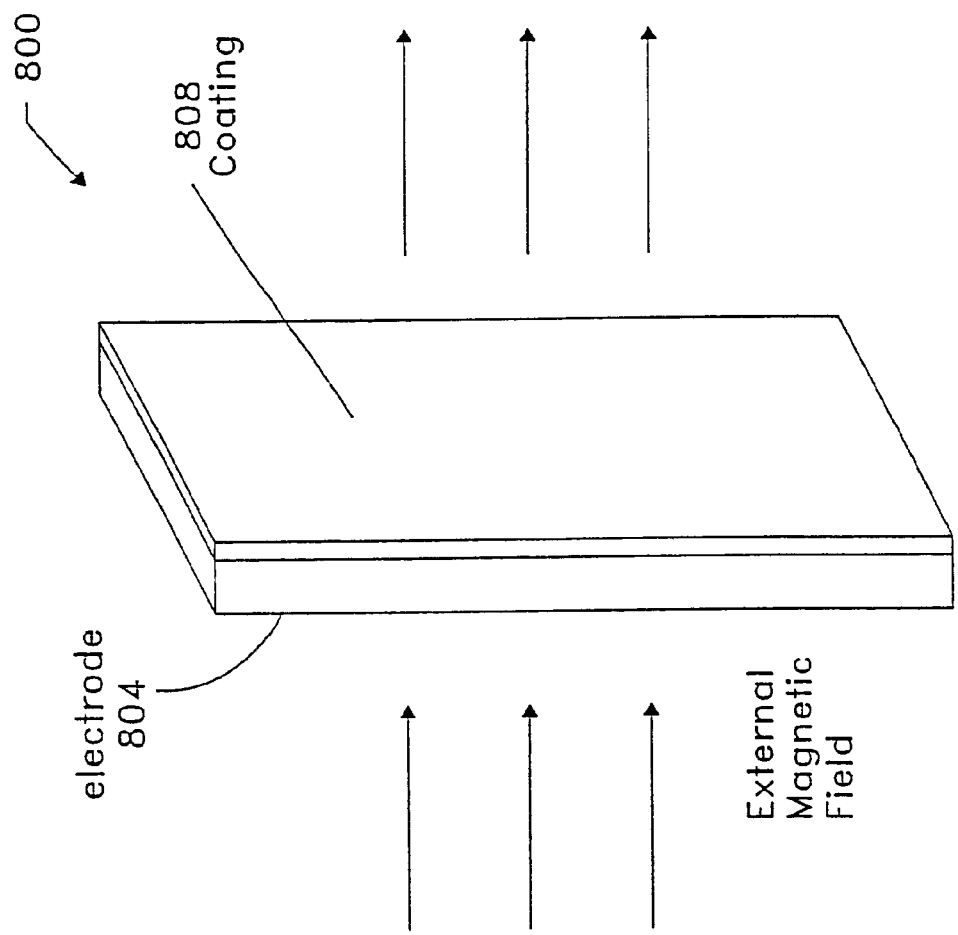
FIGS. 18A and 18B show a flux switch 800 to regulate the flow of a redox species according to yet another embodiment of the invention.
Figure 18B:
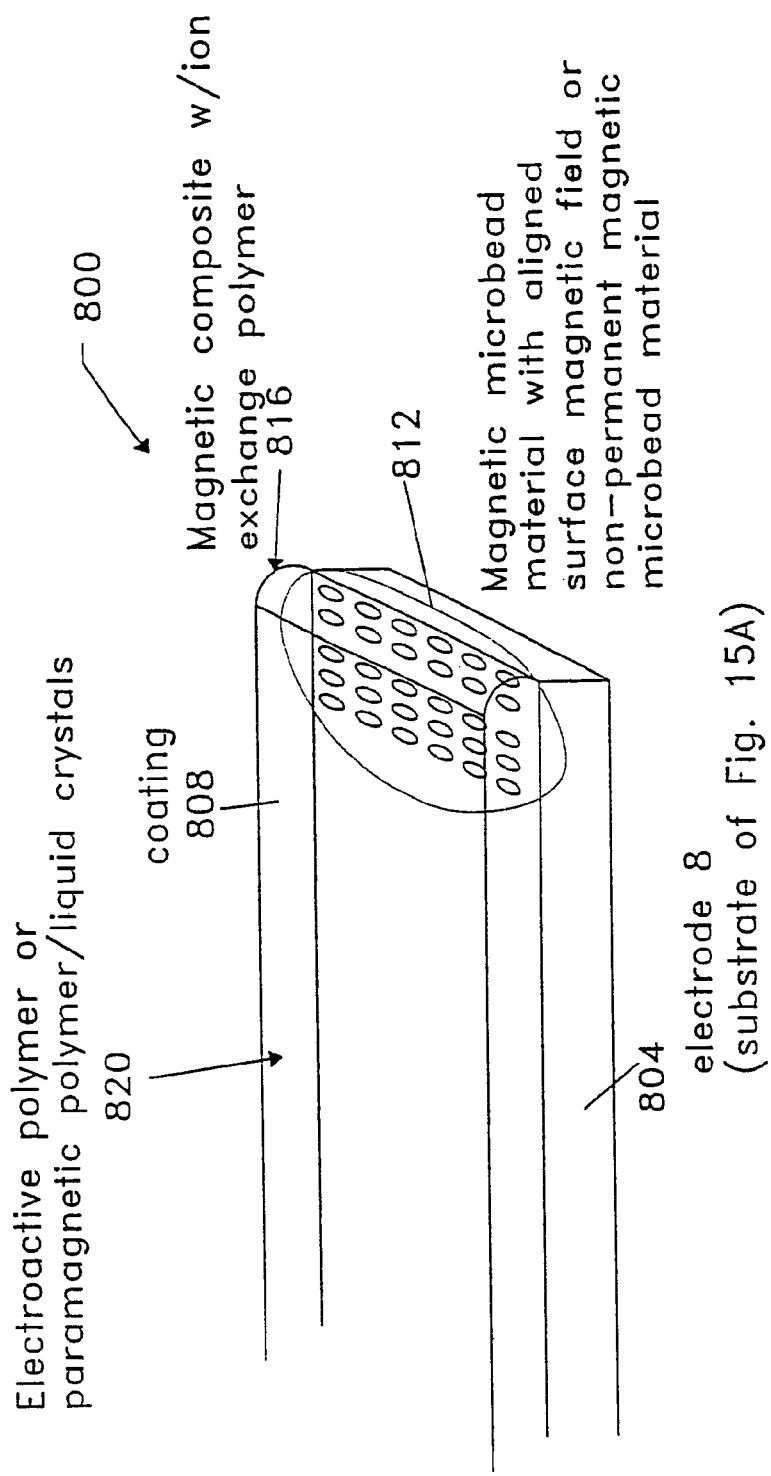

FIGS. 18A and 18B show a flux switch 800 to regulate the flow of a redox species according to yet another embodiment of the invention. In particular, FIGS. 18A and 18B show an electrode 804 and a coating 808 on the electrode 804. Coating 808 is formed from a composite which includes magnetic microbead material 812 with an aligned surface magnetic field, an ion exchange polymer 816; and an electro-active polymer 820 in which a first redox form is paramagnetic and a second redox form is diamagnetic, wherein the flux switch is actuated by electrolyzing the electro-active polymer from the first redox form ordered in the magnetic field established by the coating to the second redox form disordered in the magnetic field.

Microbead material 812 can include organo-Fe material. The redox species can be more readily electrolyzed than the electro-active polymer. Electro-active polymer 820 can be an electro-active liquid crystal with chemical properties susceptible to said magnetic field or an electro-active liquid crystal with viscosity susceptible to said magnetic field. Electro-active polymer 820 include an electro-active liquid crystal with phase susceptible to said magnetic field. Electro-active polymer 812 can include poly(vinyl ferrocenium). In addition, the externally applied magnetic field, and wherein said magnetic microbead material comprises organo-Fed material.

Figure 19:
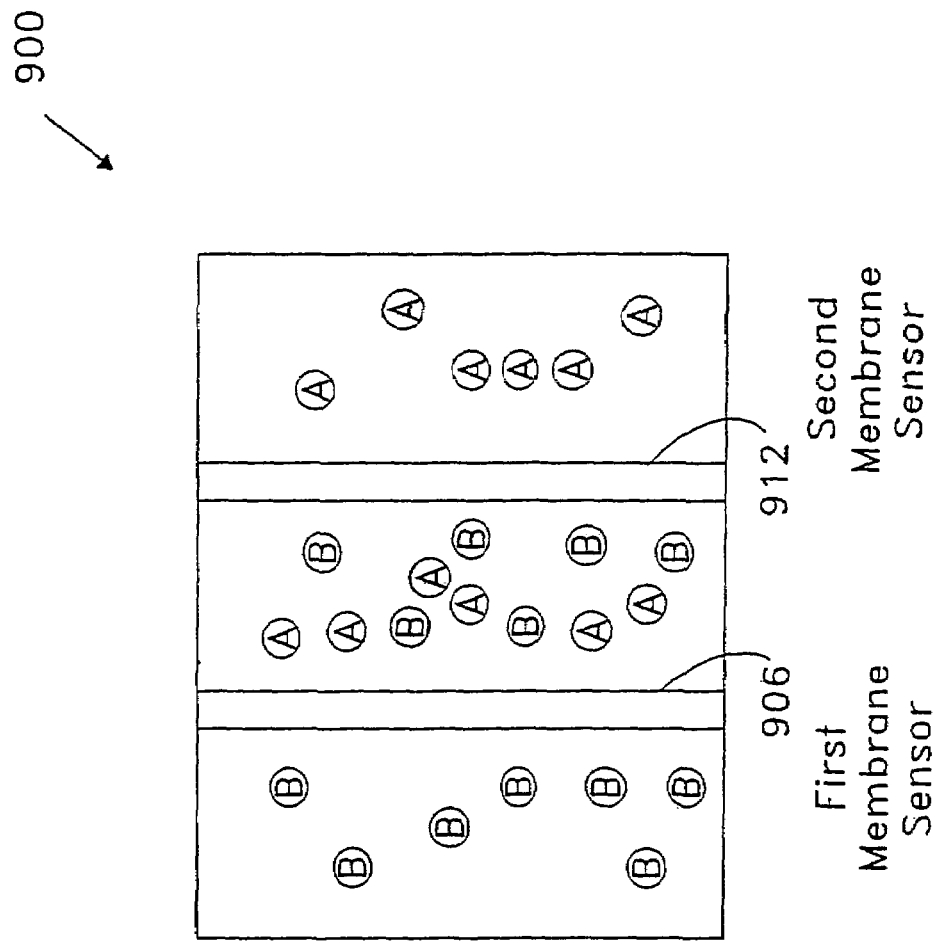
FIG. 19 shows a dual sensor 900 for distinguishing between a first species (particles A) and a second species (particles B).

FIG. 19 shows a dual sensor 900 for distinguishing between a first species (particles A) and a second species (particles B). The dual sensor includes a first membrane sensor 906 which preferentially passes the first species over the second species; and a second membrane sensor 912, which preferentially enhances the concentration of the second species over the first species, thereby enabling the measurement of at least the first species. The first and second species can be in any state such as liquid, gaseous, solid and plasma.

In one embodiment, the first species can include a paramagnetic species and the second species can include a diamagnetic species. In this case, the first membrane sensor 906 is a magnetically modified membrane sensor, and the second membrane sensor 912 is an unmodified membrane sensor. The magnetically modified membrane sensor preferentially enhances the concentration of and allows the detection of the paramagnetic species over the diamagnetic species and the unmodified membrane sensor enhances the concentration of and allows the detection of the diamagnetic species and the paramagnetic species, enabling the measurement of the concentration of at least the paramagnetic species. More particularly, the paramagnetic species can be one of $O_2$, $NO_2$, and NO. The diamagnetic species can be $CO_2$.

In another embodiment, the first species can include a paramagnetic species and the second species can include a nonmagnetic species. In this case, the first membrane sensor 906 is a magnetically modified membrane sensor, and the second membrane sensor includes an unmodified membrane sensor. The magnetically modified membrane sensor preferentially enhances the concentration of and allows the detection of the paramagnetic species over the nonmagnetic species and the unmodified membrane sensor enhances the concentration of and allows the detection of the nonmagnetic species and the paramagnetic gaseous species, thereby enabling the measurement of the concentration of at least the paramagnetic species. More particularly, the paramagnetic species can be one of O2, NO2, and NO.

In yet another embodiment, the first species can include a diamagnetic species and the second species can include a second diamagnetic species. In this case, the first membrane sensor 906 is a magnetically modified membrane sensor, and the second membrane sensor 912 is a differently magnetically modified membrane sensor. The magnetically modified membrane sensor preferentially enhances the concentration of and allows the detection of the first diamagnetic species over the second diamagnetic species and the differently magnetically modified membrane sensor enhances the concentration of and allows the detection of the second paramagnetic species and the diamagnetic species, enabling the measurement of the concentration of at least the first diamagnetic species. The first diamagnetic species can include $CO_2$.

In yet another embodiment, the first species can be a first paramagnetic species and the second species can be a second paramagnetic species. In this case, the first membrane 906 is a magnetically modified membrane sensor, and the second membrane 912 is a differently magnetically modified membrane sensor, wherein the magnetically modified membrane sensor preferentially enhances the concentration of and allows the detection of the first paramagnetic species over the second paramagnetic species and the differently magnetically modified membrane sensor enhances the concentration of and allows the detection of the second paramagnetic species and the first paramagnetic species, enabling the measurement of the concentration of at least the first paramagnetic species. Again, the first paramagnetic species is one of $O_2$, $NO_2$, and NO.

In yet another embodiment of the invention, the first species can be a diamagnetic species and the second species can be a nonmagnetic species. In this case, the first membrane sensor 906 is a magnetically modified membrane sensor, and the second membrane sensor 912 is an unmodified membrane sensor, wherein the magnetically modified membrane sensor preferentially enhances the concentration of and allows the detection of the diamagnetic species over the nonmagnetic species and the unmodified membrane sensor enhances the concentration of and allows the detection of the nonmagnetic species and the diamagnetic species, enabling the measurement of the concentration of at least the diamagnetic species.

Figure 20:
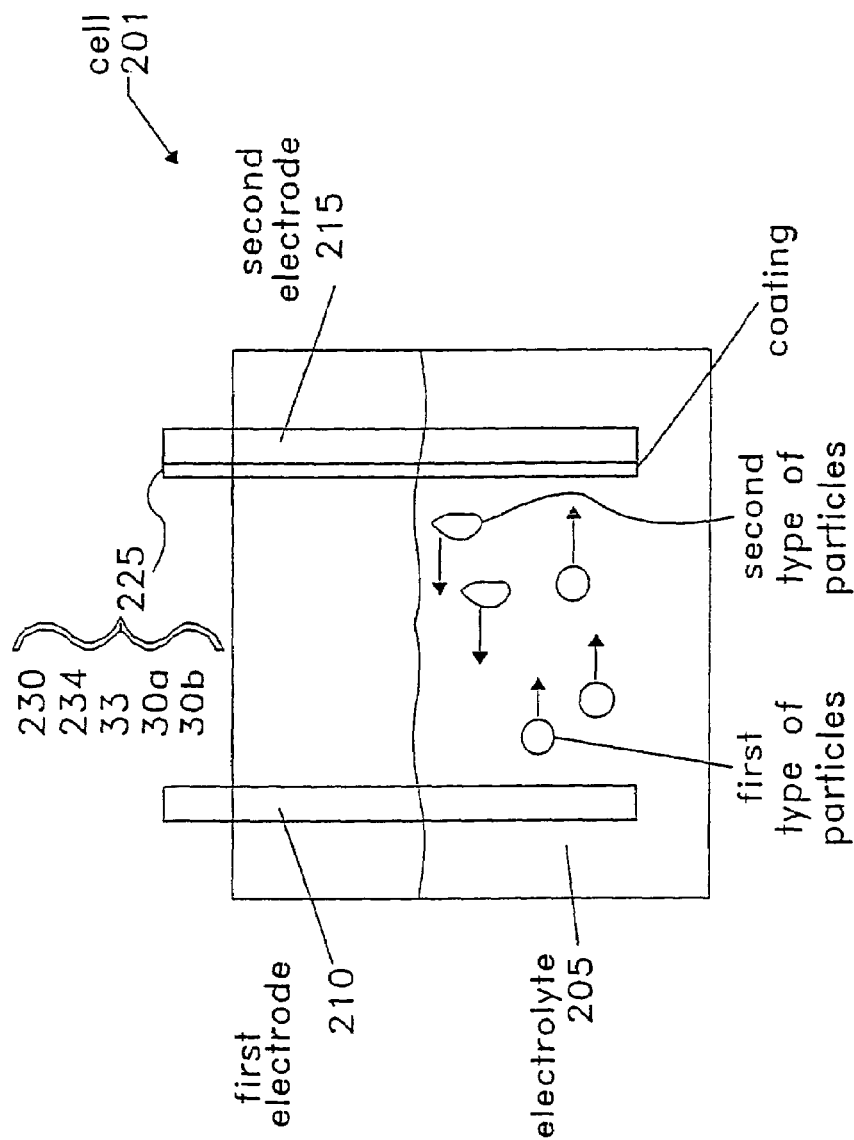
FIG. 20 shows a cell 201 according to another embodiment of the invention.

FIG. 20 shows a cell 201 according to another embodiment of the invention. In particular, FIG. 20 shows an electrolyte 205 including a first type of particles. A first electrode 210 and a second electrode 215 are arranged in electrolyte 205. The first type of particles transform into a second type of particles once said first type of particles reach said second electrode 215. Second electrode 215 has a surface with a coating 225 fabricated according to the above methods. Coating 225 includes a first material 230 having a first magnetism, a second material 234 having a second magnetism, thereby creating a plurality of boundaries (33 of FIG. 15A) providing a path between said electrolyte 205 and said surface of said second electrode 215. Each of said plurality of boundaries having a magnetic gradient within said path, said path having an average width of approximately one nanometer to approximately several micrometers, wherein said first type of particles have a first magnetic susceptibility and said second type of particles have a second magnetic susceptibility and the first and said second magnetic susceptibilities are different. Coating 225 operates in the manner described with respect to FIG. 16.

First material 230 in coating 225 can include a paramagnetic species and said second material 234 can include a diamagnetic species. Alternatively, first material 230 can include a paramagnetic species having a first magnetic susceptibility and the second material 234 can include a paramagnetic species having a second magnetic susceptibility, and said first magnetic susceptibly is different from said second susceptibility. In yet another approach, said first material 230 can include a diamagnetic species having a first magnetic susceptibility while said second material 234 includes a diamagnetic species having a second magnetic susceptibility, and said first magnetic susceptibly is different from said second susceptibility. In another approach, the first material 230 could alternatively include a paramagnetic species having a first magnetic susceptibility and said second material 234 comprises a nonmagnetic species. In another approach, said first material 230 can include a diamagnetic species having a first magnetic susceptibility and said second material 234 can include a nonmagnetic species. Electrolyte can be an electrolyzable gas such as $O_2$ or can include a chlor-alkali.

EXPERIMENTAL

I. General Considerations

A. Background

The performance of nickel hydroxide positive electrodes was examined. The performance of the nickel hydroxide electrode was evaluated by using a paste-type electrode consisting of nickel hydroxide particles, binder, and, in some cases, other magnetizable microparticles or glass beads. As used herein, the phrase "nickel hydroxide slurry" is simply intended to indicate that the slurry at least contained nickel hydroxide particles; such slurries may also include glass beads or other magnetizable particles, as set forth hereinbelow. To form the electrode, the nickel hydroxide slurry was cast onto a platinum electrode that was used as the substrate and the current collector. Magnetized and non-magnetized electrodes, either with or without glass beads or other magnetizable particles, were examined by cyclic voltammetry and peak currents were recorded.

Experiments were carried out with a classical three-electrode electrochemical cell utilizing a working electrode, a counter electrode and a reference electrode. The working electrode, where the reaction of interest took place, was a platinum disk coated with a nickel hydroxide slurry held downward and parallel to the earth. The electrode was coated with nickel hydroxide, nickel hydroxide plus other magnetizable materials or nickel hydroxide plus glass beads. The surface area of the working electrode (Pine Instruments) was 0.459 cm². The counter electrode was a large piece of nickel foam that was spot welded to a nickel plate. The nickel foam was held parallel to the working electrode. A saturated calomel electrode (SCE) was employed as the reference electrode because it is an ideal, nonpolarizable electrode that provides a stable reference potential. In such a three-electrode system, no current passes through the reference electrode.

Data were collected using a Bioanalytical Systems (BAS) potentiostat, Model 100B/W Version 2. This potentiostat is a computer controlled system. The temperature of the cell was controlled by a refrigerated constant temperature circulator (Model VWR 1155).

B. Materials

Nickel hydroxide and cobalt extra fine powder were obtained from Union Miniere (UM), a Belgian-based group. UM Cobalt & Energy Products manufactures spherical nickel hydroxide at its wholly owned subsidiary TIMEX Inc., in Leduc (Alberta, Canada). The physical and chemical analysis data for nickel hydroxide are listed in the Table 4. The physical and chemical properties of the extra fine cobalt powder are listed in the Table 5. Nickel foam was obtained from INCO Selective Surfaces Inc. (Wyckoff, N.J.). Hydroxypropyl methylcellulose (2 wt. % in $H_2O$) with viscosity of 15,000 cps, KOH, and nickel plate were purchased from Aldrich Chemical Company, Inc. (Milwaukee, Wis.). Unless otherwise indicated, iron oxide ($Fe_3O_4$) particles and neodymium iron boron (NdFeB) particles were coated with 3-aminopropyltrimethoxysilane. Uncoated samarium cobalt ($Sm_2Co_7$) was obtained from Polyscience.

TABLE 4

Physical and Chemical Properties of Spherical Nickel Hydroxide Particles (from UM Cobalt and Energy)

|  | Principle uses | Ni-MH Batteries |
|---|---|---|
| Physical Data | Insoluble in water |  |
|  | Appearance | green powder |
|  | Molecular weight | 92.7 |
|  | Apparent density g/cm³ | >1.6 |
|  | Tap density g/cm³ | 2.2 |
|  | Crystallinity FWHM 38.5 | 1.0 |
|  | D(50) (Microtrac) m | 9-12 |
|  | Surface Area, BET m²/g | 12 or 20 |
| Chemical Typical Value | Ni wt. % | 57-62 |
|  | Co wt. % | 0-5 |
|  | Zn wt. % | 0-5 |
|  | Cd wt. % | 0.0005 |
|  | Mn wt. % | 0.04 |
|  | Cu wt. % | 0.0005 |
|  | Pb wt. % | 0.0001 |
|  | Fe wt. % | 0.002 |
|  | Ca wt. % | 0.04 |
|  | C wt. % | 0.04 |
|  | $NO_3$ wt. % | 0.004 |
|  | N as $NH_3$ wt. % | 0.0175 |
|  | $SO_4$ wt. % | <0.4 |
|  | $H_2O$ wt. % | <1.5 |

TABLE 5

Physical and Chemical Properties of Cobalt Powder (from UM Cobalt and Energy)

| Average diameter, nm | 1.42 |  |
|---|---|---|
| Tap density, g/cm | 2.2 |  |
| Apparent density g/cm | 1.0 |  |
| Size Analysis: | 0 to 5 nm | min % 90 |
|  | 5 to 10 nm | max % 10 |
|  | >10 nm | max % 0.5 |
| Elemental Analysis: |  |  |
| Co |  | min wt. % 99.85 |
| C |  | max wt. % 0.030 |
| S |  | max wt. % 0.001 |
| Si |  | max wt. % 0.005 |
| Mg |  | max wt. % 0.005 |
| Mn |  | max wt. % 0.005 |
| Cu |  | max wt. % 0.002 |
| Ni |  | max wt. % 0.080 |
| Ca |  | max wt. % 0.005 |
| Fe |  | max wt. % 0.015 |
| $H_2$ |  | loss than 0.46 wt. % |
| $O_2$ |  | less than 0.23 wt. % |

C. Cleaning of Electrodes Prior To Coating

When cleaning the working electrode, the first step was to remove any previous films from the Pt electrode surface. The nickel hydroxide film can be removed by washing the electrode in water and then wiping the Pt electrode surface with a Kimwipe, taking care not to scratch the electrode surface.

The Pt electrode was then polished with silica powder in a slurry with water. To polish the electrode, the largest grit of silica powder was used first and then progressively finer grits were employed. In this study, silica powder of 3.0, 1.0, 0.3 and 0.05 microns was used. After polishing in one silica powder, the electrode was rinsed thoroughly to prevent mixing the powders. To provide consistent polishing to the entire electrode, the electrode was moved in a figure eight pattern.

After polishing, the electrode was rinsed thoroughly with Milli-Q purified water, placed in a beaker of Milli-Q water, and sonicated for 5 minutes. After sonication, the electrode was rinsed with water and then dipped into a beaker of concentrated nitric acid for approximately 30 seconds. Again, the electrode was rinsed thoroughly with Milli-Q water to rinse off the acid. After the final rinse with water, the electrode was left to air dry. Once dry, if a mirror-like finish was not apparent, the entire polishing procedure was repeated to remove any residue or visible imperfections.

The counter nickel foam electrode was cleaned by soaking in a beaker of concentrated nitric acid for several minutes. Upon removal, it was rinsed with copious amounts of Milli-Q water, then air-dried.

In this experiment, the SCE reference electrode was removed from the testing system immediately each time after the test was finished and thoroughly rinsed with Milli-Q water. The KCl solution in the SCE electrode was replaced every week.

D. Preparation of Slurries

For slurries containing only nickel hydroxide, nickel hydroxide powder was weighed on a 1/10000 gram balance. The nickel hydroxide powder was not shaken before use in the slurry.

Mixtures containing nickel hydroxide particles and either glass beads, cobalt powder, $Sm_2Co_7$, silane coated $Fe_3O_4$ or silane coated NdFeB were prepared. In these mixtures, the glass beads, $Fe_3O_4$ particles, NdFeB particles and $Sm_2Co_7$ particles had diameters of about 2 micrometers, about 2 to 4 micrometers, about 5 to 7 micrometers and about 5 to 7 micrometers, respectively.

By way of example, for the nickel hydroxide and cobalt mixture, nickel hydroxide powder and cobalt powder were weighed on a 1/10000 gram balance. The powders were poured into a 10 mL glass bottle and sealed. The bottle was shaken at 1000 oscillations per minute for about 30 minutes using a shaker (Thermolyne Maxi-Mix III™ Type 65800). The mixed powder was then ready to use in the slurry. For $Ni(OH)_2$/glass beads, $Ni(OH)_2/Sm_2Co_7$, $Ni(OH)_2/Fe_3O_4$ and $Ni(OH)_2$/NdFeB mixtures, the same procedure as for the $Ni(OH)_2$/Co mixture was followed.

The slurry was prepared as follows:

1. Weighed 0.012 g hydroxypropyl methylcellulose (HPMC);
2. Weighed 1.50 g pure nickel hydroxide or mixture;
3. Weighed 5.0 g Milli-Q water;
4. Poured the water into a clean 10 ml beaker;
5. Heated the beaker until the water was boiling on a Corning Stirrer/Hotplate;
6. Put a clean stir bar in the beaker and turned the stir speed to position 3;
7. Poured the HPMC into the beaker and turned off the heater;
8. Stirred the HPMC and water for one hour until the HPMC was completely dissoluted;
9. Removed the stir bar;
10. Added the nickel hydroxide or mixture to the beaker;
11. Stirred the slurry for ten minutes with a clean glass stirring rod;
12. Allowed the slurry to rest for 16 hours;
13. Pipetted 3.7 gram water out of the slurry; and
14. Sealed the beaker for future use.

E. Preparation of Coated Electrodes

Figure 22:
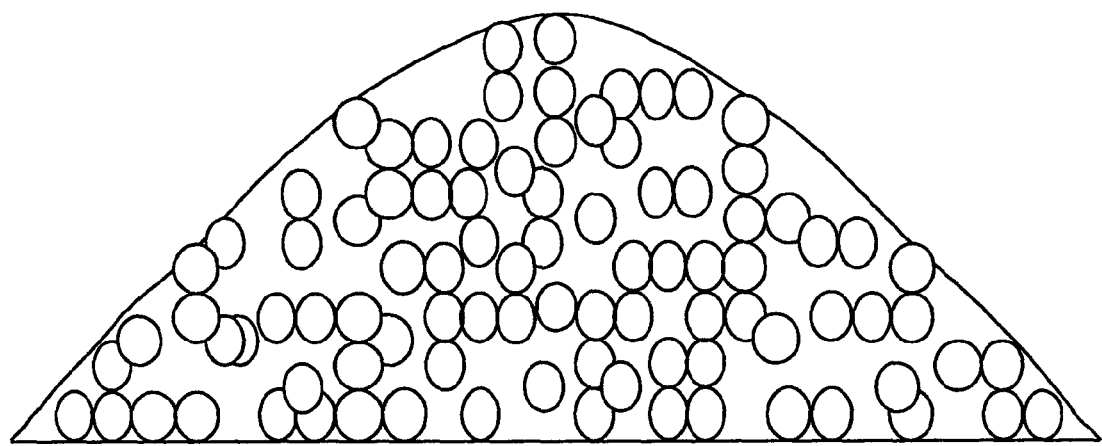
FIG. 22 shows a film configuration for non-magnetized electrodes.

For non-magnetized electrodes, the polished and dried Pt electrode was placed on the lab bench such that the electrode surface was pointed upwards and parallel to the ceiling. The slurry was stirred with a clean glass stirring rod for three minutes until the particles were distributed evenly. Then, 5 µl of the slurry was removed by pipette and placed onto the center of the Pt electrode. The electrode was turned clockwise three times until the Pt surface was totally covered by the slurry, taking care not to scratch the Pt surface. All electrodes were coated with 5 µl of slurry unless otherwise noted. The electrode was left on the table at ambient temperature for one hour so that the water evaporated to form a film. FIG. 22 shows the schematic diagram of a typical non-magnetized electrode film.

Figure 23:
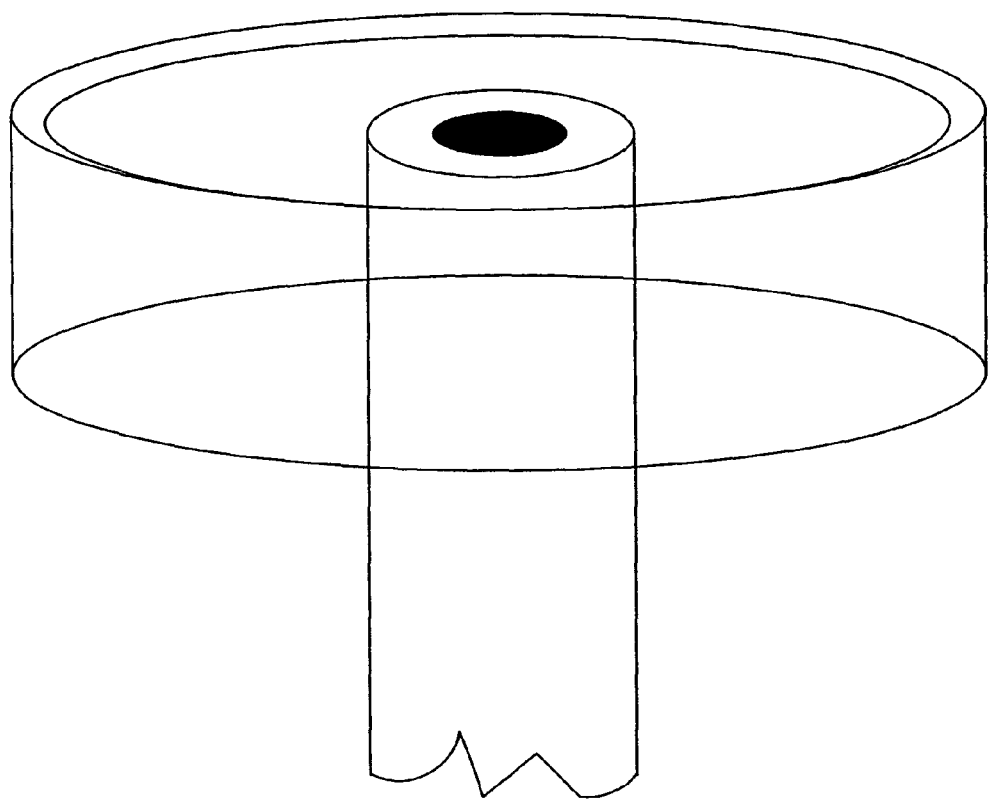
FIG. 23 shows an electrode configuration for drying a mixture according to the present invention.
Figure 24:
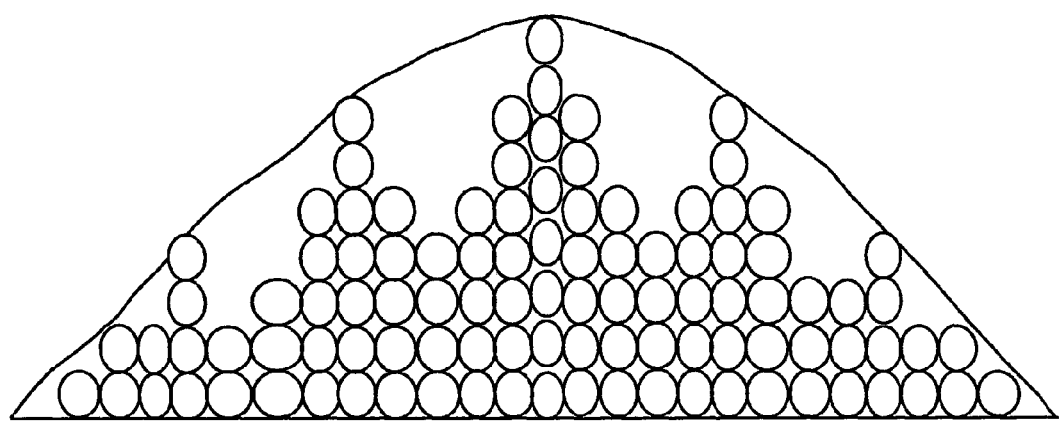
FIG. 24 shows a film configuration for magnetized electrodes.

For magnetized electrodes, the polished and dried Pt electrode was placed on the lab bench such that the electrode surface was pointed upwards and parallel to the surface of the lab bench. A magnet was placed around the Pt electrode as shown in FIG. 23. Then, 5 µl of the slurry was removed by pipette and placed onto the center of the Pt electrode and the electrode was turned following the same procedure as for the non-magnetized electrode. The electrode was left on the bench at ambient temperature for one hour to evaporate the water. The particle distribution of a magnetized film is shown in FIG. 24.

F. Activation of Electrodes

Before testing, the electrode was activated so that the optimized electrochemical properties were examined in the testing phase. The electrode was activated as follows:

1. The coated electrode was placed in a KOH solution for 10 minutes;
2. The three electrodes were connected to the BAS testing system; and
3. The electrode was charged and discharged following the procedure listed in Table 6. The electrode was scanned from the initial potential to the high potential and then to the low potential.

The electrode was then ready for testing. Cyclic voltammetric tests were run in the same solution.

TABLE 6

Electrode Activation Procedure (2 Cycles for Each Step)

| Step | Init(mV) | High E(mV) | Low E(mV) | InitP/N | V(mV/sec) |
|------|----------|------------|-----------|---------|-----------|
| 1 | 0 | 600 | 0 | P | 5 |
| 2 | 0 | 600 | 0 | P | 5 |
| 3 | 0 | 500 | 0 | P | 50 |
| 4 | 0 | 400 | 0 | P | 100 |
| 5 | 0 | 400 | 0 | P | 200 |
| 6 | 0 | 400 | 0 | P | 300 |
| 7 | 0 | 400 | 0 | P | 400 |

II. Electrodes Tested at Ambient Temperature

A. Background

The nickel hydroxide positive electrode was studied because this electrode is thought to limit nickel metal hydride batteries performance. Pt electrodes were coated with a slurry, as set forth above. Pt electrodes coated with a slurry containing only nickel hydroxide particles and not magnetized mimic the electrode structure used in conventional batteries containing a nickel hydroxide electrode. Electrode structures incorporating different types of particles were also examined. Some electrode structures included nickel hydroxide and other magnetizable particles. A structure formed with glass beads served as a control. For $Fe_3O_4$, $Sm_2Co_7$ and NdFeB, the magnetic energy product increases in the order of $Fe_3O_4<Sm_2Co_7<NdFeB$. Results were compared for each class of electrodes. Studies included performance as a function of temperature. Finally, results as a function of magnetic energy products and temperature were examined.

Electrodes were coated according to the procedures described above. Two sets of data were considered. The first set of data examined the effect of different coating thicknesses and allowed a scan rate study to investigate mass transport effects in the films. The second set of data are based on optimally formed films.

B. Films of Different Thicknesses

Different amounts of nickel hydroxide slurry were cast onto the Pt electrode. The electrodes were either not magnetized during casting or magnetized. Films were formed with 2.5, 5.0, or 10.0 μl of slurry. Cyclic voltammograms were recorded for magnetized and non-magnetized films.

Figure 25:
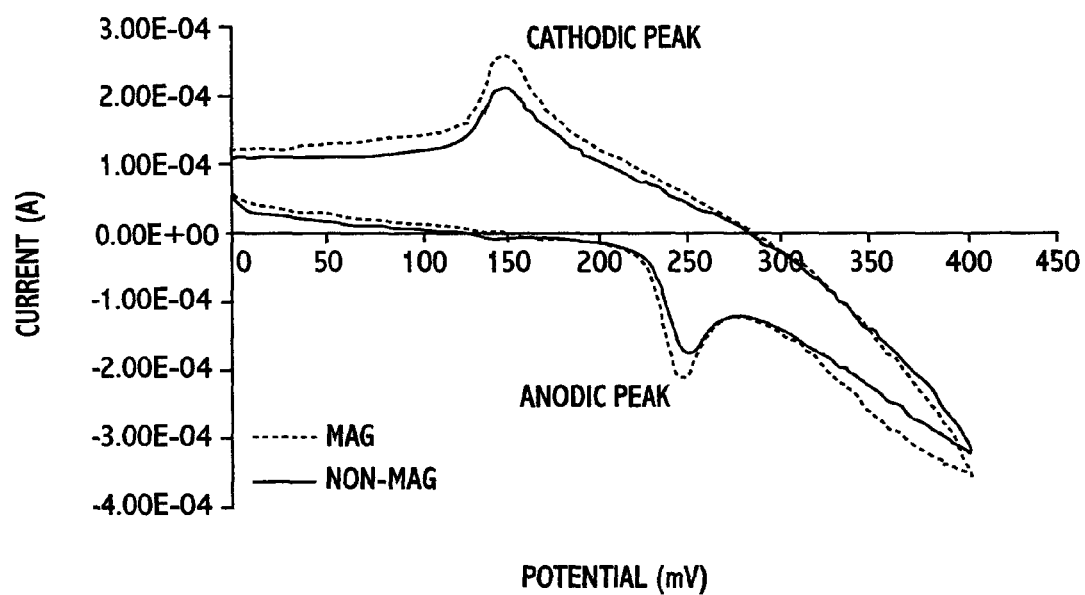
FIG. 25 shows cyclic voltammograms of magnetized and non-magnetized electrodes containing nickel hydroxide.
Figure 26:
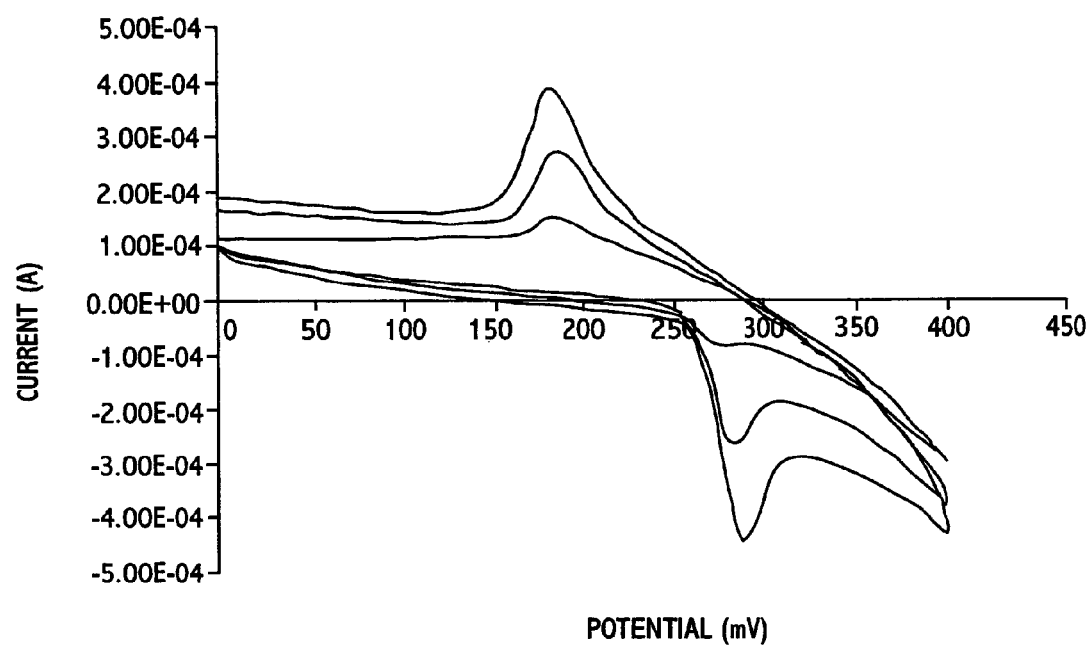
FIG. 26 shows cyclic voltammograms of magnetized and non-magnetized electrodes containing nickel hydroxide at different scan rates.

FIG. 25 illustrates the cyclic voltammograms for both types of electrodes with 5.0 □1 slurry at a scan rate of 200 mV/sec. The cathodic peak is due to the reduction of NiOOH to $NI(OH)_2$ and anodic peak is for the reverse process. As shown in FIG. 26, the peaks for magnetized electrodes were slightly sharper and bigger than those for non-magnetized electrodes. In the cyclic votammograms, the cathodic peak was sharper than the anodic peak for both types of electrodes. While not wishing to be bound by theory, it is thought that this is because the reduction of $O_2$ occurs in the same potential range as the oxidation of $Ni(OH)_2$.

The cathodic peak currents for non-magnetized and magnetized electrodes coated with slurries containing only nickel hydroxide are shown in Table 7. These results indicate that for both non-magnetized and magnetized electrodes, the peak current ($i_p$) increases with the volume of $Ni(OH)_2$ slurry pipetted onto the electrode. For the electrodes with 2.5 μl and 5.0 μl of $Ni(OH)_2$ slurry, magnetized electrodes showed better performance than non-magnetized electrodes. Magnetized electrodes showed peak currents that were 20% to 200% bigger than non-magnetized electrodes. For electrodes coated with 10.0 μl of slurry, the peak currents were similar for both types of electrodes. While not wishing to be bound by theory, it is thought that this could be because the film structure for the magnetized electrodes formed with 10.0 μl slurry is different from the magnetized electrodes formed with either 2.5 or 5.0 μl of slurry.

TABLE 7

Cathodic Currents for Non-magnetized and Magnetized $Ni(OH)_2$ at Different Scan Rates for 3 Slurry Volumes.

| Scan Rate (mV/sec) | $i_p$(μA) | | | | | | | | |
|---|---|---|---|---|---|---|---|---|---|
| | non-mag | | | meg | | | Ratio | | |
| | 2.5 μL | 5.0 μL | 10.0 μL | 2.5 μL | 5.0 μL | 10.0 μL | 2.5 μL | 5.0 μL | 10.0 μL |
| 50 | 4.39 | 6.64 | 124 | 5.27 | 19.4 | 141 | 1.20 | 2.92 | 1.14 |
| 100 | 10.3 | 14.9 | 229 | 16.2 | 36.7 | 220 | 1.57 | 2.46 | 0.96 |
| 200 | 18.8 | 34.6 | 384 | 37.5 | 82.7 | 359 | 1.99 | 2.39 | 0.93 |
| 300 | 27.3 | 52.2 | 504 | 57.0 | 123 | 474 | 2.09 | 2.36 | 0.94 |
| 400 | 31.4 | 68.4 | 522 | 71.4 | 152 | 555 | 2.27 | 2.22 | 1.06 |

In Table 7, the peak currents for both magnetized and non-magnetized electrodes with 5 μl slurry at different scan rates are listed for representative data. At different scan rates, the peak currents of magnetized electrodes are about one to two times greater than those of non-magnetized electrodes. For both non-magnetized and magnetized electrodes, the peak currents get larger as the scan rates increase.

While not wishing to be bound by theory, it is thought that the electrode response can be controlled by either the diffusion of the reactive species to the active electrode interface or the limited amount of material on the electrode surface. The first yields the diffusion controlled response which, for cyclic voltammetry under reversible conditions at a planar electrode, the peak current may be represented as follows:

$$i_p = 0.4463\left(\frac{F^3}{RT}\right)^{1/2} n^{3/2} A D_0^{1/2} C_0^* v^{1/2}$$

where $i_p$(A) is the peak current at a given cyclic voltammetric scan rate (v, V/s). The diffusion coefficient (cm$^2$/s), concentration (moles/cm$^3$), electrode area (cm$^2$), and number of electrons transferred are $D_0$, $C_0^*$, A, and n, respectively. F, R, and T are Faradays constant, the universal gas constant, and temperature (K), respectively.

When the response is determined by the amount of material on the electrode, the response is referred to as thin layer and the voltammograms have the shape of a Gaussian curve. The peak current for reversible conditions is defined as follows, where l is the thickness of the electroactive layer.

$$i_p = \frac{n^2 F^2 v A l C_0^*}{4RT}$$

Figure 27:
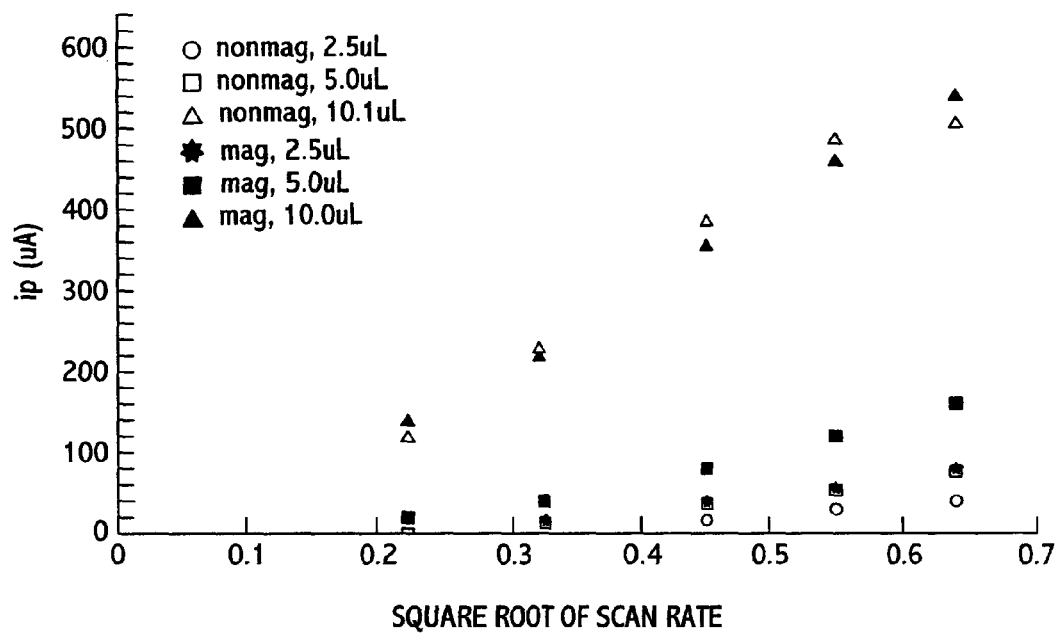
FIG. 27 shows the relationship between cathodic peak current and the square root of the scan rate for magnetized and non-magnetized electrodes containing nickel hydroxide.
Figure 28:
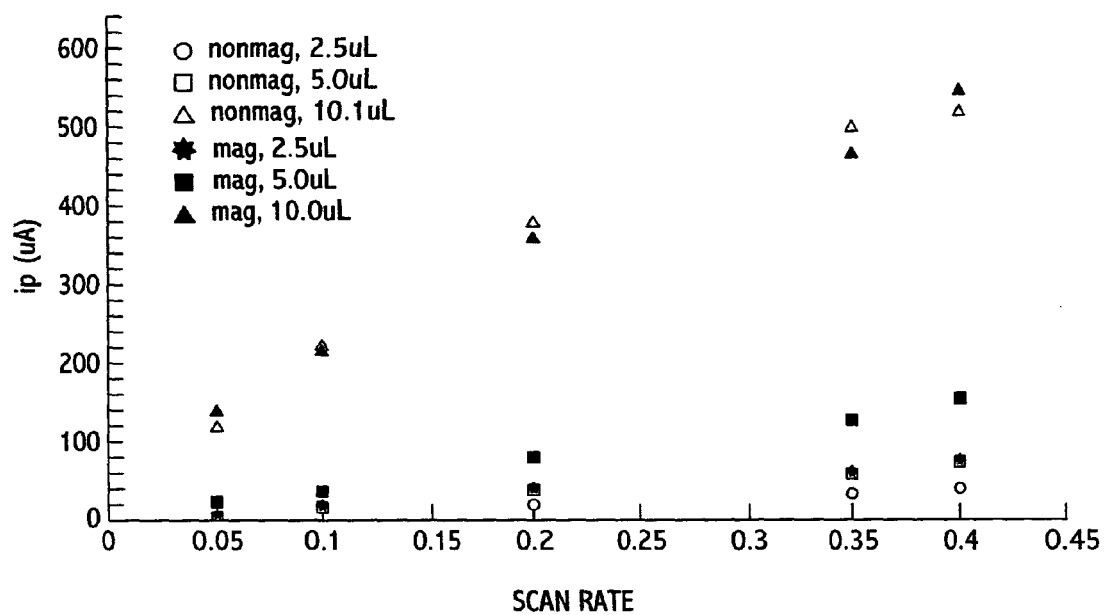
FIG. 28 shows the relationship between cathodic peak current and scan rate for magnetized and non-magnetized electrodes containing nickel hydroxide.

The cyclic voltarnmograms for magnetized electrode at different scan rates are shown at FIG. 26. In FIG. 27, the cathodic peak currents are shown as a function of $v^{1/2}$ (where v is scan rate) for both types of electrodes. Table 8 gives the analysis data for cathodic peak currents as a function of the square root of scan rates. The relation between cathodic peak current and scan rate is shown in FIG. 28 and the analysis data is listed in Table 9. Based on the correlation coefficients and near zero intercepts, we can tell that the electrodes with 2.5 μl and 5.0 μl slurry exhibit thin film characteristics. For the electrodes with 10.0 μl slurry, the response is diffusion controlled. Thus, for the thin films, all the material in the films is reduced during the scan for scan rates as high as 400 mV/s.

TABLE 8

The Analysis Data for Cathodic Peak Currents as a Function of the Square Root of Scan Rate.

|  | non-mag | | | mag | | |
| --- | --- | --- | --- | --- | --- | --- |
|  | 2.5 μL | 50. μL | 10.0 μL | 2.5 μL | 5.0 μL | 10.0 μL |
| slope | 67.787 | 152.89 | 1015.8 | 164.83 | 335.11 | 1032.2 |
| intercept | −10.944 | −30.923 | −87.71 | −33.972 | 62.491 | −97.593 |
| $r^2$ | 0.9962 | 0.9873 | 0.9502 | 0.9946 | 0.9899 | 0.9983 |

TABLE 9

The Analysis Data for Cathodic Peak Currents as a Function of Scan Rate.

|  | non-mag | | | mag | | |
| --- | --- | --- | --- | --- | --- | --- |
|  | 2.5 μL | 50. μL | 10.0 μL | 2.5 μL | 5.0 μL | 10.0 μL |
| slope | 78.044 | 178.62 | 1144.8 | 191.41 | 390.02 | 1192.2 |
| intercept | 2.0488 | −2.1616 | 112.2 | −2.7226 | 0.8549 | 99.439 |
| $r^2$ | 0.9788 | 0.9988 | 0.8944 | 0.9942 | 0.994 | 0.9872 |

The potential difference (Delta E) for non-magnetized and magnetized electrodes at different scan rates are listed in Table 10. It increases with scan rate between 86 mV and 114 mV. For magnetized electrodes, the potential difference is slightly smaller than that of non-magnetized electrodes at the same scan rate.

TABLE 10

Delta E for Non-magnetized and Magnetized $Ni(OH)_2$ at Different Scan Rates.

|  | Delta E (mV) | | | | | |
| --- | --- | --- | --- | --- | --- | --- |
|  | non-mag | | | mag | | |
| Scan Rate (m/V/sec) | 2.5 μL | 50. μL | 10.0 μL | 2.5 μL | 5.0 μL | 10.0 μL |
| 50 | 87 | 85 | 88 | 88 | 85 | 87 |
| 100 | 91 | 86 | 90 | 94 | 87 | 90 |
| 200 | 103 | 94 | 96 | 103 | 91 | 97 |
| 300 | 105 | 97 | 101 | 107 | 95 | 102 |
| 400 | 114 | 103 | 108 | 114 | 102 | 108 |

That there is a magnetic effect can be demonstrated by considering the peak currents found for magnetized and non-magnetized electrodes. It was noted that electrodes formed on the same day exhibited more similar characteristics. This may arise from settling and aging of the inks. The data shown in Table 11 were collected for nonmagnetized and magnetized electrodes and are paired electrodes formed on the same day. The currents were collected for 5.0 μl films at 200 mV/s. The average and standard deviation for 6 samples of pairwise ration is $\bar{\chi}$=2.69 and s=1.16. That this average is above 1.00 and there is a magnetic effect is determined from a one sided students t-test. For n samples and n−1 degrees of freedom, $\sqrt{n}t_{calc}=(\bar{\chi}-1.00)/s$. The hypothesis that the system mean, μ<1.00, is rejected at a given confidence level provided that the t-value from a one sided t-table, $t_{table}$, is greater that $t_{calc}$. From the data in Table 8, $t_{calc} < t_{table}$ for confidence levels as high as 99.5%.

TABLE 11

Pairwise Ratio of Magnetic to Nonmagnetic Peak Currents for 5.0 μl Slurry at 200 mV/s.

| $i_p$ (non-mag) (μA) | $i_p$ (mag) (μA) | $i_p$ (non-mag)/$i_p$ (mag) |
| --- | --- | --- |
| 18.8 | 82.7 | 4.40 |
| 19.9 | 71.6 | 3.60 |
| 54.6 | 79.6 | 1.46 |
| 49.5 | 74.2 | 1.50 |
| 36.4 | 92.8 | 2.55 |
| 46.3 | 121.1 | 2.62 |
|  | Average | 2.69 |
|  | St. Dev. | 1.16 |

The activation process was also tested for both magnetized and non-magnetized electrodes. The results are listed in Table 12. At the first cycle (segment 1 and segment 2), both electrodes have no peaks corresponding to the interchange of $Ni(OH)_2$ and NiOOH. Starting from cycle two (segment 3 and segment 4), both electrodes show the oxidation and reduction reactions for nickel hydroxide and nickel oxyhydroxide. The peak currents for the magnetized electrode are consistently bigger than those of the non-magnetized electrode at the same segment; this shows that the magnetized electrode was easier to activate than the non-magnetized electrode.

TABLE 12

Activation Performance for Magnetized and Non-magnetized Electrodes Coated Only With Nickel Hydroxide(v = 5 mV/sec).

|  | $E_p$ (mV) | | $i_p$ (μA) | |
| --- | --- | --- | --- | --- |
|  | mag | non-nag | mag | non-nag |
| Segment 1 | — | 517 | — | 445 |
| Segment 2 | 148 | — | 7.25 | — |
| Segment 3 | 224 | 220 | −35.5 | −28.8 |
| Segment 4 | 144 | 143 | 16.8 | 7.10 |
| Segment 5 | 222 | 219 | −43.6 | −29.6 |
| Segment 6 | 144 | 142 | 23.7 | 14.7 |

C. Optimally Formed Films

1. Nickel Hydroxide

The following data were collected using the best established protocol for coating $Ni(OH)_2$ films. The data shown in Table 13 were collected for non-magnetized and magnetized electrodes and are paired for electrodes formed on the same day. The currents were collected at a scan rate of 200 mV/s. Unless otherwise stated, the films were formed with 5 μl of slurry.

TABLE 13

Pairwise Ratio of Magnetic to Nonmagnetic Peak Currents for 5.0 μl Slurry at 200 mV/s for Benchmark Nickel Hydroxide Electrodes.

| $i_p$ (non-mag) (μA) | $i_p$ (mag) (μA) | $i_p$ (non-mag)/ $i_p$ (mag) |
|---|---|---|
| 118.7 | 162 | 1.36 |
| 169.3 | 192 | 1.13 |
|  | Average | 1.25 |
|  | St. Dev. | 0.16 |

That there is a magnetic effect is determined for a pairwise examination of the ratio of the peak currents for the magnetic and non-magnetic samples. The samples were formed from 5.0 μl and peak currents recorded at 200 mV/s. For $\bar{\chi} \pm s = 1.25 \pm 0.16$ and one degree of freedom, the hypothesis that there is no magnetic effect is rejected at the 87% level.

2. Nickel Hydroxide with 5 Wt. % Glass Beads

Figure 29:
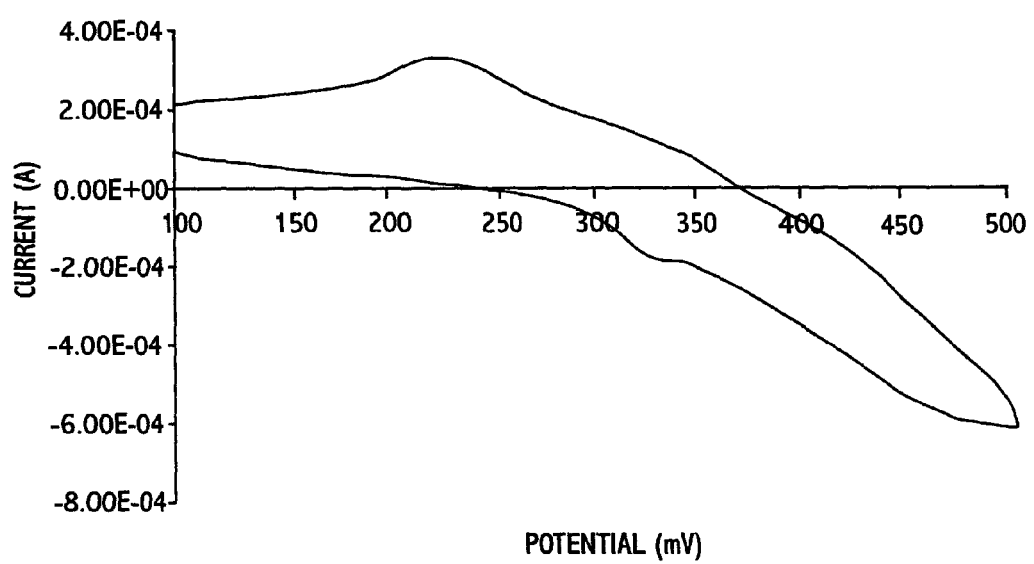
FIG. 29 shows a cyclic voltammogram for a non-magnetized electrode containing nickel hydroxide and 5 wt. % glass beads.

In order to compare the results of electrodes with silane coated $Fe_3O_4$ and silane coated NdFeB, 5 wt. % uncoated glass beads added to nickel hydroxide powder served as the control. FIG. 29 is the cyclic voltammogram for the electrode formed with 5 μl of slurry. The peak currents are listed in Table 14. In Table 14, "forward" means the electrodes were tested at 25° C. in the beginning of testing process and "reverse" means that the temperature was cooled to −15° C., then warmed back up to 25° C. and the electrodes were tested at 25° C. again. Compared to the results of electrodes formed from slurries containing only nickel hydroxide, the peak currents of electrode with 5 wt. % glass beads are 7% smaller.

TABLE 14

Peak Currents for $Ni(OH)_2$ + Glass Bead (5%) Mixture Electrode (V = 200 mV/ sec)

| cathodic peak $i_p$ (μA) | | anodic peak $i_p$ (μA) | |
|---|---|---|---|
| forward | reverse | forward | reverse |
| 9.90 | 20.5 | −131 | −78.3 |

3. Nickel Hydroxide with 15 wt. % Cobalt

Figure 30:
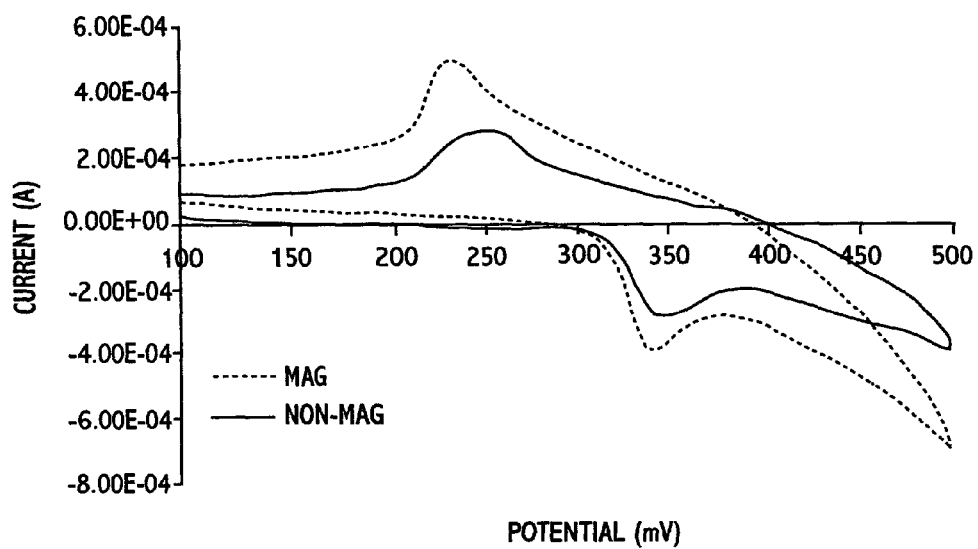
FIG. 30 shows cyclic voltammograms for magnetized and non-magnetized electrodes containing nickel hydroxide and 15 wt. % Co.

Cobalt has been found to be an advantageous additive in nickel metal hydride batteries because it can enhance battery utilization and reduce battery deterioration. Because cobalt is also magnetizable, the non-magnetized and magnetized nickel hydroxide with cobalt powder electrodes were examined. The cyclic voltammograms for the magnetized and non-magnetized electrodes made from slurries containing nickel hydroxide and 15 wt. % cobalt are shown in FIG. 30. Tables 15 and 16 give the cathodic peak and anodic peak currents, respectively, for both the non-magnetized and magnetized electrodes.

Two samples were tested for both magnetized and non-magnetized electrodes. Compared to the electrode not containing cobalt, the peak currents are lower as shown by the ratio of mag/nonmag $Ni(OH)_2$ in Table 15. For the electrode with 15% cobalt, the average cathodic peak current values show that magnetized electrodes performed better than non-magnetized electrodes. For the anodic peak, the non-magnetized electrodes had higher currents than magnetized electrodes, but oxygen evolution reaction was included in this peak.

TABLE 15

Cathodic Currents for Non-magnetized and Magnetized $Ni(OH)_2$ + Co(15%) (v = 200 mV/§).

| $i_p$ (μA) | | ratio | |
|---|---|---|---|
| non-mag | mag | mag/non-mag | mag/non-mag $N_i(OH)_2$ |
| 65.8 ± 23.6 | 83.6 ± 22.2 | 1.27 ± 0.45 | 0.58 ± 0.36 |

TABLE 16

Anodic Currents for Non-magnetized and Magnetized $Ni(OH)_2$ + Co(15%) (v = 200 mV/sec).

| non-mag | | mag | | ratio | |
|---|---|---|---|---|---|
| forward | reverse | forward | reverse | forward | reverse |
| −277 | −161 | −224 | −146 | 0.81 | 0.90 |

The potential difference (Delta E) for electrodes with 15% cobalt (Table 17) was slightly larger than that of pure nickel hydroxide electrodes. For magnetized electrodes, the potential difference was 10 mV to 30 mV larger than non-magnetized electrodes.

TABLE 17

Delta E for Magnetized and Non-magnetized $Ni(OH)_2$ + Co(15%) Mixture Electrodes (v-9QQ mV/sec).

| non-mag | | mag | |
|---|---|---|---|
| forward | reverse | forward | reverse |
| 88 | 126 | 110 | 135 |

4. Nickel Hydroxide with Iron Oxide

Figure 31:
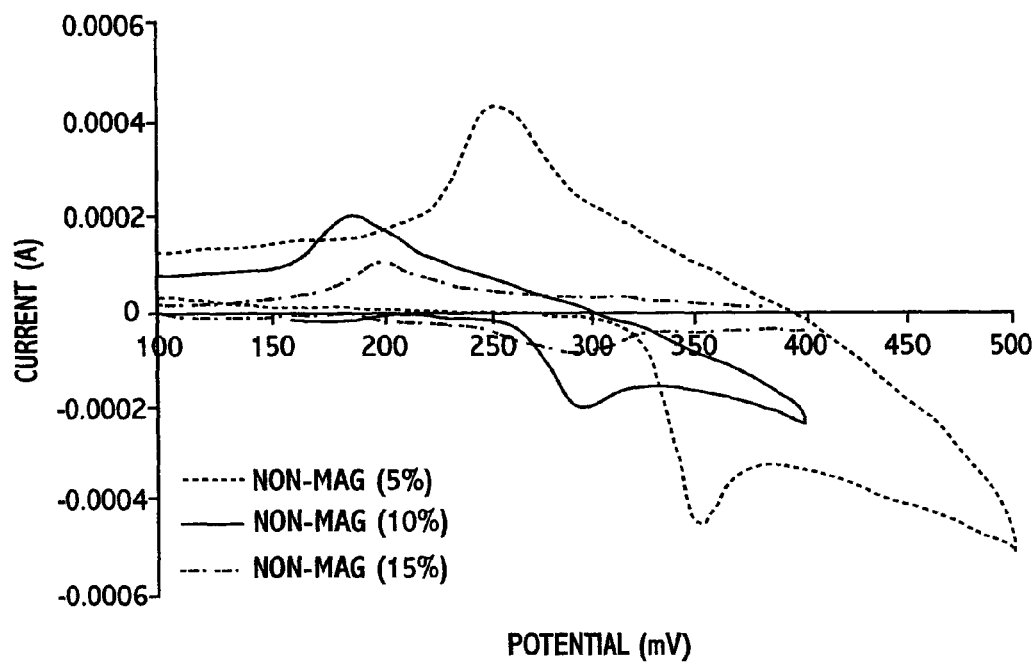
FIG. 31 shows cyclic voltammograms for non-magnetized electrodes containing nickel hydroxide and 5, 10 or 15 wt. % $Fe_3O_4$.
Figure 32:
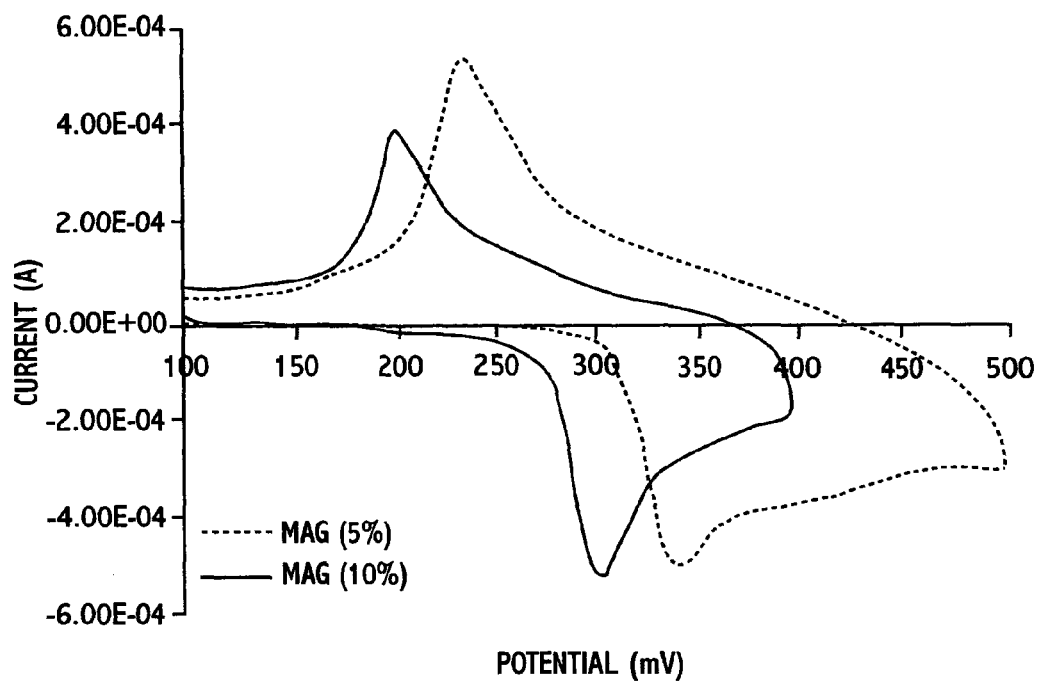
FIG. 32 shows cyclic voltammograms for magnetized electrodes containing nickel hydroxide and 5 or 10 wt. % $Fe_3O_4$.

The slurries used to prepare these electrodes contained nickel hydroxide powder and differing amounts of iron oxide ($Fe_3O_4$) particles. FIG. 31 shows the cyclic voltammograms for non-magnetized electrodes coated with films containing nickel hydroxide and 5, 10 or 15 wt. % iron oxide particles. The voltammagrams were carried out at room temperature. FIG. 32 shows the cyclic voltammograms for magnetized electrodes coated with films containing nickel hydroxide and 5 or 10 wt. % iron oxide.

The cathodic peak currents for non-magnetized nickel hydroxide with 5, 10 and 15 wt. % iron oxide and magnetized nickel hydroxide with 5 and 10 wt. % iron oxide are listed in Table 18. For each type of electrode, 2 to 4 samples were tested. For the non-magnetized and magnetized electrodes containing 5 wt. % iron oxide, the peak currents were larger than the non-magnetized electrodes coated with only nickel hydroxide or the electrodes containing 5 wt. % glass beads. The cathodic peak currents for magnetized electrodes containing 10 wt. % iron oxide were larger than those for non-magnetized electrodes. For electrodes containing 5 wt. % iron oxide, magnetized electrodes had larger peak currents than non-magnetized electrodes, compared to electrodes coated with only nickel hydroxide.

With increasing iron oxide content, performance of the non-magnetized electrodes dropped. Magnetized electrodes had the same trend with respect to iron oxide content, but for magnetized electrodes containing 10 wt. % iron oxide, the decrease of the peak current was smaller than for non-magnetized electrodes.

Magnetized electrodes containing 15 wt. % iron oxide were also tested, but at high iron oxide content, in the presence of a magnet, the iron oxide particles clustered in the center of the electrode. The peak currents were too small to be recorded. Table 19 gives the anodic peak currents for both non-magnetized and magnetized electrodes. Potential differences for both types of electrodes are listed at Table 20, where they are 10 mV to 20 mV larger than the potential difference for the electrodes with pure nickel hydroxide. For the anodic currents and potential difference, only average data are listed.

TABLE 18

Cathodic Currents for Non-magnetized
and Magnetized $Ni(OH)_2$ containing Varying Amounts
of $Fe_3O_4$ (v = 200 mV/sec).

| | $i_p$ (μA) | | ratio | |
| --- | --- | --- | --- | --- |
| Amount | non-mag | mag | mag/non-mag | mag/non-mag $Ni(OH)_2$ |
| 5% | 211 ± 140 | 267 ± 43.8 | 1.27 ± 0.86 | 1.85 ± 0.55 |
| 10% | 64.9 ± 14.1 | 215 ± 6.43 | 3.31 ± 0.73 | 1.49 ± 0.37 |
| 15% | 41.1 ± 13.5 | — | — | — |

TABLE 19

Anodic Currents for Non-magnetized and Magnetized $Ni(OH)_2$
Containing Varying Amounts of $Fe_3O_4$ Electrodes (v = 200 mV/sec).

| | $i_p$ (μA) | | | | ratio | |
| --- | --- | --- | --- | --- | --- | --- |
| | non-mag | | mag | | mag/non-mag | |
| Amount | forward | reverse | forward | reverse | forward | reverse |
| 5% | −560 | −397 | −543 | −335 | 0.97 | 0.84 |
| 10% | −70.6 | −51.2 | −412 | −246 | 5.83 | 4.80 |
| 15% | −145 | −85.9 | ~0 | ~0 | NA | NA |

TABLE 20

Average Delta E for Non-magnetized and Magnetized $Ni(OH)_2$
Containing Varying Amounts of $Fe_3O_4$ (v = 200 mV/s).

| | Delta E (mV) | | | |
| --- | --- | --- | --- | --- |
| | non-mag | | mag | |
| Amount | forward | reverse | forward | reverse |
| 5% | 112 | NA | 103 | 128 |
| 10% | 90 | 74 | 97 | 100 |
| 15% | 105 | 128 | NA | NA |

The pairwise ratio of magnetic to nonmagnetic peak currents recorded for 5.0 μl slurries at 200 mV/s are shown in Table 21. For 2 degrees of freedom, the hypothesis that μ<1.00 is rejected at the 87% confidence level.

TABLE 21

Pairwise Ratio of Magnetic to Nonmagnetic
Peak Currents for 5.0 μl Slurry at 200 mV/s.

| $i_p$ (non-mag) (μA) | $i_p$ (mag) (μA) | $i_p$ (non-mag)/$i_p$ (mag) |
| --- | --- | --- |
| 91.4 | 119.0 | 1.30 |
| 111.9 | 298.4 | 2.67 |
| 237.9 | 276.7 | 1.16 |
| | Average | 1.17 |
| | St. Dev. | 0.83 |

5. Nickel Hydroxide Containing NdFeB

Figure 33:
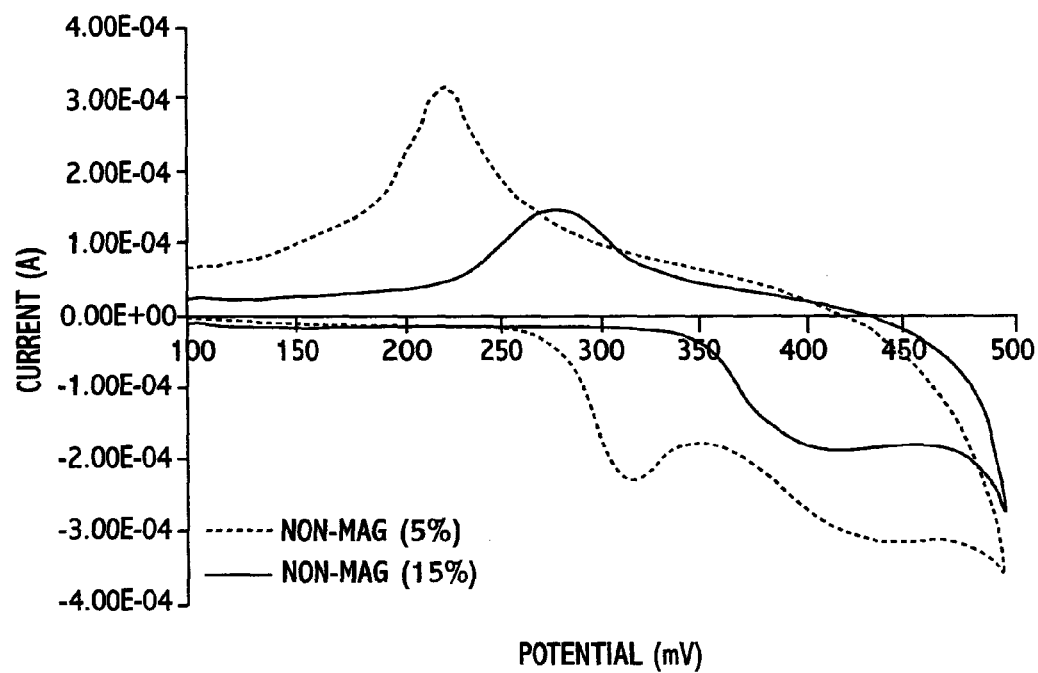
FIG. 33 shows cyclic voltammograms for non-magnetized electrodes containing 5 or 15 wt. % NdFeB.
Figure 34:
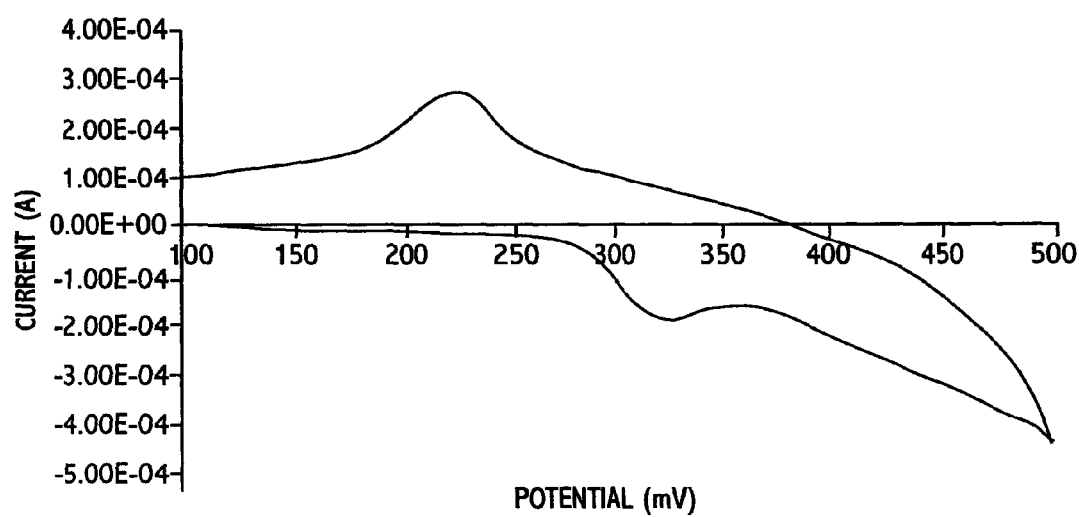
FIG. 34 shows cyclic voltammograms for magnetized electrodes containing nickel hydroxide and NdFeB.

The cyclic voltammograms for non-magnetized electrodes coated with nickel hydroxide containing 5 or 15 wt. % NdFeB tested at 25° C. are shown at FIG. 33. FIG. 34 shows the cyclic voltammograms for magnetized electrodes coated with nickel hydroxide containing 5 wt. % NdFeB.

Table 22 gives the cathodic peak currents for non-magnetized and magnetized electrodes coated with nickel hydroxide containing 5 or 15 wt. % NdFeB. The average anodic peak currents are listed in Table 23. Two to three samples were tested for each loading. For magnetized electrodes containing 15 wt. % NdFeB, results are not recorded because the particles clustered in the center.

For non-magnetized electrodes, electrodes containing 5 wt. % NdFeB had larger cathodic peak currents than electrodes containing 15 wt. % NdFeB. Compared to the non-magnetized electrodes containing 5 wt. % NdFeB, the average cathodic peak current value for magnetized electrodes was smaller. Because only one set of magnetized and non-magnetized electrodes was tested on the same date, the pairwise analysis is not included here.

The average cathodic peak current for magnetized electrodes containing 5 wt. % NdFeB was slightly smaller than non-magnetized electrodes coated only with nickel hydroxide. Table 24 lists the average Delta E for non-magnetized and magnetized electrodes tested at ambient temperature. Delta E values are 10 mV larger than the electrodes coated only with nickel hydroxide.

TABLE 22

Cathodic Currents for Non-magnetized and Magnetized $Ni(OH)_2$
Containing Varying Amounts of NdFeB (v = 200 mV/sec).

| | $i_p$ (μA) | | ratio | |
| --- | --- | --- | --- | --- |
| Amount | non-mag | mag | mag/non-mag | mag/non-mag $Ni(OH)_2$ |
| 5% | 169 ± 44.6 | 138 ± 30.8 | 0.82 ± 0.28 | 0.95 ± 0.31 |
| 15% | 62.0 ± 9.9 | 0 | NA | NA |

TABLE 23

Anodic Currents for Non-magnetized and Magnetized Ni(OH)$_2$
Containing Varying Amounts of NdFeB (v = 200 mV/sec).

| | $i_p$(μA) | | | | ratio | |
| --- | --- | --- | --- | --- | --- | --- |
| | non-mag | | mag | | mag/non-mag | |
| Amount | forward | reverse | forward | reverse | forward | reverse |
| 5% | −252 | −200 | −191 | −171 | 760.84 | 0.86 |
| 15% | −171 | −145 | — | — | — | — |

TABLE 24

Average Delta E for Ni(OH)$_2$ with 2 Amounts
of NdFeB Mixture Electrodes (v = 200 mV/see).

| | Delta E(mV) | | | |
| --- | --- | --- | --- | --- |
| | non-mag | | mag | |
| Amount | forward | reverse | forward | reverse |
| 5% | 98 | 114 | 99 | 104 |
| 15% | 123 | 156 | NA | NA |

6. Nickel Hydroxide Containing Sm$_2$Co$_7$

Figure 35:
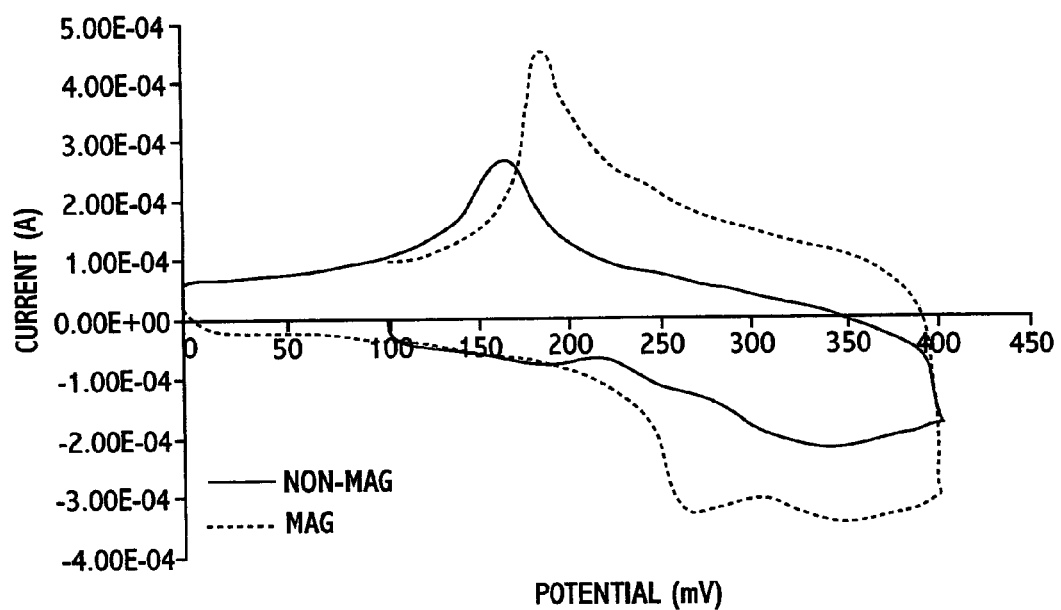
FIG. 35 shows cyclic voltammograms for non-magnetized electrodes containing nickel hydroxide and 5 wt. % samarium cobalt.

FIG. 35 shows the cyclic voltammograms for non-magnetized and magnetized electrodes coated with nickel hydroxide containing 5 wt. % uncoated Sm$_2$Co$_7$. Magnetized electrodes had sharper and bigger peaks than non-magnetized electrodes. The cathodic peak and anodic peak currents for non-magnetized electrodes containing 5 and 10 wt % Sm$_2$Co$_7$ and magnetized electrodes containing 5 wt. % Sm$_2$Co$_7$ are listed in Tables 25 and Table 26, respectively. Two samples were tested for each case. For electrodes containing 5 wt. % Sm$_2$Co$_7$, the cathodic peak currents for magnetized electrodes were bigger than the currents for non-magnetized electrodes. Compared to non-magnetized electrodes coated only with nickel hydroxide, the magnetized electrodes containing 5 wt. % Sm$_2$CO$_7$ showed better performance. For non-magnetized electrodes, the electrodes containing 10 wt. % Sm$_2$Co$_7$ showed better performance than electrodes containing 5 wt. % Sm$_2$Co$_7$. For magnetized electrodes containing 10 wt. % Sm$_2$Co$_7$, the result was not recorded because the particles clustered in the electrode center. Table 27 shows the average Delta E values for the electrodes. Magnetized electrodes have slightly smaller Delta E values than non-magnetized electrodes.

TABLE 25

Cathodic Currents for Non-magnetized and Magnetized
Ni(OH)$_2$ Containing Varying Amounts of
Sm$_2$ Co$_7$ (v = 200 mV/sec).

| | $i_p$(μA) | | ratio | |
| --- | --- | --- | --- | --- |
| | | | mag/ | mag/ |
| Amount | non-mag | mag | non-mag | non-mag Ni(OH)$_2$ |
| 5% | 122 ± 32.3 | 334 ± 162 | 2.74 ± 1.51 | 2.32 ± 1.24 |
| 10% | 176 ± 48.7 | 0 | NA | NA |

TABLE 26

Anodic Currents for Non-magnetized and Magnetized Ni(OH)$_2$
Containing Varying Amounts of Sm$_2$Co$_7$ (v = 200 mV/sec).

| | $i_p$(μA) | | | | ratio | |
| --- | --- | --- | --- | --- | --- | --- |
| | non-mag | | mag | | mag/non-mag | |
| Amount | forward | reverse | forward | reverse | forward | reverse |
| 5% | −356 | −262 | −554 | −333 | 1.56 | 1.27 |
| 10% | −191 | −162 | — | — | — | — |

TABLE 27

Average Delta E for Non-magnetized and Magnetized Ni(OH)$_2$
Containing Varying Amounts of Sm$_2$Co$_7$ (v = 200 mV/§).

| | Delta E (mV) | | | |
| --- | --- | --- | --- | --- |
| | non-mag | | mag | |
| Amount | forward | reverse | forward | reverse |
| 5% | 95 | 126 | 87 | 89 |
| 10% | 81 | 78 | NA | NA |

A pairwise examination (Table 28) of the Sm$_2$Co$_7$ data indicates that there is a magnetic effect. For $\bar{\chi}\pm s=2.63\pm0.12$, the hypothesis that there is no magnetic effect is rejected at the 98.3% level.

TABLE 28

Pairwise Ratio of Magnetic to Nonmagnetic
Peak Currents for 5.0 μl Slurry at 200 mV/s
for Ni(OH)$_2$ Containing 50% Sm$_2$Co$_7$

| $i_p$ (non-mag) (μA) | $i_p$ (mag) (μA) | $i_p$ (non-mag)/$i_p$ (mag) |
| --- | --- | --- |
| 80.9 | 220 | 2.72 |
| 176 | 448 | 2.55 |
| | Average | 2.63 |
| | St. Dev. | 0.12 |

D. Results

Electrode performance at ambient temperature was tested for pure nickel hydroxide electrodes, electrodes with 5 wt. % glass beads, 15 wt. % Co, iron oxide, NdFeB and Sm$_2$Co$_7$. The electrode with 5 wt. % glass beads was used as a control. Among all types of electrodes, the electrodes with 5 wt. % glass beads showed the worst performance, the magnetized electrodes with 5 wt. % Sm$_2$CO$_7$, or Fe$_3$O$_4$ had the largest peak currents. For the electrodes with pure nickel hydroxide, 10 wt. % iron oxide, or 5 wt. % Sm$_2$CO$_7$, the magnetized electrodes showed better performance than the non-magnetized electrodes. At ambient temperature, the testing results showed that the magnetized electrodes with 5 wt. % iron oxide and 5 wt. % Sm$_2$Co$_7$, had 10 to 200% larger peak currents than non-magnetized electrodes with pure nickel hydroxide.

III. Electrodes Tested at Different Temperatures

A. Background

Non-magnetized and magnetized electrodes were evaluated over a range of temperatures from 25° C. to −15° C. The electrodes coated with the following: nickel hydroxide, nickel hydroxide plus 5 wt. % glass beads, nickel hydroxide plus 15 wt. % Co, nickel hydroxide plus 15 wt. % iron oxide, nickel hydroxide plus 15 wt. % NdFeB and nickel hydroxide plus 15 wt. % $Sm_2Co_7$. In general, magnetic effects increased with decreasing temperature.

In the forward process, the system was cooled from 25 to −15° C. at 5° C. intervals. In the reverse process, the system was warmed back up from −15° C. to 25° C.

1. Nickel Hydroxide

Figure 36:
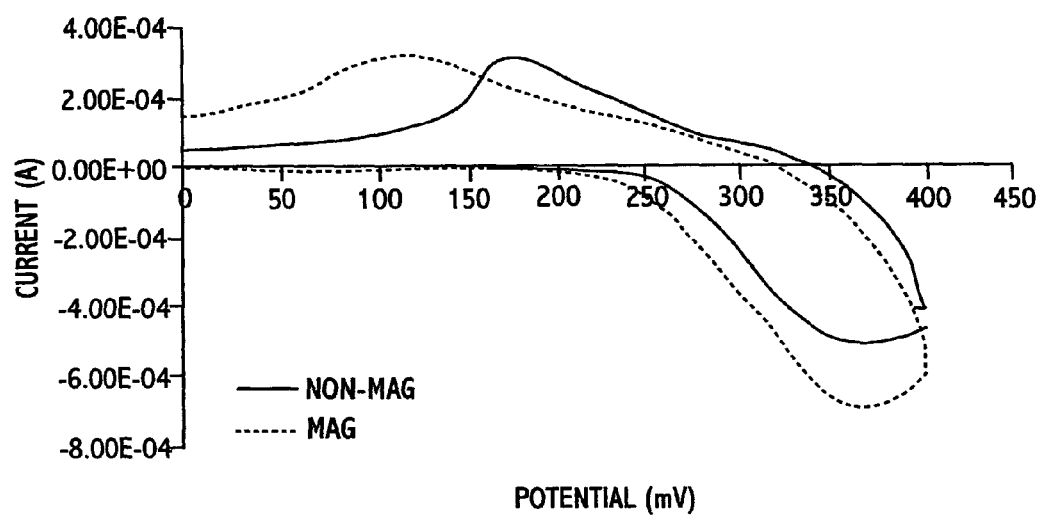
FIG. 36 shows cyclic voltammograms for magnetized and non-magnetized electrodes containing nickel hydroxide.
Figure 37:
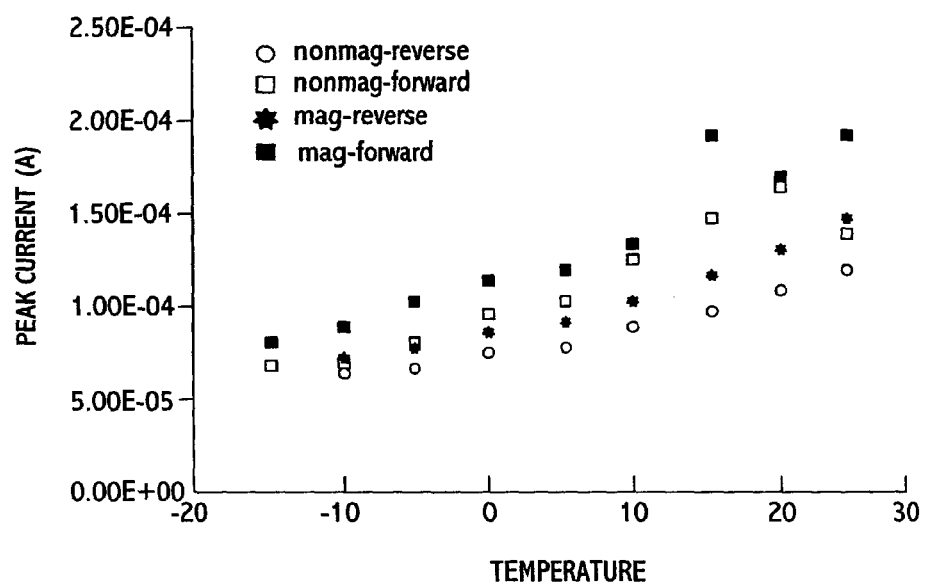
FIG. 37 shows cathodic currents for magnetized and non-magnetized electrodes containing nickel hydroxide at different testing temperatures.

The cyclic voltarnmograms for non-magnetized and magnetized electrodes tested at −15° C. are shown in FIG. 36. The curve shape changes at low temperature for both types of electrodes, especially for the anodic peak. The peak currents decreased when the temperature dropped (FIG. 37).

Table 29 shows the cathodic peak currents ($i_p$) at different temperatures for magnetized and non-magnetized electrodes formed with 5.0 μl of slurry. For non-magnetized and magnetized electrodes, two samples were tested. At −15° C., the cathodic peak currents were 60% of that at 25° C. At each specific temperature, the peak current for the magnetized electrodes were 10 to 40 percent larger than that of the non-magnetized electrodes. During the reverse process, the peak currents increased as temperature increased, but the peak currents were smaller than that of the forward process at the same testing temperature.

TABLE 29

Cathodic Current for Magnetized and Non-magnetized Nickel Hydroxide at Different Testing Temperatures (v = 200 mV/sec).

| Temperature | $i_p$ (μA) | | | |
|---|---|---|---|---|
| | non-mag | | mag | |
| ° C. | forward | revers | forward | reverse |
| 25 | 144 ± 35 | 128 ± 7.2 | 192 ± 29 | 152 |
| 20 | 168 + 32 | 115 ± 7.2 | 174 | 136 |
| 15 | 148 + 46 | 99.9 + 14 | 189 | 118 |
| 10 | 127 + 33 | 87.9 + 15 | 136 | 106 |
| 5 | 111 ± 14 | 78.7 ± 21 | 122 | 95.6 |
| 0 | 97.9 ± 4.2 | 75.3 ± 21 | 119 | 88.2 |
| −5 | 83.4 ± 13 | 67.6 ± 31 | 102 | 81.2 |
| −10 | 74.9 + 18 | 63.9 ± 34 | 88.8 | 77.3 |
| −15 | 65.7 + 27 | 65.7 ± 27 | 80.9 ± 8.1 | 80.9 |

2. Nickel Hydroxide Containing 5 wt. % Glass Beads

Figure 38:
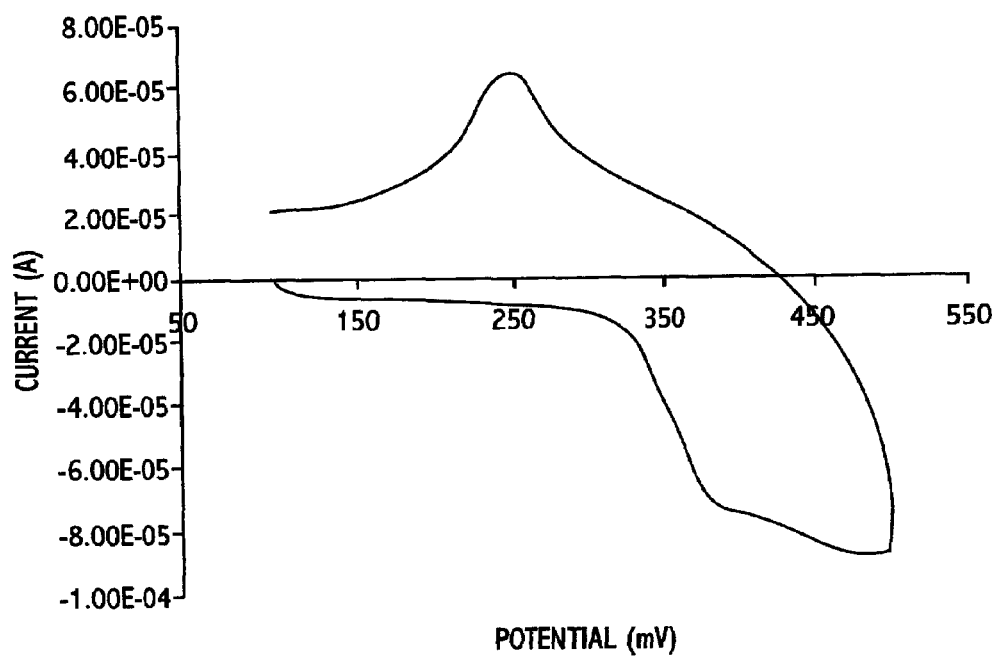
FIG. 38 shows cyclic voltammograms for non-magnetized electrodes containing nickel hydroxide and 5 wt. % glass beads at −15° C.

A cyclic voltammogram for a non-magnetized electrode containing 5 wt. % glass beads at −15° C. is shown in FIG. 38. The electrode performance with change of temperature is shown in Table 30. Only one sample was tested for the electrode with 5 wt. % glass beads. Compared to electrodes coated only with nickel hydroxide, the peak currents of an electrode containing 5 wt. % glass beads were smaller than both the non-magnetized and magnetized pure nickel hydroxide electrode at each temperature. While not wishing to be bound by theory, it is thought that the smaller currents result from the glass beads occupying volume in the film but not providing any current carrying material.

TABLE 30

Peak Currents for Non-magnetized $Ni(OH)_2$ + GlassBead(5%) at Different Testing Temperature (v 200 mV/sec).

| | $i_p$ (cathodic peak) (μA) | | $i_p$ (anodic peak) (μA) | |
|---|---|---|---|---|
| Temperature | forward | reverse | forward | reverse |
| 25 | 9.90 | 20.5 | −131 | −78.3 |
| 20 | 14.7 | 18.5 | −127 | −75.7 |
| 15 | 17.9 | 16.2 | −104 | −71.3 |
| 10 | 19.3 | 15.0 | −91.3 | −69.6 |
| 5 | 16.9 | 14.2 | −83.4 | −67.2 |
| 0 | 15.3 | 13.1 | −74.8 | −64.7 |
| −5 | 14.3 | 12.5 | −69.8 | −61.8 |
| −10 | 12.7 | 11.9 | −61.1 | −58.8 |
| −15 | 12.0 | 12.0 | −58.0 | −58.0 |

3. Nickel Containing 15 Wt. % Cobalt

Figure 39:
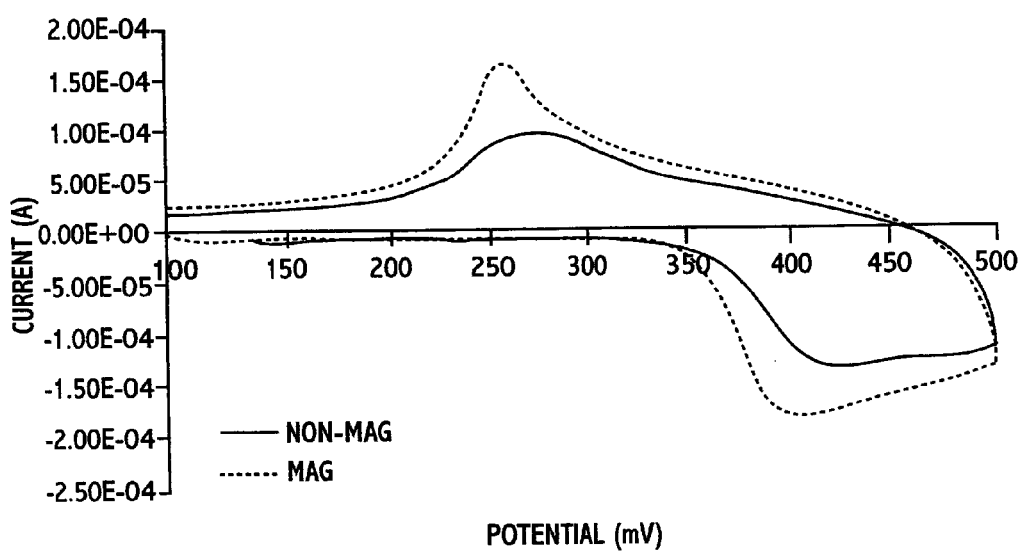
FIG. 39 shows cyclic voltammograms for magnetized and non-magnetized electrodes containing nickel hydroxide and 15 wt. % cobalt at −15° C.

The cyclic voltammograms for magnetized and non-magnetized electrodes coated with nickel hydroxide containing 15% cobalt tested at −15° C. are shown at FIG. 39. The electrodes tested at ambient temperature had larger and sharper peaks than electrodes tested at −15° C. At −15° C., the cyclic voltammograms for the electrode containing 15% cobalt had sharper peaks than those coated only with nickel hydroxide.

Table 31 gives the cathodic peak currents for non-magnetized and magnetized electrodes containing 15 wt. % cobalt. For non-magnetized electrodes, one sample was tested. For magnetized electrodes, three samples were tested.

Table 32 shows the anodic peak currents at different testing temperatures. Magnetized electrodes peak currents were 30 to 100% larger than non-magnetized electrode peak currents at different temperatures compared to the cathodic peak. Table 33 gives the potential difference for on sample.

TABLE 31

Cathodic Currents for Non-magnetized and Magnetized $Ni(OH)_2$ + Co(15%) at Different Testing Temperature (v = 200 mV/sec).

| | $i_p$ (μA) | | | |
|---|---|---|---|---|
| Temperature | non-mag | | mag | |
| ° C. | forward | reverse | forward | reverse |
| 25 | 65.8 ± 23.6 | 51.6 | 83.6 ± 22.2 | 75.4 ± 28 |
| 20 | 46.8 | 50.6 | 83.5 ± 22 | 71.6 ± 27 |
| 15 | 40.8 | 48.7 | 83.1 ± 30 | 67.1 ± 26 |
| 10 | 41.7 | 46.9 | 75.2 ± 30 | 63.5 ± 26 |
| 5 | 43.1 | 45.1 | 66.9 ± 26 | 60.5 ± 27 |
| 0 | 41.6 | 39.6 | 59.6 ± 24 | 56.5 ± 26 |
| −5 | 39.5 | 35.3 | 55.7 ± 24 | 51.3 ± 25 |
| −10 | 34.7 | 31.3 | 52.2 ± 23 | 46.6 ± 24 |
| −15 | 29.0 + 7.3 | 29.0 | 44.3 + 24.8 | 44.3 + 24 |

TABLE 32

Average Anodic Currents for Non-magnetized and Magnetized $Ni(OH)_2 + Co(15\%)$ at Different Testing Temperature (v = 200 mV/sec).

| Temperature | $i_p$ (μA) | | | |
|---|---|---|---|---|
| | non-mag | | mag | |
| °C. | forward | reverse | forward | reverse |
| 25 | −277 | −161 | −224 | −146 |
| 20 | −211 | −155 | −219 | −144 |
| 15 | −186 | −152 | −204 | −141 |
| 10 | −178 | −151 | −179 | −138 |
| 5 | −167 | −148 | −158 | −136 |
| 0 | −157 | −140 | −144 | −132 |
| −5 | −148 | −134 | −134 | −127 |
| −10 | −137 | −127 | −127 | −121 |
| −15 | −123 | −123 | −119 | −119 |

TABLE 33

Delta E for Non-magnetized and Magnetized $Ni(OH)_2 + Co(15\%)$ Mixture Electrode at Different Testing Temperature (v = 200 mV/sec).

| Temperature | Delta E (mV) | | | |
|---|---|---|---|---|
| | non-mag | | mag | |
| °C. | forward | reverse | forward | reverse |
| 25 | 88 | 126 | 110 | 135 |
| 20 | 87 | 119 | 116 | 135 |
| 10 | 100 | 120 | 120 | 135 |
| 5 | 106 | 119 | 126 | 138 |
| 0 | 114 | 126 | 133 | 139 |
| −5 | 119 | 127 | 136 | 144 |
| −10 | 128 | 134 | 141 | 159 |
| −15 | 140 | 140 | 165 | 165 |

4. Nickel Hydroxide Containing Iron Oxide

Figure 40:
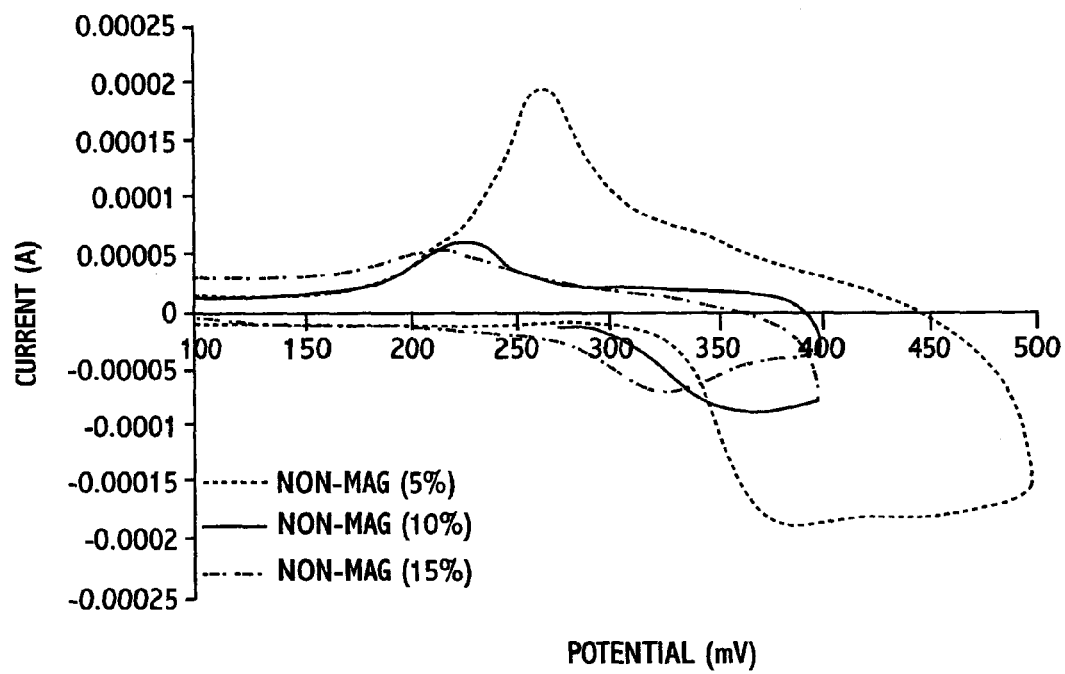
FIG. 40 shows cyclic voltammograms for non-magnetized electrodes containing 5, 10 or 15 wt. % $Fe_3O_4$ at −15° C.
Figure 41:
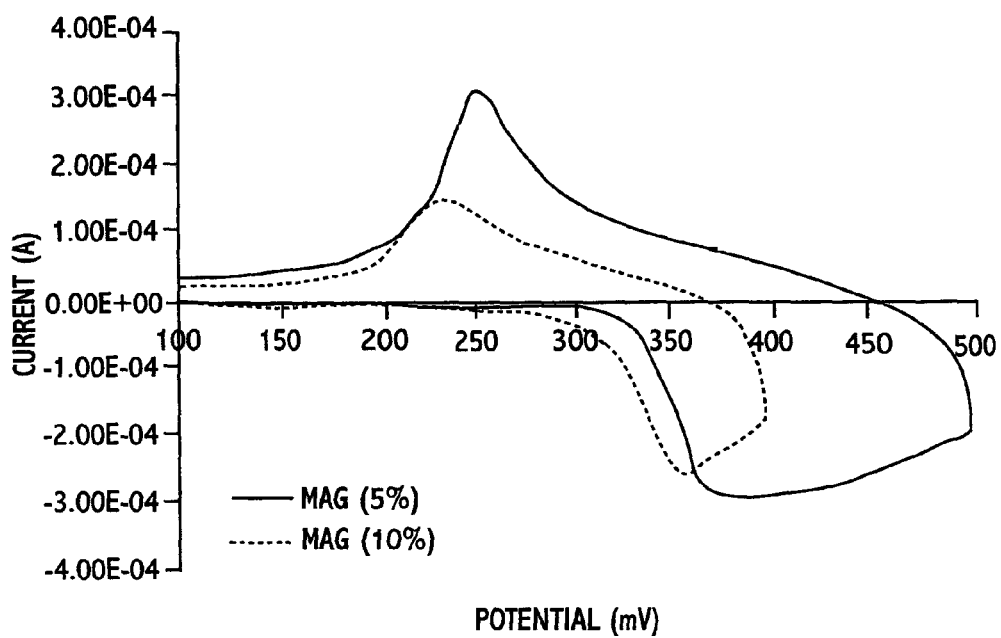
FIG. 41 shows cyclic voltammograms for magnetized electrodes containing nickel hydroxide and 5 or 10 wt. % $Fe_3O_4$ at −15° C.

Cyclic voltammograms for non-magnetized electrodes containing 5, 10, and 15 wt. % iron oxide tested at −15° C. are shown in FIG. 40. FIG. 41 shows the cyclic voltammograms for magnetized electrodes containing 5 and 10 wt. % iron oxide tested at −15° C. The magnetized electrodes had slightly sharper peaks than the non-magnetized electrodes.

Tables 34 and Table 35 show the cathodic and anodic peak currents for both non-magnetized and magnetized electrodes containing 5 wt. % iron oxide tested at different temperatures. Two samples were tested for each case. Table 36 lists the corresponding Delta E values.

Tables 37 and 38 give the cathodic peak currents and Table 39 gives the Delta E values for electrodes containing 10 wt. % iron oxide. One sample was tested for both magnetized and non-magnetized electrodes.

One sample containing 15 wt. % iron oxide was tested. Peak currents for non-magnetized electrodes are listed in Tables 40 and Table 41 and Delta E values are in shown in Table 42. With the increase of iron oxide content, the peak currents dropped for both magnetized and non-magnetized electrodes.

TABLE 34

Cathodic Currents for Non-magnetized and Magnetized $Ni(OH)_2 + 5\%\ Fe_3O_4$ at Different Testing Temperatures (v 200 mV/sec)

| Temperature | $i_p$ (μA) | | | |
|---|---|---|---|---|
| | non-mag | | mag | |
| °C. | forward | reverse | forward | reverse |
| 25 | 211 ± 140 | 186 ± 103 | 267 ± 43 | 233 ± 15 |
| 20 | 174 ± 20 | 169 ± 78 | 275 ± 2.1 | 220 ± 13 |
| 15 | 170 ± 91 | 156 ± 50 | 256 ± 11 | 210 ± 13 |
| 10 | 160 ± 84 | 140 ± 49 | 239 ± 1.8 | 198 ± 8.1 |
| 5 | 155 ± 76 | 130 ± 44 | 214 ± 11 | 186 ± 4.6 |
| 0 | 145 ± 66 | 122 ± 38 | 197 ± 8.8 | 171 ± 6.4 |
| −5 | 137 ± 59 | 118 ± 35 | 182 ± 12 | 161 ± 6.4 |
| −10 | 126 ± 49 | 112 ± 39 | 172 ± 3.4 | 157 ± 8.1 |
| −15 | 117 ± 41 | 117141 | 159 ± 3.9 | 159 ± 3.9 |

TABLE 35

Anodic Currents for Non-magnetized and Magnetized $Ni(OH)_2 + 5\ wt.\%\ Fe_3O_4$ at Different Testing Temperatures (v 200 mV/sec)

| Temperature | $i_p$(μA) | | | | ratio | |
|---|---|---|---|---|---|---|
| | non-mag | | mag | | mag/non-mag | |
| °C. | forward | reverse | forward | reverse | forward | reverse |
| 25 | −560 | −397 | −543 | −335 | 0.97 | 0.84 |
| 20 | −474 | −365 | −509 | −326 | 1.07 | 0.89 |
| 15 | −450 | −336 | −455 | −317 | 1.01 | 0.94 |
| 10 | −424 | −313 | −402 | −302 | 0.95 | 0.96 |
| 5 | −392 | −296 | −364 | −286 | 0.93 | 0.97 |
| 0 | −364 | −283 | −338 | −272 | 0.93 | 0.96 |
| −5 | −335 | −274 | −319 | −262 | 0.95 | 0.96 |
| −10 | −308 | −274 | −291 | −258 | 0.94 | 0.94 |
| −15 | −282 | −282 | −268 | −268 | 0.95 | 0.95 |

TABLE 36

Average Delta E for Non-magnetized and Magnetized $Ni(OH)_2 + 5\%\ Fe_3O_4$ at Different Testing Temperatures (v 200 mV/sec).

| Temperature | Delta E (mV) | | | |
|---|---|---|---|---|
| | non-mag | | mag | |
| °C. | forward | reverse | forward | reverse |
| 25 | 112 | NA | 103 | 128 |
| 20 | 124 | NA | 104 | 121 |
| 15 | 126 | NA | 108 | 121 |
| 10 | 125 | NA | 111 | 119 |
| 5 | 131 | 136 | 114 | 124 |
| 0 | 135 | 143 | 117 | 126 |
| −5 | 140 | 145 | 119 | 130 |
| −10 | 138 | 149 | 124 | 131 |
| −15 | 148 | 148 | 129 | 129 |

TABLE 37

Cathodic Currents for Non-magnetized and Magnetized Ni(OH)$_2$ + 10% Fe$_3$O$_4$ at Different Testing Temperatures (v 200 mV/sec).

| Temperature | $i_p$ (µA) non-mag | | $i_p$ (µA) mag | | ratio mag/non-mag | |
|---|---|---|---|---|---|---|
| °C. | forward | reverse | forward | reverse | forward | reverse |
| 25 | 64.9 | 45.1 | 215 | 158 | 3.31 | 3.50 |
| 20 | 59.1 | 44.4 | 192 | 154 | 3.24 | 3.47 |
| 15 | 50.1 | 43.5 | 169 | 147 | 3.37 | 3.38 |
| 10 | 48.3 | 42.2 | 154 | 137 | 3.12 | 3.25 |
| 5 | 46.4 | 41.4 | 142 | 123 | 3.06 | 2.98 |
| 0 | 44.1 | 39.8 | 131 | 113 | 2.97 | 2.84 |
| −5 | 40.9 | 38.6 | 121 | 109 | 2.98 | 2.85 |
| −10 | 37.3 | 37.3 | 112 | 102 | 3.00 | 2.73 |
| −15 | 36.2 | 36.2 | 93.9 | 93.9 | 2.59 | 2.59 |

TABLE 38

Anodic Currents for Non-magnetized and Magnetized Ni(OH)$_2$ + 5% Fe$_3$O$_4$ at Different Testing Temperatures (v 200 mV/sec).

| Temperature | $i_p$(µA) non-mag | | mag | | ratio mag/non-mag | |
|---|---|---|---|---|---|---|
| °C. | forward | reverse | forward | reverse | forward | reverse |
| 25 | −706 | −512 | −412 | −246 | 0.58 | 0.48 |
| 20 | −589 | −530 | −381 | −249 | 0.64 | 0.47 |
| 15 | −531 | −540 | −347 | −267 | 0.65 | 0.49 |
| 10 | −546 | −557 | −320 | −267 | 0.59 | 0.48 |
| 5 | −550 | −564 | −300 | −251 | 0.55 | 0.45 |
| 0 | −563 | −569 | −299 | −243 | 0.52 | 0.43 |
| −5 | −566 | −571 | −270 | −240 | 0.48 | 0.42 |
| −10 | −562 | −567 | −257 | −235 | 0.46 | 0.41 |
| −15 | −563 | −563 | −228 | −228 | 0.40 | 0.4 |

TABLE 39

Delta E for Non-magnetized and Magnetized Ni(OH)$_2$ + 10% Fe$_3$O$_4$ at Different Testing Temperatures (v 200 mV/sec).

| Temperature | Delta E (mV) non-mag | | mag | |
|---|---|---|---|---|
| °C. | forward | reverse | forward | reverse |
| 25 | 90 | 74 | 97 | 100 |
| 20 | 80 | 77 | 101 | 100 |
| 15 | 85 | 78 | 991 | 100 |
| 10 | 84 | 82 | 101 | 101 |
| 5 | 86 | 85 | 103 | 106 |
| 0 | 89 | 86 | 105 | 107 |
| −5 | 91 | 92 | 106 | 106 |
| −10 | 95 | 96 | 108 | 110 |
| −15 | 98 | 98 | 111 | 111 |

TABLE 40

Cathodic Currents For Non-magnetized and Magnetized Ni(OH)$_2$ + 15% Fe$_3$O$_4$ at Different Testing Temperatures (v 200 mV/sec).

| Temperature | $i_p$ (µA) non-mag | |
|---|---|---|
| °C. | forward | reverse |
| 25 | 41.1 | 39.1 |
| 20 | 50.1 | 39.2 |
| 15 | 45.9 | 39.7 |
| 10 | 43.4 | 38.7 |
| 5 | 40.5 | 33.3 |
| 0 | 37.1 | 30.0 |
| −5 | 33.8 | 27.9 |
| −10 | 30.5 | 29.5 |
| −15 | 25.0 | 25.0 |

TABLE 41

Anodic Currents For Non-magnetized and Magnetized Ni(OH)$_2$ + 15% Fe$_3$O$_4$ at Different Testing Temperature (v 200 mV/sec).

| Temperature | $i_p$ (µA) non-mag | |
|---|---|---|
| °C. | forward | reverse |
| 25 | −145 | −85.9 |
| 20 | −134 | −84.5 |
| 15 | −115 | −84.5 |
| 10 | −106 | −82.6 |
| 5 | −97.5 | −81.7 |
| 0 | −87.7 | −77.5 |
| −5 | −82.9 | −73.7 |
| −10 | −77.6 | −71.0 |
| −15 | −69.9 | −69.9 |

TABLE 42

Delta E for Non-magnetized and Magnetized Ni(OH)$_2$ + 15% Fe$_3$O$_4$ at Different Testing Temperatures (v 200 mV/sec).

| Temperature | Delta E (mV) non-mag | |
|---|---|---|
| °C. | forward | reverse |
| 25 | 105 | 128 |
| 20 | 108 | 124 |
| 15 | 112 | 123 |
| 10 | 114 | 123 |
| 5 | 117 | 125 |
| 0 | 120 | 126 |
| −5 | 126 | 130 |
| −10 | 128 | 132 |
| −15 | 136 | 136 |

A pairwise examination of the 5% Fe$_3$O$_4$ data indicates that there is a magnetic effect at −15° C. (Table 43). For $\bar{\chi} \pm s = 1.43 \pm 0.48$, the hypothesis that there is no magnetic effect is rejected at the 79% level.

TABLE 43

Pairwise Ratio of Magnetic to Nonmagnetic Peak Currents for 5.0 µl Slurry at 200 mV/s for Ni(OH)$_2$ and 5 wt. % Fe3O4 Electrode at −15 °C.

| $i_p$ (non-mag)(µA) | $i_p$ (mag) (µA) | $i_p$ (non-mag)/$i_p$ (mag) |
|---|---|---|
| 87.9 | 155.8 | 1.77 |
| 147.1 | 161.4 | 1.10 |
|  | Average | 1.35 |
|  | St. Dev. | 0.48 |

5. Nickel Hydroxide Containing NdFeB

Figure 42:
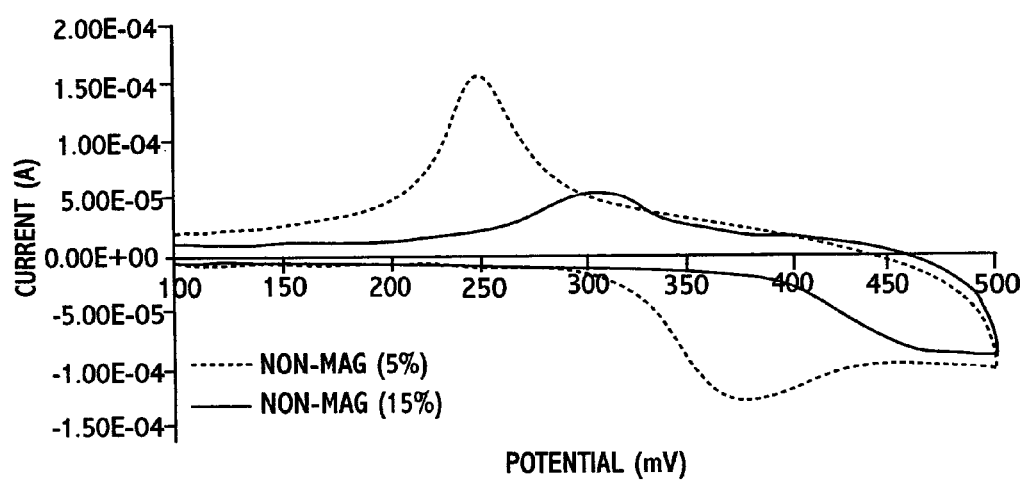
FIG. 42 shows cyclic voltammograms for non-magnetized electrodes containing nickel hydroxide and 5 or −15 wt. % NdFeB at 15° C.

The cyclic voltammograms for non-magnetized electrodes coated with nickel hydroxide plus 5 or 15 wt. % NdFeB tested at −15° C. are shown in FIG. 42. The cyclic voltammograms for the same electrodes tested at 25° C. have sharper peaks.

Figure 43:
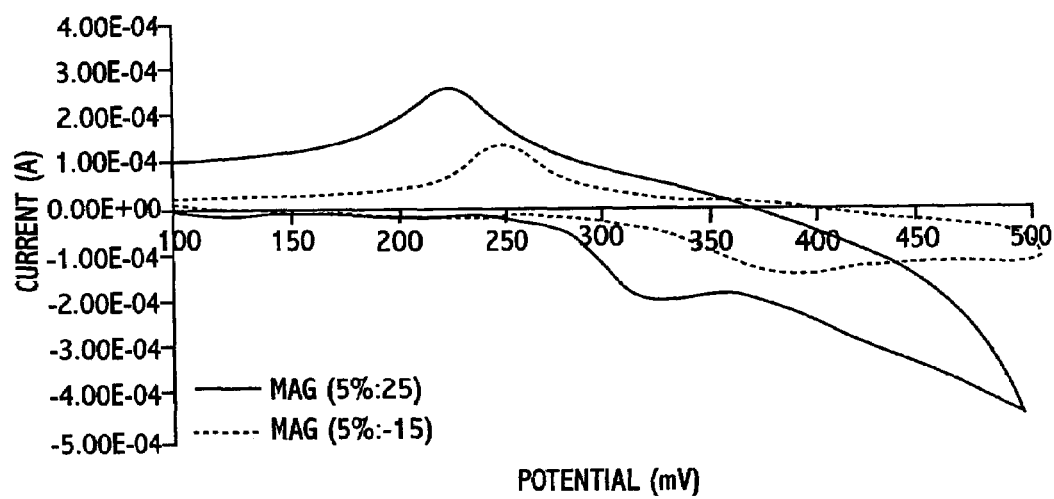
FIG. 43 shows cyclic voltammograms for magnetized electrodes containing nickel hydroxide and 5 wt. % NdFeB at −15° C.

FIG. 43 shows the cyclic voltammograms for magnetized electrodes containing 5 wt. % NdFeB tested at 25° C. and −15° C. Peak currents were lower and Delta E was larger at lower temperatures. The non-magnetized electrodes had sharper peaks and larger currents than the magnetized electrodes.

One sample was tested for both magnetized and non-magnetized electrodes containing 5 wt. % NdFeB. Table 44 gives cathodic peak currents for non-magnetized and magnetized electrodes containing 5 wt. % NdFeB tested at different temperatures.

TABLE 44

Average Cathodic Currents for Non-magnetized and Magnetized Ni(OH)$_2$ + 5% NdFeB Mixture Electrodes at Different Testing Temperatures (v = 200 mV/§).

| Temperature | $i_p$(µA) | | | | ratio | |
|---|---|---|---|---|---|---|
| | non-mag | | mag | | mag/non-mag | |
| °C. | forward | reverse | forward | reverse | forward | reverse |
| 25 | 169 | 186 | 138 | 162 | 0.82 | 0.87 |
| 20 | 132 | 153 | 140 | 156 | 1.06 | 1.02 |
| 15 | 155 | 188 | 136 | 149 | 0.88 | 0.79 |
| 10 | 129 | 136 | 138 | 140 | 1.07 | 1.03 |
| 5 | 157 | 168 | 136 | 132 | 0.87 | 0.79 |
| 0 | 123 | 119 | 131 | 123 | 1.07 | 1.03 |
| −5 | 147 | 148 | 125 | 116 | 0.85 | 0.78 |
| −10 | 112 | 90.4 | 115 | 109 | 1.03 | 1.20 |
| −15 | 126 | 126 | 107 | 107 | 0.85 | 0.85 |

Anodic peak currents are listed in Table 45. Compared to non-magnetized electrodes containing 5 wt. % NdFeB, magnetized electrodes had lower peak currents. The cathodic peak and anodic peak currents for non-magnetized electrodes containing 15 wt. % NdFeB tested at different temperatures are listed in Tables 47 and 48, respectively.

At the same testing temperature, electrodes containing 5 wt. % NdFeB had larger peak currents that the electrode containing 15 wt. % NdFeB. Table 46 gives Delta E values for non-magnetized and magnetized electrodes containing 5 wt. % NdFeB. The Delta E for non-magnetized electrodes containing 15 wt. % NdFeB is listed in Table 49. For non-magnetized and magnetized electrodes containing 5 wt. % NdFeB, Delta E is about the same. For the non-magnetized electrodes, with increasing NdFeB content, Delta E increased.

TABLE 45

Average Anodic Currents for Non-magnetized and Magnetized Ni(OH)$_2$ + 5% NdFeB at Different Testing Temperatures (v = 200 mV/§).

| Temperature | $i_p$(µA) | | | | ratio | |
|---|---|---|---|---|---|---|
| | non-mag | | mag | | mag/non-mag | |
| °C. | forward | reverse | forward | reverse | forward | reverse |
| 25 | −252 | −200 | −191 | −171 | 0.76 | 0.86 |
| 20 | −216 | −1694 | −180 | −167 | 0.83 | 1.00 |
| 15 | −227 | −212 | −167 | −161 | 0.74 | 0.76 |
| 10 | −180 | −1554 | −159 | −154 | 0.88 | 0.99 |
| 5 | −198 | −192 | −150 | −146 | 0.76 | 0.76 |
| 0 | −159 | −138 | −143 | −139 | 0.90 | 1.01 |
| −5 | −172 | −146 | −137 | −130 | 0.80 | 0.89 |
| −10 | −146 | −115 | −129 | −124 | 0.88 | 1.08 |
| −15 | −129 | −115 | −122 | −122 | 0.95 | 1.06 |

TABLE 46

Average Delta E for Non-magnetized and Magnetized Ni(OH)$_2$ + 5% NdFeB at Different Testing Temperatures (v 200 mV/sec).

| Temperature | Delta E (mV) | | | |
|---|---|---|---|---|
| | non-mag | | mag | |
| °C. | forward | reverse | forward | reverse |
| 25 | 98 | 114 | 99 | 104 |
| 20 | 99 | 103 | 99 | 106 |
| 15 | 102 | 109 | 104 | 108 |
| 10 | 103 | 109 | 108 | 114 |
| 5 | 111 | 118 | 112 | 118 |
| 0 | 111 | 117 | 118 | 122 |
| −5 | 123 | 123 | 123 | 129 |
| −10 | 125 | 130 | 130 | 136 |
| −15 | 135 | 135 | 135 | 138 |

TABLE 47

Average Cathodic Currents For Non-magnetized and Magnetized Ni(OH)$_2$ + 5% NdFeB at Different Testing Temperatures (v 200 mV/sec).

| Temperature | $i_p$ (µA) | |
|---|---|---|
| | non-mag | |
| °C. | forward | reverse |
| 25 | 62.0 | 77.8 |
| 20 | 68.0 | 70.3 |
| 15 | 65.4 | 63.6 |
| 10 | 61.4 | 56.2 |
| 5 | 53.6 | 49.8 |
| 0 | 49.9 | 45.0 |
| −5 | 45.9 | 38.4 |
| −10 | 40.8 | 31.8 |
| −15 | 28.6 | 28.6 |

TABLE 48

Average Anodic Currents For Non-magnetized and
Magnetized Ni(OH)$_2$ + 15% NdFeB at
Different Testing Temperatures (v 200 mV/sec).

| Temperature | $i_p$ (μA) non-mag | |
|---|---|---|
| °C. | forward | reverse |
| 25 | −171 | −145 |
| 20 | −157 | −136 |
| 15 | −148 | −127 |
| 10 | −138 | −118 |
| 5 | −139 | −110 |
| 0 | −114 | −103 |
| −5 | −108 | −93.7 |
| −10 | −100 | −85.5 |
| −15 | −80.7 | −80.7 |

TABLE 49

Average Delta E For Non-magnetized
Ni(OH)$_2$ + 15% NdFeB at
Different Testing Temperatures (v 200 mV/sec).

| Temperature | Delta E (mV) non-mag | |
|---|---|---|
| °C. | forward | reverse |
| 25 | 123 | 156 |
| 20 | 130 | 161 |
| 15 | 149 | 158 |
| 10 | 155 | 156 |
| 5 | 160 | 159 |
| 0 | 157 | 158 |
| −5 | 160 | 158 |
| −10 | 158 | 161 |
| −15 | 163 | 163 |

6. Nickel Hydroxide Containing Sm$_2$Co$_7$

Figure 44:
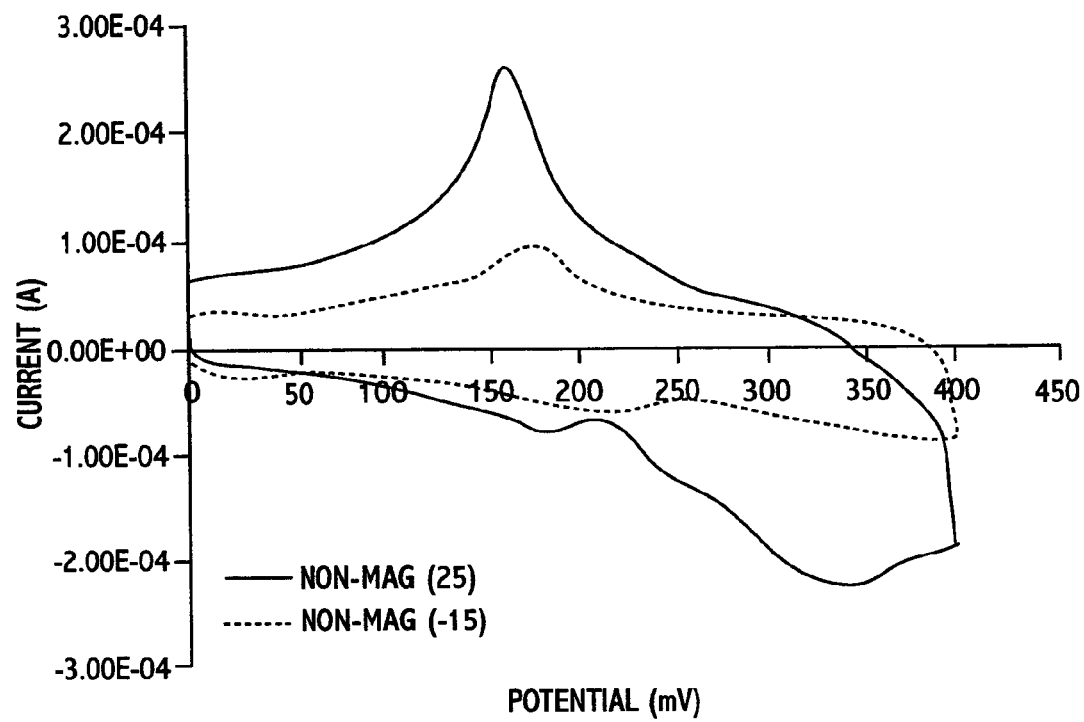
FIG. 44 shows cyclic voltammograms for non-magnetized electrodes containing nickel hydroxide and 5 wt. % samarium cobalt at −15° C.
Figure 45:
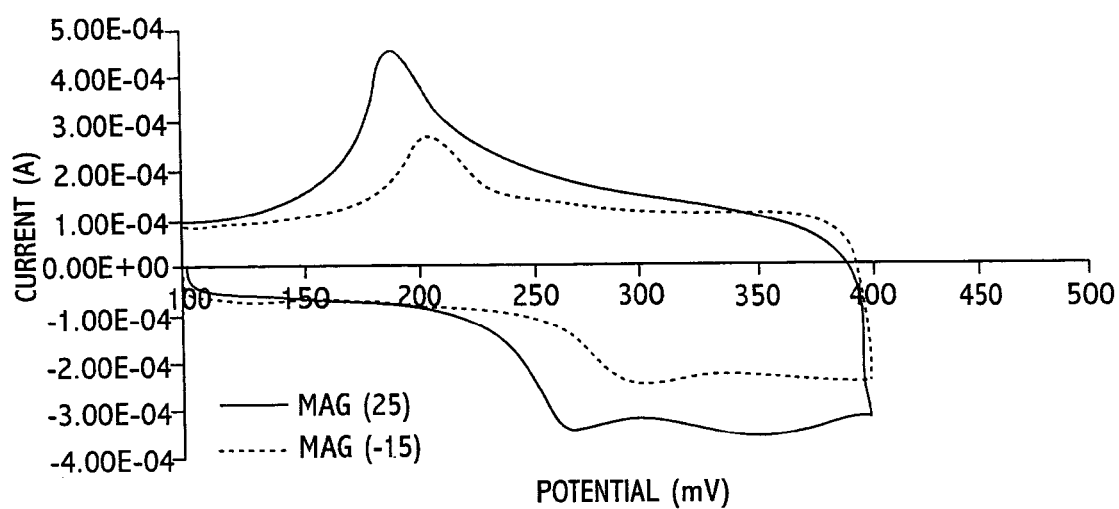
FIG. 45 shows cyclic voltammograms for magnetized electrodes containing nickel hydroxide and 5 wt. % samarium cobalt.

Cyclic voltammograms for non-magnetized and magnetized electrodes containing 5 wt. % Sm$_2$Co$_7$ tested at 25° C. and −15° C. are shown in FIGS. 44 and 45, respectively. The cathodic and anodic peak currents for non-magnetized and magnetized electrodes containing 5 wt. % uncoated Sm$_2$Co$_7$ are listed in Tables 50 and 51, respectively. Two samples were tested for each case.

Compared to the magnetized electrode coated only with nickel hydroxide, the magnetized electrodes containing 5 wt. % Sm$_2$Co$_7$ had 74% larger cathodic peak currents and 130% larger currents than the nonmagnetized electrodes. Delta E for electrodes containing 5 wt. % Sm$_2$Co$_7$ is listed in Table 52. Delta E for the magnetized electrodes is 20 to 30 mV less than for the nonmagnetized electrodes.

Table 53 and Table 54 give the cathodic peak and anodic peak currents for non-magnetized electrodes containing 10 wt. % uncoated Sm$_2$Co$_7$. One sample was tested for the electrodes containing 10 wt. % Sm$_2$Co$_7$. Compared to the non-magnetized electrodes containing 5 wt. % Sm$_2$Co$_7$, the electrodes containing 10 wt. % Sm$_2$Co$_7$ showed better performance at different testing temperatures.

Table 55 gives the Delta E for the non-magnetized electrodes containing 10 wt. % Sm$_2$Co$_7$. The non-magnetized electrodes containing 10 wt. % Sm$_2$Co$_7$ had smaller Delta E's than non-magnetized electrodes containing 5 wt. % Sm$_2$Co$_7$.

TABLE 50

Average Cathodic Currents for Non-magnetized and Magnetized
Ni(OH)$_2$ + 5% Sm$_2$Co$_7$
at Different Testing Temperatures (v = 200 mV/sec).

| Temperature | $i_p$(μA) | | | |
|---|---|---|---|---|
| | non-mag | | mag | |
| °C. | forward | reverse | forward | reverse |
| 25 | 122 ± 76 | 130 ± 32 | 334 ± 161 | 280 ± 168 |
| 20 | 130 ± 71 | 128 ± 31 | 317 ± 147 | 257 ± 135 |
| 15 | 128 ± 62 | 124 ± 32 | 275 ± 109 | 243 ± 113 |
| 10 | 126 ± 58 | 119 ± 36 | 258 ± 108 | 223 ± 88 |
| 5 | 119 ± 51 | 108 ± 32 | 234 ± 86 | 206 ± 65 |
| 0 | 109 ± 45 | 96.4 ± 33 | 209 ± 62 | 169 ± 55 |
| −5 | 97.1 ± 40 | 87.0 ± 34 | 193 ± 43 | 171 ± 26 |
| −10 | 88.1 ± 37 | 79.4 ± 33 | 177 ± 38 | 155 ± 14 |
| −15 | 76.0 ± 36 | 76.0 ± 36 | 149 ± 2.8 | 149 ± 2.8 |

TABLE 51

Average Anodic Currents for Non-magnetized and
Magnetized Ni(OH)$_2$ + 5% Sm$_2$Co$_7$
at Different Testing Temperatures (v = 200 mV/sec).

| Temperature | $i_p$(μA) | | | |
|---|---|---|---|---|
| | non-mag | | mag | |
| °C. | forward | reverse | forward | reverse |
| 25 | −356 | −262 | −554 | −333 |
| 20 | −319 | −203 | −397 | −334 |
| 15 | −284 | −185 | −494 | −345 |
| 10 | −271 | −176 | −436 | −374 |
| 5 | −251 | −196 | −408 | −358 |
| 0 | −236 | −162 | −413 | −312 |
| −5 | −195 | −187 | −353 | −331 |
| −10 | −203 | −184 | −370 | −300 |
| −15 | −188 | −188 | −299 | −299 |

TABLE 52

Average Delta E for Non-magnetized and Magnetized
Ni(OH)$_2$ + 5% Sm$_2$Co$_7$
at Different Testing Temperatures (v = 200 mV/sec).

| Temperature | Delta E (mV) | | | |
|---|---|---|---|---|
| | non-mag | | mag | |
| °C. | forward | reverse | forward | reverse |
| 25 | 95 | 126 | 87 | 89 |
| 20 | 100 | 134 | 86 | 89 |
| 15 | 106 | 131 | 88 | 92 |
| 10 | 107 | 126 | 91 | 92 |
| 5 | 115 | 131 | 93 | 92 |
| 0 | 117 | 126 | 93 | 103 |
| −5 | 120 | 151 | 96 | 97 |
| −10 | 131 | 135 | 100 | 103 |
| −15 | 132 | 132 | 103 | 103 |

TABLE 53

Average Cathodic Currents For Non-magnetized
Ni(OH)$_2$ + 10% Sm$_2$Co$_7$
at Different Testing Temperatures (v = 200 mV/sec).

| Temperature | $i_p$ (μA) non-mag | |
|---|---|---|
| °C. | forward | reverse |
| 25 | 176 | 141 |
| 20 | 161 | 143 |
| 15 | 157 | 143 |
| 10 | 152 | 144 |
| 5 | 153 | 142 |
| 0 | 150 | 140 |
| −5 | 146 | 137 |
| −10 | 138 | 134 |
| −15 | 132 | 132 |

TABLE 54

Average Cathodic Currents For Non-magnetized
Ni(OH)$_2$ + 10% Sm$_2$ Co$_7$
at Different Testing Temperatures (v = 200 mV/sec).

| Temperature | $i_p$ (μA) non-mag | |
|---|---|---|
| °C. | forward | reverse |
| 25 | −191 | −162 |
| 20 | −16 | −163 |
| 15 | −166 | −164 |
| 10 | −163 | −164 |
| 5 | −164 | −163 |
| 0 | −162 | −162 |
| −5 | −163 | −160 |
| −10 | −161 | −158 |
| −15 | −157 | −157 |

TABLE 55

Average Delta E For Non-magnetized
Ni(OH)$_2$ + 10% Sm$_2$ Co$_7$ at
Different Testing Temperatures (v = 200 mV/sec).

| Temperature | Delta E (mV) non-mag | |
|---|---|---|
| °C. | forward | reverse |
| 25 | 81 | 78 |
| 20 | 81 | 81 |
| 15 | 83 | 83 |
| 10 | 87 | 85 |
| 5 | 88 | 89 |
| 0 | 92 | 91 |
| −5 | 93 | 93 |
| −10 | 97 | 98 |
| −15 | 99 | 99 |

A pairwise examination of the 5% Sm$_2$Co$_7$ data indicates that there is a magnetic effect at −15° C. (Table 56). For $\bar{\chi}=2.20\pm1.00$, the hypotheses that there is no magnetic effect is rejected at the 84% level.

TABLE 56

Pairwise Ratio of Magnetic to Nonmagnetic Peak
Currents for 5.0 μl Slurry at 200 mV/s for
Ni(OH)$_2$ and 5 wt. %
Sm$_2$ Co$_7$ Electrode at −15° C.

| $i_p$ (non-mag)(μA) | $i_p$ (mag)(μA) | $i_p$(non-mag)/ $i_p$ (mag) |
|---|---|---|
| 50.6 | 147 | 2.91 |
| 101.4 | 151 | 1.49 |
| | Average | 2.20 |
| | St. Dev. | 1.00 |

B. Results

Electrode performances were tested at different temperatures. Electrodes were coated with the following: nickel hydroxide, nickel hydroxide with 5 wt. % glass beads, nickel hydroxide with 15 wt. % Co, nickel hydroxide with iron oxide, nickel hydroxide with NdFeB and nickel hydroxide with Sm$_2$Co$_7$. The electrode with 5 wt. % glass beads were used as a control.

Peak currents decreased with decreasing temperature. For magnetized electrodes, peak currents decreased less than for non-magnetized electrodes. At −15° C., magnetized electrodes typically showed better performance than non-magnetized electrodes.

III. Observations

The above results show that magnetic field does affect nickel hydroxide electrode performance. For electrodes coated only with nickel hydroxide, magnetized electrodes performed better than non-magnetized electrodes.

The cathodic peak currents with pairwise analysis data for electrodes tested at ambient temperature and −15° C. are listed in Table 57 and Table 58, respectively. When the solution temperature decreases from 25 to −15° C. at intervals of 5° C., the peak currents got smaller; the peak currents at −15° C. are ~50 to 60% of the peak currents at 25° C. for both types of electrodes. When the temperature was increased from −15° C. to 25° C., the peak currents got larger, but the peak currents over the reverse process were smaller than the peak currents over the forward process for the same testing temperature. While not wishing to be bound by theory, it is thought that this could be due to a structure change at lower temperatures that is irreversible at higher temperatures. For both magnetized and non-magnetized electrodes coated only with nickel hydroxide, the peak currents increased with increasing scan rates.

TABLE 57

Cathodic Currents for Non-magnetized and Magnetized Electrodes
Tested at Ambient Temperatures (v = 200 mV/sec).

| | $i_p$(μA) | | ratio | |
|---|---|---|---|---|
| | non-mag | mag | mag/non-mag | mag/non-mag(N$_i$OH)$_2$ |
| Ni(OH)2 | 144 ± 36 | 192 ± 29 | 1.25 ± 0.16[a] | 133 ± 0.39 |
| Ni(OH)$_2$ + 5 wt. % Glass Beads | | | 9.9 ± 8.8 | NA |
| Ni(OH)$_2$ + 5 wt. % Co | 65.8 ± 23.6 | 83.6 ± 22.2 | 1.27 ± 0.57 | 0.58 ± 0.21 |

TABLE 57-continued

Cathodic Currents for Non-magnetized and Magnetized Electrodes Tested at Ambient Temperatures (v = 200 mV/sec).

| | $i_p(\mu A)$ | | ratio | |
|---|---|---|---|---|
| | non-mag | mag | mag/non-mag | mag/non-mag($N_i OH)_2$ |
| $Ni(OH)_2$ + 5 wt. % $Fe_3O_4$ | 211 + 140 | 267 ± 43.8 | 1.71 ± 0.83a | 1.85 + 0.55 |
| $Ni(OH)_2$ + 10 wt. % $Fe_3O$ | 64.9 ± 14.1 | 15 ± 6.4 | 3.31 ± 0.73 | 1.49 + 0.37 |
| $Ni(OH)_2$ + 15 wt. % $Fe_3O_4$ | 41.1 ± 13.5 | ~0 | | |
| $Ni(OH)_2$ + 5 wt. % NdFeB | 169 ± 45 | 138 ± 31 | 0.82 ± 0.28 | 0.95 ± 0.3 |
| $Ni(OH)_2$ + 15 wt. % NdFeB | 62.0 ± 9.9 | ~0 | | |
| $Ni(OH)_2$ + 5 wt. % $Sm_2Co_7$ | 122 ± 32 | 34 ± 162 | 2.63 ± 0.12$^a$ | 2.32 ± 1.24 |
| $Ni(OH)_2$ + 10 wt. % $Sm_2 Co7$ | 176 ± 49 | ~0 | | |

$^a$These values were calculated from the pairwise analysis data, not the average data.

TABLE 58

Cathodic Currents for Non-magnetized and Magnetized Electrodes Tested at −15 Degree (v = 200 mV/sec).

| | $i_p(\mu A)$ | | ratio | |
|---|---|---|---|---|
| | non-mag | mag | mag/non-mag | mag/non-mag($N_i OH)_2$ |
| $Ni(OH)_2$ | 65.7 ± 27 | 80.9 ± 8.1 | 1.23 ± 0.52 | 1.23 ± 0.52 |
| $Ni(OH)_2$ + 5 wt. % Glass Beads | | 2.0 ± 6.4 | | NA |
| $Ni(OH)_2$ + 5 wt. % Co | 29.0 ± 7.3 | 44.3 ± 24.8 | 1.53 ± 0.94 | 0.67 ± 0.46 |
| $Ni(OH)_2$ + 5 wt. % $Fe_3O_4$ | 117 + 41 | 159 ± 3.96 | 1.35 ± 0.48a | 2.42 + 1.00 |
| $Ni(OH)_2$ + 10 wt. % $Fe_3O_4$ | 36.2 ± 7.2 | 93.9 ± 68.3 | 2.59 ± 1.96 | 1.43 + 1.18 |
| $Ni(OH)_2$ + 15 wt. % $Fe_3O_4$ | 25.0 ± 7.7 | ~0 | | |
| $Ni(OH)_2$ + 5 wt. % NdFeB | 126 ± 30.5 | 107 ± 13.5 | 0.85 ± 0.23 | 1.63 ± 0.70 |
| $Ni(OH)_2$ + 15 wt. % NdFeB | 28.6 ± 3.9 | ~0 | | |
| $Ni(OH)_2$ + 5 wt. % $Sm_2Co_7$ | 76.0 ± 35.8 | 149 ± 3.0 | 2.20 ± 1.00$^a$ | 2.27 ± 0.93 |
| $Ni(OH)_2$ + 10 wt. % $Sm_2Co_7$ | 132 ± 26 | ~0 | | |

$^a$These values were calculated from the pairwise analysis data, not the average data.

In the forward process, the system was cooled from 25 to −15° C. at 5° C. intervals. In the reverse process, the system was warmed back up from −15° C. to 25° C. Compared to electrodes containing 5 wt. % glass beads, all other electrodes have better performance. Glass beads are not conductive and magnetizable and they increase the resistance of the film. For the electrode of nickel hydroxide with 15 wt. % cobalt powder, the performance of both types of electrodes was worse than that of the electrodes coated with only nickel hydroxide.

For the electrodes with different amounts of silane coated iron oxide and silane coated neodymium iron boron, the peak currents of the magnetized and non-magnetized electrodes decreases with the increasing iron oxide or neodymium iron boron content.

For the electrode with 5 wt. % neodymium iron boron, the magnetized electrode had lower peak currents than the non-magnetized electrode, but for the electrodes having the same amount of iron oxide, the magnetized electrodes showed better performance than the non-magnetized electrodes.

The magnetized electrodes with 5 wt. % iron oxide had better performance than the non-magnetized electrodes coated only with nickel hydroxide. At low testing temperatures, the magnetized and non-magnetized electrodes with 5 wt. % iron oxide, and the magnetized and non-magnetized electrode with 5 wt. % NdFeB showed better performance than the electrodes coated only with nickel hydroxide.

For the electrodes with 5 or 10 wt. % samarium cobalt, the performance of the non-magnetized electrode gets better with the increasing samarium cobalt content. The magnetized electrode containing 5 wt. % of samarium cobalt had better performance than the non-magnetized electrode.

The above results are basically consistent with the magnetic materials magnetic energy product. As the magnetic energy product increases, films are more difficult to form because the particles agglomerate. Thus, there is a trade off between the amount of magnetic material and the magnetic energy product.

The results show that different magnetic materials have different effects on electrode performance. Electrodes coated only with nickel hydroxide have a relatively small magnetic energy product. While not wishing to be bound by theory, it is thought that in the presence of an external magnet field during film casting and drying, the magnet modifies the film configuration, improving electrode performance.

From the analysis of the thickness data, at the 99.5% confidence level, it appears that the magnetization of electrodes coated only with nickel hydroxide enhances the cathodic currents. For the electrodes coated with relatively high contents of coated iron oxide and coated neodymium iron boron, the magnetized electrode performance is worse than the non-magnetized electrodes. While not wishing to be bound by theory, it is thought that this could be because of the higher magnetic energy products of these materials.

For electrodes coated with nickel hydroxide and 5 wt. % other magnetizable particles, the electrode performance is enhanced compared to electrodes coated only with nickel hydroxide. This is more pronounced at low temperatures. From the data, it appears that magnetized electrodes with relatively low concentrations of cobalt, coated iron oxide, and neodymium iron boron and uncoated samarium cobalt have better performance than the non-magnetized electrodes and better performance than electrodes coated only with nickel hydroxide.

While not wishing to be bound by theory, it is thought that the reaction proceeds faster in the presence of a magnetic field, which suggests higher rates for nickel metal hydride batteries charge and discharge. The higher peak currents for magnetized electrodes also means that battery resistance is reduced with magnetic field and could increase batteries capacity and working potential.

Numerous and additional modifications and variations of the present invention are possible in light of the above teachings. It is therefore to be understood that within the scope of the appended claims, the invention may be practiced otherwise than as specifically claimed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A battery comprising a magnetically modified electrode, said magnetically modified electrode comprising a non-magnetic substrate and a coating layer formed on said substrate,
    wherein said coating layer comprises (i) particles adapted to generate electrochemical energy in the presence of a magnetic field, and (ii) magnetic particles, said particles adapted to generate electrochemical energy in the presence of a magnetic field having a different composition from said magnetic particles, and
    further wherein said magnetic particles cause the magnetic moments of said particles adapted to generate electrochemical energy to align and so establish a permanent magnetic field at said modified electrode.

2. A battery according to claim 1, wherein said battery is a Ni-MH battery, a Ni—Cd battery, a Ni—Zn battery or a Ni—Fe battery.

3. A Ni-MH battery comprising an electrode, said electrode comprising a non-magnetic substrate and a coating layer formed on said substrate,
    wherein said coating layer comprises (i) particles adapted to generate electrochemical energy in the presence of a magnetic field, and (ii) magnetic particles, said particles adapted to generate electrochemical energy in the presence of a magnetic field having a different composition from said magnetic particles, and
    further wherein said magnetic particles cause the magnetic moments of said particles adapted to generate electrochemical energy to align and so establish a permanent magnetic field at said modified electrode.

4. A battery comprising a magnetically modified electrode, said electrode comprising a non-magnetic substrate and a coating layer formed on said substrate,
    wherein said coating layer comprises (i) particles adapted to generate electrochemical energy in the presence of a magnetic field, and (ii) magnetic particles, said particles adapted to generate electrochemical energy in the presence of a magnetic field having a different composition from said magnetic particles, and
    further wherein said particles adapted to generate electrochemical energy in the presence of a magnetic field are selected from the group consisting of nickel hydroxide, zinc hydroxide, cobalt oxide, manganese oxide, lithium, lithium hydroxide and combinations thereof and
    further wherein said magnetic particles are selected from the group consisting of Co, Ni, Fe, samarium cobalt neodymium-iron-boron and combinations thereof, and
    further wherein said magnetic particles cause the magnetic moments of said particles adapted to generate electrochemical energy to align and so establish a permanent magnetic field at said modified electrode.

5. A battery according to claim 4, wherein said battery is a Ni-MH battery, a Ni—Cd battery, a Ni—Zn battery or a Ni—Fe battery.

6. A battery comprising a magnetically modified electrode, said electrode comprising a non-magnetic conducting substrate and a coating layer formed on said substrate,
    wherein said coating layer comprises particles adapted to generate electrochemical energy in the presence of a magnetic field and
    further wherein said particles adapted to generate electrochemical energy in the presence of a magnetic field are subjected to an external magnetic field before, during or after said coating layer is formed on said substrate, and
    further wherein said external magnetic field causes the magnetic moments of said particles adapted to generate electrochemical energy to align and so establish a permanent magnetic field at said modified electrode.

7. A battery according to claim 6, wherein said battery is a Ni-MH battery, a Ni—Cd battery, a Ni—Zn battery or a Ni—Fe battery.

8. A Ni-MH battery comprising a first electrode and a second electrode, said first electrode comprising a metal hydride, and said second electrode comprising a non-magnetic substrate and a coating layer formed on said substrate,
    wherein said coating layer comprises particles adapted to generate electrochemical energy in the presence of a magnetic field and
    further wherein said particles adapted to generate electrochemical energy in the presence of a magnetic field are subjected to an external magnetic field before, during or after said coating layer is formed on said substrate, and
    further wherein said external magnetic field causes the magnetic moments of said particles adapted to generate electrochemical energy to align and so establish a permanent magnetic field at said second electrode.

* * * * *

UNITED STATES PATENT AND TRADEMARK OFFICE
CERTIFICATE OF CORRECTION

| | |
|---|---|
| PATENT NO. | : 7,709,115 B2 |
| APPLICATION NO. | : 10/356723 |
| DATED | : May 4, 2010 |
| INVENTOR(S) | : Johna Leddy et al. |

It is certified that error appears in the above-identified patent and that said Letters Patent is hereby corrected as shown below:

Column 1, line 17, "may have" should read --has--.

Signed and Sealed this

Sixth Day of July, 2010

David J. Kappos
*Director of the United States Patent and Trademark Office*